US007146053B1

(12) United States Patent
Rijavec et al.

(10) Patent No.: US 7,146,053 B1
(45) Date of Patent: Dec. 5, 2006

(54) REORDERING OF COMPRESSED DATA

(75) Inventors: Nenad Rijavec, Longmont, CO (US); Joan LaVerne Mitchell, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/569,573

(22) Filed: May 10, 2000

(51) Int. Cl.
*G06K 9/36* (2006.01)
*G06K 9/46* (2006.01)

(52) U.S. Cl. ............... 382/233; 382/248; 382/232
(58) Field of Classification Search ........... 382/233, 382/235, 244–248, 297, 240, 232; 375/240.11, 375/240.19
See application file for complete search history.

(56) References Cited

U.S. PATENT DOCUMENTS

| 4,596,039 | A | 6/1986 | Mitchell et al. ............ 382/233 |
| 4,610,027 | A | 9/1986 | Anderson et al. ........... 382/245 |
| 4,627,020 | A | 12/1986 | Anderson et al. ........... 382/297 |
| 4,646,356 | A | 2/1987 | Anderson et al. ........... 382/245 |
| 4,658,430 | A | 4/1987 | Anderson et al. ........... 382/297 |
| 4,689,824 | A | 8/1987 | Mitchell et al. ............ 382/297 |
| 4,725,815 | A | 2/1988 | Mitchell et al. ............ 341/67 |
| 4,837,845 | A | 6/1989 | Pruett et al. ............... 382/297 |
| 4,888,645 | A | 12/1989 | Mitchell et al. ............ 382/235 |
| 4,891,643 | A | 1/1990 | Mitchell et al. ............ 341/107 |
| 4,905,297 | A | 2/1990 | Langdon, Jr. et al. ...... 382/247 |
| 5,327,248 | A | 7/1994 | Miller et al. ............... 382/233 |
| 5,341,440 | A * | 8/1994 | Earl et al. .................. 382/233 |
| 5,708,732 | A | 1/1998 | Merhav et al. ............. 382/232 |
| 5,751,865 | A | 5/1998 | Micco et al. ............... 382/296 |
| 5,867,598 | A | 2/1999 | de Queiroz ................. 382/235 |
| 6,081,211 | A | 6/2000 | de Queiroz et al. |
| 6,246,801 | B1 | 6/2001 | Boyce et al. |
| 6,298,166 | B1 | 10/2001 | Ratnakar et al. |
| 6,381,371 | B1 | 4/2002 | Epstein et al. |

FOREIGN PATENT DOCUMENTS

JP 02698037 12/1992

(Continued)

OTHER PUBLICATIONS

Glen G. Langdon, Jr., "An Introduction to Arithmetic Coding," *IBM J. Res. Develop.* 28, 135-149 (Mar. 1984).

(Continued)

*Primary Examiner*—Duy Dang
(74) *Attorney, Agent, or Firm*—Blakely, Sokoloff, Taylor & Zafman, LLP

(57) ABSTRACT

Apparatus and methods are provided for encoding independently decodable pieces of compressed data to accommodate reordering of the pieces of compressed data before or after manipulation. Encoding can occur before or after manipulation of the source information. For example, in the context of a JPEG image, MCUs can be rotated and promptly compressed with restart markers without extra buffering to put the MCUs in the correct rotated order. Later, the order of the independently decodable pieces can be changed to accommodate proper output. Alternatively, pointers to the independently decodable pieces can be used to present the data to the decoder in the proper order. Additional reentry information within the independently decodable pieces of compressed data can allow initiation of decoding at other than the independently decodable points. Such reentry information preferably would include bit-level pointers and sufficient state information to initialize the decoder properly. For example, in the context of a JPEG image, in addition to the typical information available to the decoder that has been passed in earlier markers, the reentry information for a given MCU boundary may include: a bit-level pointer to the first block's DC Huffman code, the position of the output, and a DC predictor for each component of the MCU.

49 Claims, 43 Drawing Sheets

FOREIGN PATENT DOCUMENTS

WO      WO96/36941      11/1996

OTHER PUBLICATIONS

Joan L. Mitchell, Ph.D., William Pennebaker, Ph.D., "JPEG", *1993 AIIM Show and Conference—Imaging: Transformation at Work*, Chicago, Illinois (Apr. 5-8, 1993).

K.L. Anderson, J.L. Mitchell, G. Goertzel, W.B. Pennebaker, "Compression of Bilevel Images."

P. J. Sementilli, "Image Processing in the Quantized DCT Domain," *IBM Confidential* (Nov. 11, 1992).

Joan L. Mitchell, "Facsimile Image Coding," *AFIPS—Conference Proceedings, National Computer Conference*, vol. 49, 423-426 (1980).

W.B. Pennebaker, G. Goertzel, J.L. Mitchell, "Recent Advances in Data-Conversion Facsimile Techniques," *Journ. Appl. Photog. Eng.*, vol. 6, No. 4, 93-96 (Aug. 1980).

S.T. Klein, Y. Wiseman, "Parallel Huffman Decoding," *IEEE Computer Society Proceedings, Data Compression Conference*, Snowbird, Utah (Mar. 28-30, 2000).

W.B. Pennebaker, J.L. Mitchell, "JPEG Still Image Data Compression Standard," Chapman & Hall, International Thomson Publishing (1993), ISBN 0-442-01272-1, pp. 73-78.

W.B. Pennebaker, J.L. Mitchell, "JPEG Still Image Data Compression Standard," Chapman & Hall, International Thomson Publishing (1993), ISBN 0-442-01272-1, Chapter 7, JPEG Syntax and Data Organization, pp. 97-120.

W.B. Pennebaker, J.L. Mitchell, "JPEG Still Image Data Compression Standard," Chapman & Hall, International Thomson Publishing (1993), ISBN 0-442-01272-1, Chapter 8, Entrophy Coding Concepts, pp. 135-147.

W.B. Pennebaker, J.L. Mitchell, "JPEG Still Image Data Compression Standard," Chapman & Hall, International Thomson Publishing (1993), ISBN 0-442-01272-1, Chapter 9, JPEG Binary Arithmetic Coding, pp. 149-167.

M. Rabbani, P.W. Jones, "Digital Image Compression Techniques," *Tutorial Texts in Optical Engineering*, SPIE Optical Engineering Press (1991), ISBN 0-8194-0648-1, vol. TT7, Chapter 3, Variable-Length Codes, pp. 22-32.

"Algorithm for Rotating an Image in Run End Form," *IBM Tech. Disclosure Bulletin* (Nov. 1989), pp. 299-302.

K.L. Anderson, F.C. Mintzer, G. Goertzel, J.L. Mitchell, K.S. Pennington, W.B. Pennebaker, "Binary-Image-Manipulation Algorithms in the Image View Facility," *IBM J. Res. Develop.* (Jan. 1987), vol. 31, No. 1, pp. 16-31.

J.L. Mitchell, W.B. Pennebaker, "Software Implementations of the Q-Coder," *IBM J. Res. Develop.* (Nov. 1988), vol. 32, No. 6, pp. 753-774.

W.B. Pennebaker, J.L. Mitchell, "Probability Estimation for the Q-Coder," *IBM J. Res. Develop.* (Nov. 1988), vol. 32, No. 6, pp. 737-752.

J.L. Mitchell, W.B. Pennebaker, "Optimal Hardware and Software Arithmetic Coding Procedures for the Q-Coder," *IBM J. Res. Develop.* (Nov. 1988), vol. 32, No. 6, pp. 727-736.

W.B. Pennebaker, J.L. Mitchell, G.G. Langdon, Jr., R.B. Arps, "An Overview of the Basic Principles of the Q-Coder Adaptive Binary Arithmetic Coder," *IBM J. Res. Develop.* (Nov. 1988), vol. 32, No. 6, pp. 717-726.

R.B. Arps, T.K. Truong, D.J. Lu, R.C. Pasco, T.D. Friedman, "A Multi-Purpose VLSI Chip for Adaptive Data Compression of Bilevel Images," *IBM J. Res. Develop.* (Nov. 1988), vol. 32, No. 6, pp. 775-795.

M.J. Slattery, J.L. Mitchell, "The Qx-coder," *IBM J. Res. Develop.* (Nov. 1998), vol. 42, No. 6, pp. 767-784.

T.C. Bell, J.G. Cleary, I.H. Witten, "Text Compression," Prentice Hall PTR (1990), ISBN 0-13-911991-4, Chapter 8, Dictionary Techniques, pp. 206-243.

J. Banks, "Integrated Circuit Cards (ICCs) and Optical Memory Cards (OMCs) Hold a Lot in Store," *ISO Bulletin* (Nov. 1993), vol. 24, No. 11, pp. 9-11.

R. Hunter, A.H. Robinson, "International Digital Facsimile Coding Standards," (Invited Paper) *Proceedings of the IEEE, Special Issue on digital encoding of graphics* (Jul. 1980), vol. 68, No. 7, pp. 854-867.

D.A. Huffman, "A Method for the Construction of Minimum-Redundancy Codes," *Proceedings of the I.R.E.* (Sep. 1952), vol. 40, No. 9, pp. 1098-1101.

W.B. Pennebaker, J.L. Mitchell, "A Fast-Moving International Standard for Still Image Compression," *ISO Bulletin* (Nov. 1993), vol. 24, No. 11, pp. 2-8.

\* cited by examiner

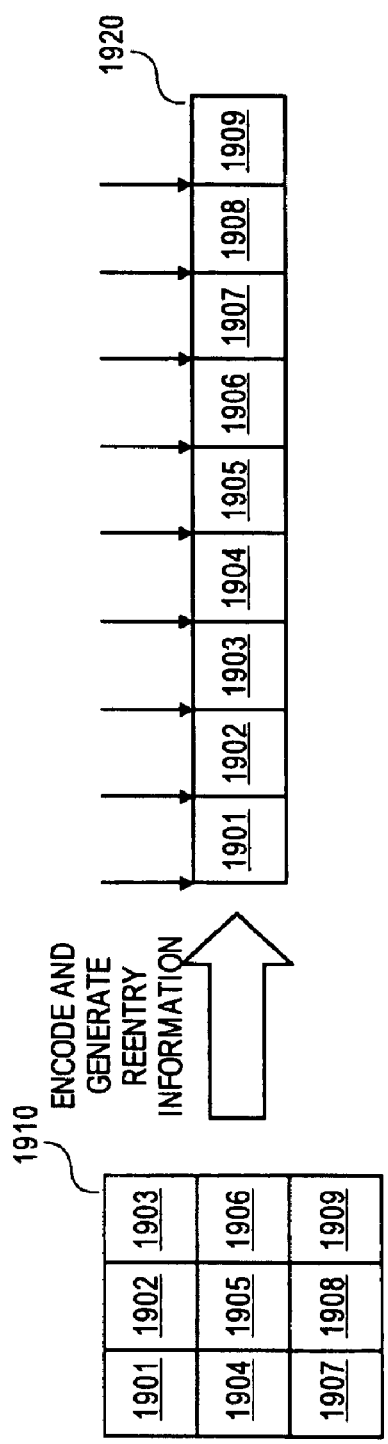
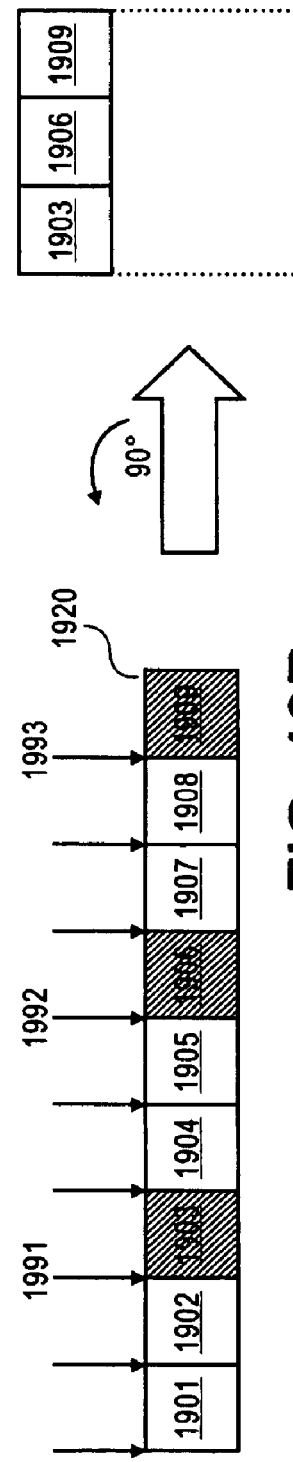
FIG. 19A
FIG. 19B

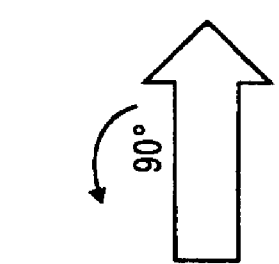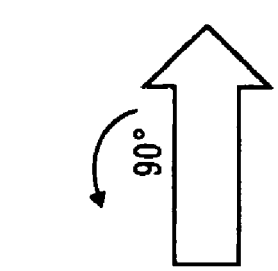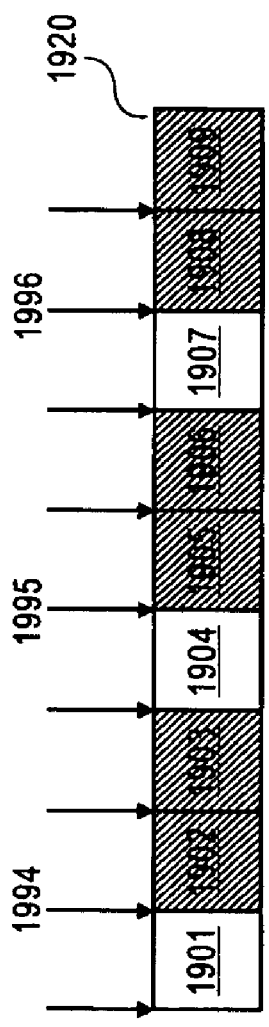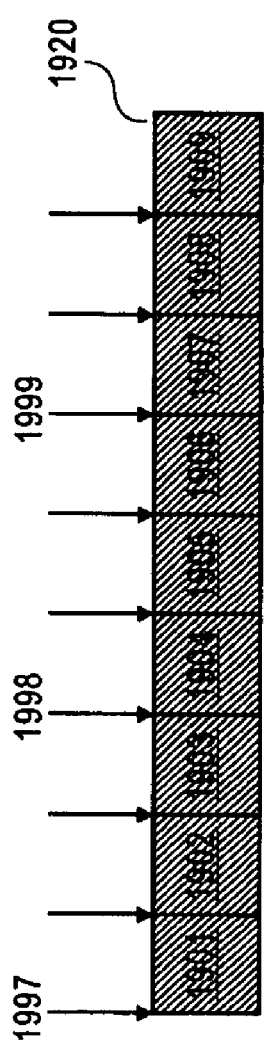
FIG. 19C
FIG. 19D

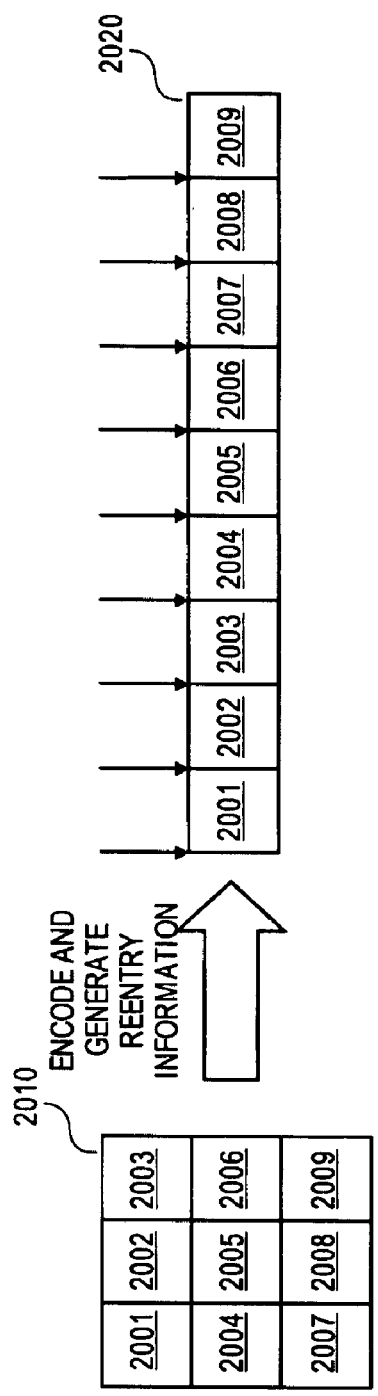
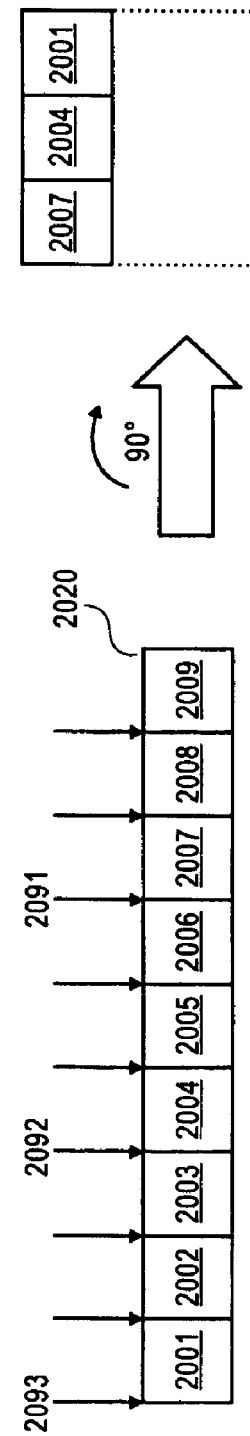
FIG. 20A
FIG. 20B

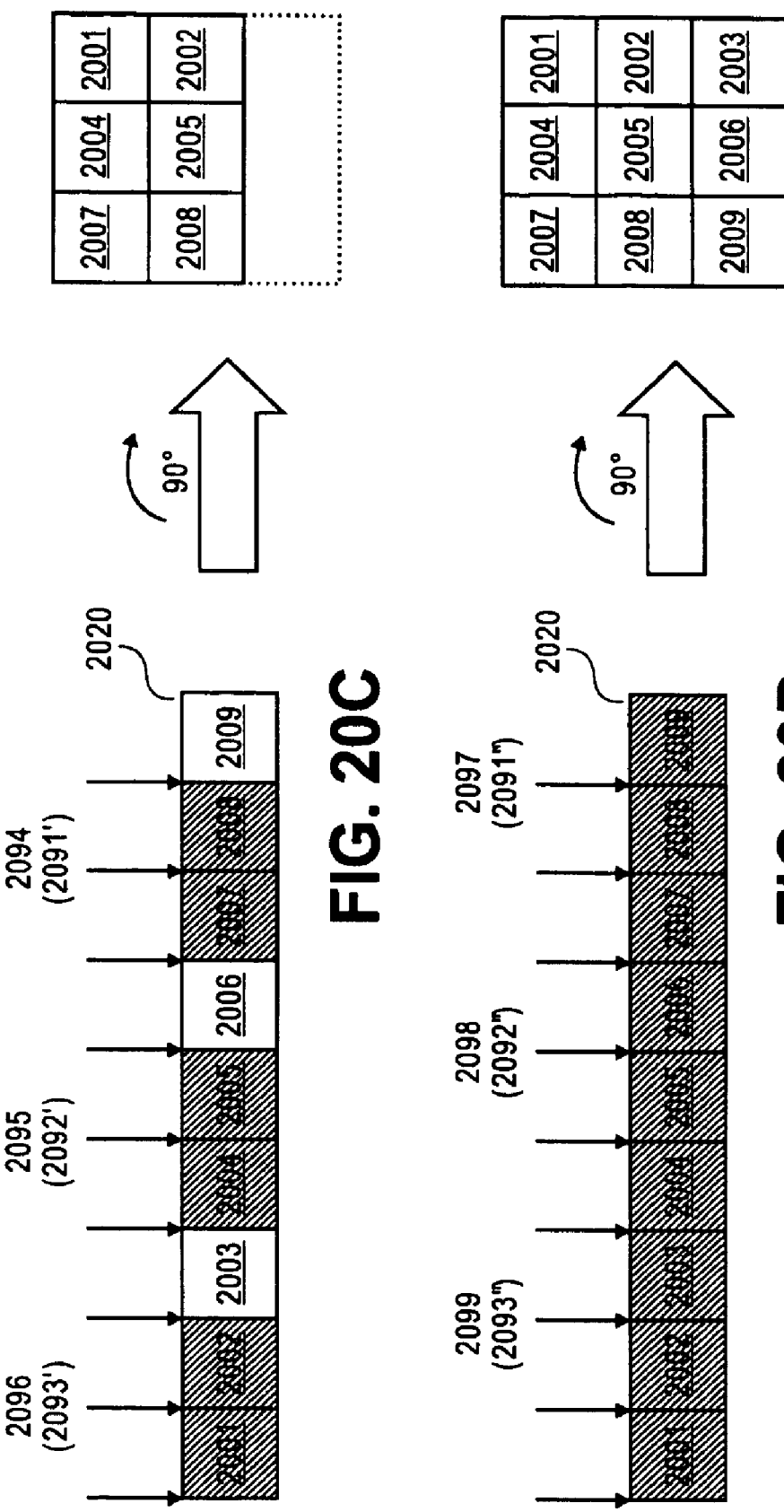

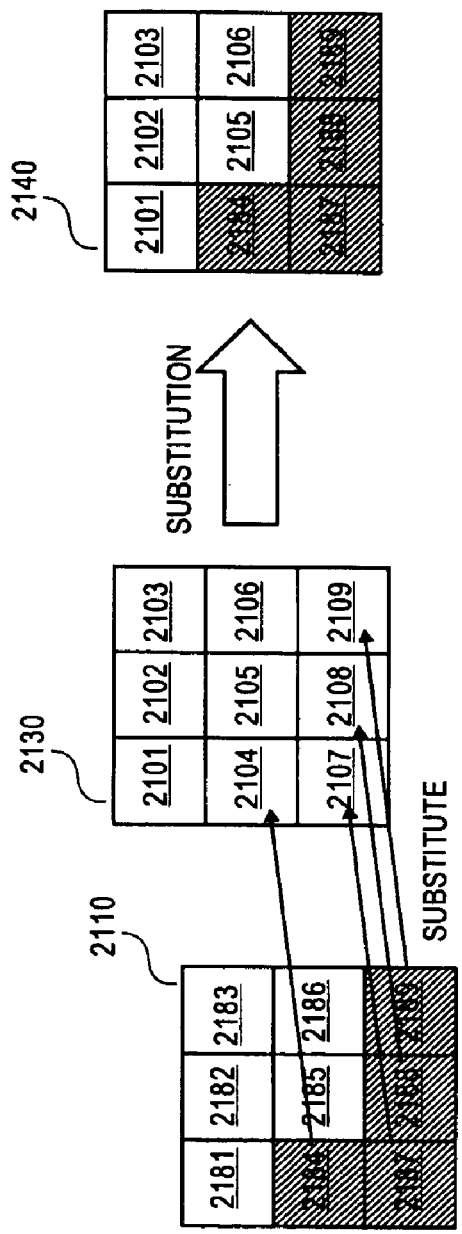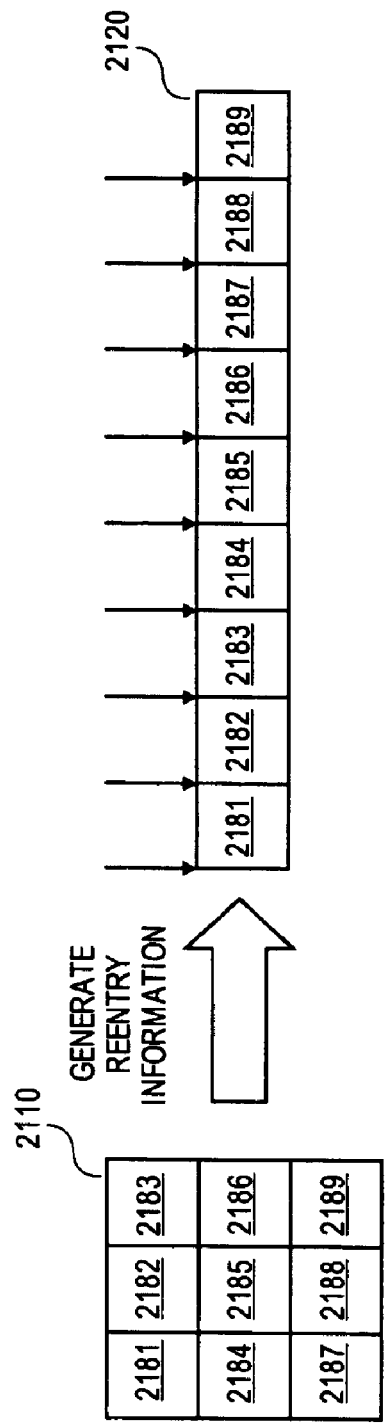
FIG. 21A
FIG. 21B

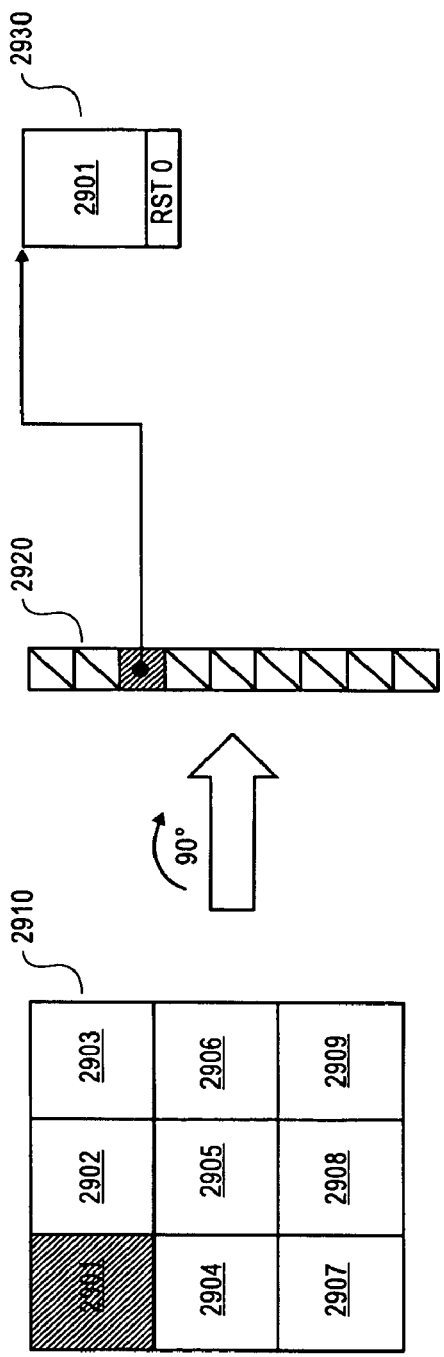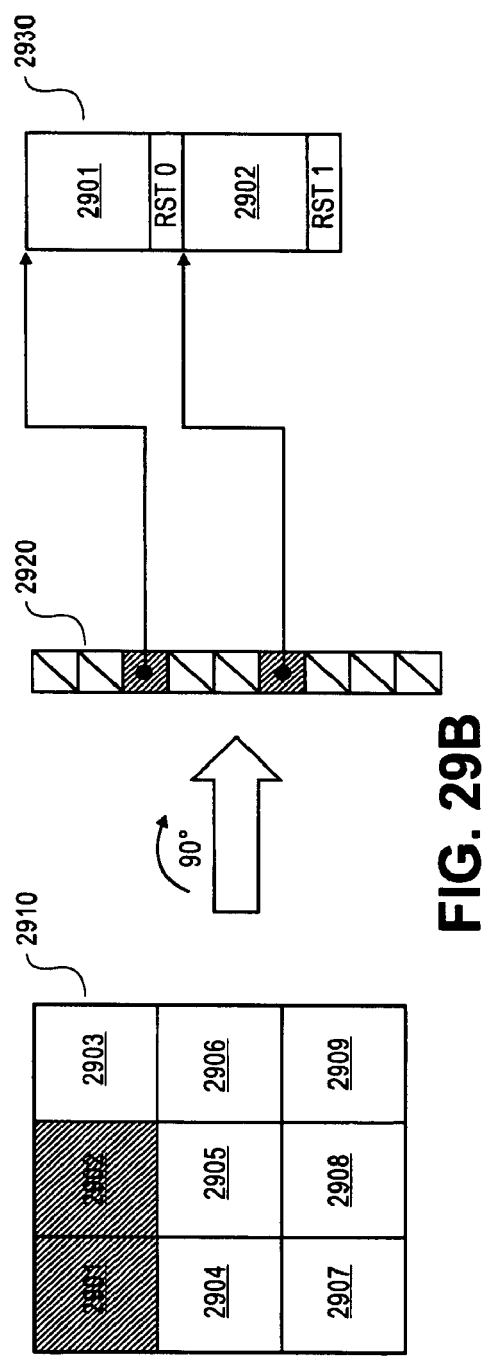
FIG. 29A
FIG. 29B

REORDERING OF COMPRESSED DATA

CROSS REFERENCE TO RELATED APPLICATIONS

The present application is related to U.S. application Ser. No. 09/569,117 filed May 10, 2000, now U.S. Pat. No. 6,941,019, by Joan L. Mitchell and Nenad Rijavec for "Reentry into Compressed Data."

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The invention relates generally to the manipulation of compressed data. More specifically, the invention relates to apparatus and methods for encoding independently decodable pieces of compressed data to accommodate reordering of the pieces before or after such manipulation. Embodiments of the present invention are thought to be particularly advantageous for high speed printing applications where the compressed data stream represents images and there are requirements to minimize storage, allow parallel decoding, and achieve high throughput.

2. Description of the Related Art

The purpose of data compression is to represent source data with less data in order to save storage costs or transmission time and costs. Data compression is regarded as "lossless" if the reconstructed data matches the source data. However, in applications where some loss is acceptable, such as pictures, approximating the source data with the reconstructed data, rather than reproducing it exactly achieves a more effective compression. This is called "lossy" compression.

The two basic components of data compression systems are the encoder and the decoder. The encoder compresses the source data (the original digital information) and generates a compressed data stream. The compressed data stream may be either stored or transmitted, but at some point is fed to the decoder. The decoder recreates or reconstructs the data from the compressed data stream. In general, a data compression encoding system can be broken into two basic parts: an encoder model and an entropy encoder. (Some like to have a third part, e.g., a statistical model, which, for simplicity, is currently included in the entropy encoder.) The encoder model generates a sequence of descriptors that is an abstract representation of the data. The entropy encoder takes these descriptors, converts them into symbols, and compresses the symbols taking advantage of the statistics to form compressed data. Similarly to the encoder, the decoder can be broken into basic parts that have an inverse function relative to the parts of the encoder.

Generally, for lossy compression, it is the encoder model and the decoder model that introduce the loss. Generally, the entropy encoding and decoding are lossless. In such cases, lossless transcoding becomes possible. The compressed data is entropy decoded to intermediate data, which may or may not be identical to the descriptors, and then the intermediate data can be fed into a different entropy encoder to create a different compressed data steam. Examples of entropy encoders are Huffman encoders and arithmetic encoders. Converting between these methods is an example of transcoding. For a more detailed discussion of Huffman variable-length coding see: M. Rabbani and P. W. Jones, *Digital Image Compression Techniques*, Tutorial Texts in Optical Engineering, Vol. TT7, SPIE Optical Engineering Press, Bellingham, Wash. 1991; and W. B. Pennebaker and J. L. Mitchell, *JPEG: Still Image Data Compression Standard*, Van Nostrand Reinhold, N.Y. (1993).

Without loss of generality, most examples herein will be presented with respect to images as the source data. In the context of high speed printing, data compression is key to lessening the amount of data transmission. As a practical matter, large-scale digital color printing has been unaffordable until recently for most applications. Consequently, the field of image processing has not yet had to address many of the problems associated with efficiently processing the absolute torrent of data required by continuous-tone color images.

An image, in the context of this application, is an electronic representation of a picture as an array of raster data. Image data can be generated by a computer program, or formed by electronically scanning such items as illustrations, drawings, photographs, and signatures. For monochrome images each sample in the array of raster data has an intensity value. For traditional facsimile images only two values are allowed (black or white) and so 1-bit per sample is sufficient. For continuous-tone pictures 8-bits per sample is more common. Some applications such as medical images require higher precision and use 12 bits per sample. Color images use three or four values for each position in the raster array. Typically scanners and displays use red, green, and blue (RGB) as primary colors or components. Printers often use cyan, magenta, and yellow (CMY) inks or toners. Sometimes a fourth black ink or toner is added (CMYK). The components may be interleaved (RGB,RGB,RGB) or separated into multiple arrays (RRR,BBB,GGG).

The size of digital images is rapidly increasing. In the late 1970s, 8.5 inch×11-inch facsimile images were standardized at 1728 picture elements (pels) per line by about 1100 lines (nominally 200 pels/inch by 100 lines/inch). A finer resolution of 200 lines/inch was also allowed. Now, many digital printers print binary images at 600 pels/inch by 600 lines/inch, an order of magnitude increase in data. Some of today's printers are supporting 1200 pels/inch by 1200 lines/inch.

Data compression was essential to making digital facsimile practical. Two international facsimile data compression standards were developed. The CCITT Group 3 (G3) facsimile machines were made for the public phone network and originally expected errors during transmission. Group 4 (G4) facsimile machines were intended for data networks and assumed that transmissions were error-free.

The G3 standard Modified Huffman (MH) algorithm coded each binary line one-dimensionally (i.e., independently) with unique end-of-line (EOL) codes separating each line. Transmission errors were detected when the decoded lines did not match the expected line length. Since the compression process could be restarted on the next line by searching for the EOL, only one line was corrupted. The G3 Modified READ (MR) algorithm encoded some lines two-dimensionally (i.e. with reference to the previous line) and could not be restarted except at the one-dimensional lines. A tag bit after the EOL code indicated whether the next line was coded with one-dimensionally or two-dimensionally. The G3 standard required that at least every other line be coded with MH (and thus restartable after errors) for the standard resolution and at least every fourth line be coded with MH for the finer resolution. In the absence of transmission errors, the G3 algorithms are lossless (i.e., the decoder's output image exactly matches the encoder's input image).

G4 machines used the Modified Modified READ (MMR) data compression algorithm. MMR assumed an all white history line before the top image line and encoded all lines two-dimensionally (i.e., with reference to the history line) using the same two-dimensional codes as MR. The EOL codes were not used because transmission was assumed to be error-free. The G4 algorithm was soon extensively used in the error-free computer environments too.

IBM MMR was derived from the G3 MR algorithm before the G4 MMR standard was established. It is defined in K. L. Anderson, F. C. Mintzer, G. Goertzel, J. L. Mitchell, K. S. Pennington, and W. B. Pennebaker, "Binary Image Manipulation Algorithms in the Image View Facility," *IBM J. Res. Develop.*, vol. 31, 16–31 (1987). The first line is coded exactly like the first line of G3 MR starting the compressed data with an EOL with a 1-D tag. The first line is 1-D coded without the need for a history line. An EOL with a tag follows the first compressed line of data. If the tag indicates that 2-D coding follows, an arbitrary number of lines are encoded the same as G4 MMR. EOLs with 1-D or 2-D tags are allowed to be encoded at the start of any line. After the 1-D tag, the line is compressed with MH and must be followed by another EOL. The IBM MMR compressed data terminates with six EOLs with 1-D tags just like G3 MR.

Detailed examples of such data compression and decompression algorithms are given in: J. L. Mitchell, K. L. Anderson, and G. Goertzel, "Method for Encoding and Decoding a Digital Image," U.S. Pat. No. 4,725,815 issued Feb. 16, 1988; and J. L. Mitchell, K. L. Anderson, and G. Goertzel, "Method for Encoding and Decoding a Digital Image," U.S. Pat. No. 4,888,645 issued Dec. 19, 1989. The use of intermediate data called "run ends" is disclosed in the above. Rather than the individual bits representing the source image, the encoder model converts each raster line into a sequence of numbers that represent the distance from the left edge of the last pel in each run. An example of raster to run end conversion is given in: K. L. Anderson, G. Goertzel, and J. L. Mitchell, "A Method for Converting a Bit Map of an Image to a Run Length or Run End Representation," U.S. Pat. No. 4,610,027 issued Sep. 2, 1986. The entropy encoder takes the run ends and converts them into Huffman codes according to the appropriate standard.

Adaptive Bilevel Image Compression (ABIC) is a lossless binary arithmetic coding algorithm. For more details, refer to R. B. Arps, T. K. Truong, D. J. Lu, R. C. Pasco, and T. D. Friedman, "A multi-purpose VLSI chip for adaptive data compression of bilevel images," *IBM J. Res. Develop.*, Vol. 32, 775–795 (1988) and to G. G. Langdon Jr., J. L. Mitchell, W. B. Pennebaker, and J. J. Rissanen, entitled "Arithmetic Coding Encoder and Decoder System", U.S. Pat. No. 4,905,297 issued Feb. 27, 1990.

ABIC encodes an image as one compressed data stream. Unlike the G3 MH, G3 MR, or the Joint Bi-Level Image Experts Group (JBIG) encoding algorithm, an ABIC compressed image has no markers or EOL codes. Decoding must be sequentially from the upper left pel to the bottom right pel in raster scan order.

The Joint Bi-Level Image Experts Group (JBIG) standardized the next generation facsimile data compression technique based on arithmetic coding. JBIG-1 allows for byte-aligned markers to separate the compressed data and identify strips of predetermined number of lines. The SDNRM marker (0xFF02) restarts the arithmetic coder A-register and C-register for the next stripe but keeps the probability estimates and uses the previous line(s) as history. The compressed data also starts byte-aligned. The SDRST marker (0xFF03) starts coding as if this next line were a new image. Thus, the SDRST identifies an independently decodable piece of compressed data that follows. The SDRST is required at the end of bit planes. This allows the compressed data to be shuffled without decoding to convert between stripes organized by bit plane and stripes organized by full width rectangles of multiple-bit image. Also the markers allow shuffling of the progressively encoded JBIG-1 image to shuffle the multiple resolutions of compressed data organized by resolution layer to compressed data organized by full-width regions of the image. Stripes must occur at a fixed number of complete lines except at the bottom of the image. Consequently, there is no ability to reenter the compressed data stream within a line. Stripe boundaries are selected at the encoder and are maintained for all resolution levels.

Compression of continuous-tone color images can be lossless, but the 24-(three 8-bit component colors) to 32-(four 8-bit component colors) fold increase in the data makes lossy compression often more practical. The JPEG (Joint Photographic Experts Group) and MPEG (Moving Picture Experts Group) standards are examples of lossy data compression standards. See generally: W. B. Pennebaker et. al.; J. L. Mitchell, W. B. Pennebaker, C. E. Fogg, and D. J. LeGall, *MPEG Video Compression Standard*, Chapman & Hall, N.Y. (1997); B. G. Haskell, A. Puri, and A. Netravali, *Digital Video Compression Standard, An Introduction to MPEG-2*, Mitchell & Pennebaker, Editors, Chapman & Hall, N.Y. (1997); and K. R. Rao and J. J. Hwang, *Techniques and Standards for Image, Video, and Audio Coding*, Prentice Hall PTR, Upper Saddle River, N.J. (1996).

Both the MPEG and JPEG standards employ transform coding. Each color component is divided up into 8×8 blocks. The forward Discrete Cosine Transform (FDCT) of each block is performed. The transform coefficients are then quantized. This step introduces the largest loss as the quantized coefficients are rounded to integers. Then a lossless entropy coding technique (Huffman coding for MPEG and baseline JPEG or also arithmetic coding for JPEG) encodes the quantized integers. The decoder performs the entropy decoding to recover the quantized coefficients. Then an inverse quantization (or dequantization) step multiplies each coefficient by its quantization. The dequantized coefficients are fed to an inverse Discrete Cosine Transform (IDCT) to reconstruct the 8×8 samples in the block.

JPEG employs the concept of a "minimum coded unit" (MCU), which refers to a group of one or more DCT blocks in lossy coding and samples in lossless coding. In JPEG, entropy coding is always performed on a complete MCU. MPEG has a similar concept and calls it a macroblock.

JPEG images contain byte-aligned "markers." A marker is a unique code that can be located by scanning the compressed data stream in which it is embedded. In JPEG, markers are unique byte-aligned codes that can be used to identify the location and purpose of header and entropy-coded segments within an image. A marker comprises a marker code that identifies the function of the particular segment it precedes and a prefix, i.e., 0xFF. Most JPEG markers are followed by length fields and communicate header information. A few markers such as the Restart Markers indicate where the image data can be restarted and thus independently encoded or decoded. The Restart Markers include in their three least significant bits a modulo eight counter. This enables detection of any corruption of a previous Restart Marker as part of an error recovery mechanism.

The MPEG video frames often depend upon previous or future frames. At the start of independent frames (I-frames) the decoding is restartable. The MPEG syntax has unique 32-bit byte-aligned start codes. The sequence header, group-of-pictures header, picture header, and slice header all have their own start code. MPEG I-frames are also restartable at the slice headers.

An overview of audio coding with some details regarding MPEG audio is given in Section 10.3 entitled "Audio coding" of Rao et. al.

Various text compression algorithm are described in T. C. Bell, J. G. Cleary, and I. H. Witten, *Text Compression*, Prentice Hall PTR, Englewood Cliffs, N.J., (1990). Lemple-Ziv (LZ) compression techniques tend to split into two types LZ1 and LZ2. The LZ1 keeps a history of the last N bytes and tries to code the data as a pointer into the history buffer followed by the number of matching bytes. Otherwise, it signals that it is going to send the raw data. LZ2 type compression, e.g., LZW, constructs a dictionary of patterns already encountered in the data. After each repeat of a pattern, a new pattern consisting of the old pattern extended by one character is added to the dictionary.

Images need to be transferred to a print server in compressed form; and after manipulation by the print server, the print server often needs to recompress the manipulated image. This is particularly important if the printer controller has only hardware decoding and the bandwidth between the print server and the printer controller is inadequate.

While JPEG has a structure that supports independently decodable pieces of compressed data between Restart Markers, going all the way to the real domain is time consuming and wasteful. The markers are very helpful to enable parallel encoding and/or decoding starting at marker boundaries. It should be noted that the encoder can only place Restart Markers at fixed intervals in the source data and consequently the Restart Markers may not be optimally placed for the decoder. To change the placement of the Restart Markers would require at least a transcoding of the compressed data stream.

An example of arbitrary parallel decoding is given in S. T. Klien et al., S. T. Klien and Y. Wiseman, *Parallel Huffinan Decoding*, Proceedings: Data Compression Conference, pp. 383–392, Snowbird, Utah, (2000), (hereinafter "Klien et al."). Klien et al. describe a parallel algorithm for decoding a Huffinan encoded image that exploits the tendency of Huffinan codes to resynchronize quickly. When more than one processor is available, the compressed data stream can be split into pieces, and each processor can be assigned one piece of the compressed data stream for decompression. Klien et al. suggest letting each processor overflow beyond its assigned piece into the next piece until its results synchronize with the processor that has been assigned to the next piece of compressed data. Once synchronization has been detected, the processor can stop or be assigned another piece. Synchronization is detected because each processor has saved the index of the last bit in each codeword. The processor of the previous piece can examine this list. Importantly, the assigned pieces do not necessarily begin at codeword boundaries. Therefore, the first codes are expected to be erroneously decoded until the Huffinan property of self-synchronization occurs. When applied to JPEG compressed images, the position and the DC predictors of the partially decoded image are guessed and subsequently corrected after synchronization has been established. Further, the approach suggested by Klien et al. has no additional information available as they try to reenter the compressed data stream at arbitrary boundaries. Consequently, correct display of the image must wait until all synchronization points have been established.

One very common image manipulation operation is rotation by a multiple of 90°. For example, images are often rotated to accommodate a particular page orientation, e.g., landscape or portrait, and/or to accommodate particular user-specified job attributes, such as impositioning. While current print servers typically support various forms of image manipulation, these manipulations may introduce multi-generation losses and make inefficient use of processing resources. As discussed further below, image rotation processes must typically accumulate the whole image in memory or on disk before the rotated image can be output. When rotating images, often the first pixels read by the rotation process contain some of the last pixels to be output.

Examples of prior art rotation of binary images in the real domain are: K. L. Anderson, F. C. Mintzer, G. Goertzel, and J. L. Mitchell, entitled "Method for Rotating a Binary Image", U.S. Pat. No. 4,627,020 issued Dec. 2, 1986; and D. R. Pruett, G. Goertzel, and G. R. Tompson (sic), entitled "Method for Rotating a Binary Image," U.S. Pat. No. 4,837,845 issued Jun. 6, 1989. A disadvantage of working in the real domain is that the entire image has to be decompressed, temporarily buffered, rotated, and then recompressed. This is costly in terms of both storage and time.

The above patents disclose storing the full image plus a much smaller temporary buffer. When the full image cannot be in contiguous storage, the method disclosed in K. L. Anderson and J. L. Mitchell, "System for Rotating Binary Images," U.S. Pat. No. 4,658,430 issued Apr. 14, 1987 may be used. However, it still needs sufficient storage for the entire source image plus an additional buffer.

To avoid the time to decode all the way to the raster image, rotation on run end data is disclosed in K. L. Anderson, "Fast Algorithm for Rotating an Image in Run End Form," *IBM Technical Disclosure Bulletin*, Vol. 32 no. 6B pp. 299–302 (1989). For typewritten text documents this run end data is significantly smaller than the source data. It has the disadvantage, however, that in the worst case there is a 16 to 1 expansion for alternating single pel runs since each run end is saved in 16 bits.

Rotation of continuous-tone images is less complicated because the pixels are generally on byte-boundaries, on the other hand they are likely to be 8 to 24 times larger. In addition, decoding to the real domain, and after rotation, reencoding is CPU intensive. An additional complexity is that lossy decoding and then reencoding has a multi-generation problem, namely the recompressed data doesn't match the previously compressed data.

The aforementioned approach is limited in that it converts between the transform domain and the real domain to prepare for the rotation process. W. B. Pennebaker, I. R. Finlay, J. L. Mitchell, K. L. Anderson, P. J. Sementilli, Jr. entitled "Intermediate Format for Representing Transform Data" Japanese patent JA02698034 issued Sep. 19, 1997 discloses lossless rotation of JPEG images in the transform domain. The entropy-decoded DCT transform coefficients are transposed within a block, some signs are changed, and the blocks must still be reordered. While CPU cycles have been drastically cut by avoiding the dequantization, IDCT, FDCT, and requantization, as above, the intermediate data could potentially expand (e.g., 2 to 1) and the buffering requirements are still large.

BRIEF SUMMARY OF THE INVENTION

Apparatus and methods are described for encoding independently decodable pieces of compressed data to accommodate reordering of the pieces of compressed data before or after manipulation. According to one embodiment, independently decodable pieces of compressed data are provided in correct output order. Data is received. Then, independently decodable pieces of the data are encoded to produce a compressed data stream in an order than differs from the correct output order. Finally, the independently decodable pieces of compressed data are reordered into the correct output order. Advantageously, in this manner, the encoder may operate on the data in a way that is efficient in terms of its internal buffering and without regard for the needs of later processing stages.

According to another embodiment, information from a compressed data stream is manipulated and reencoded out of order. Desired information is selectively decoded form the compressed data stream. The decoded information is manipulated. Then, the manipulated information is reencoded into independently decodable pieces of compressed data to produce a compressed data stream in an order that differs from the correct output order.

According to yet another embodiment, an efficient technique is provided for rotating Joint Photographic Experts Group (JPEG) compressed data. JPEG compressed data is received. Desired information from the JPEG compressed data is entropy decoded. Then, rotation is performed in the transform domain by transposing coefficients of minimum coded units (MCUs) in the decoded information and appropriately negating certain coefficients' signs of the MCUs. Finally, the rotated information is entropy encoded into independently decodable pieces of compressed data to produce a compressed data stream in an order that differs from the correct output order.

Other features of the present invention will be apparent from the accompanying drawings and from the detailed description that follows.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which:

FIGS. 19A–19D conceptually illustrate the processing of FIGS. 17 and 18 for a 270° rotation.

FIGS. 20A–20D conceptually illustrate the processing of FIGS. 17 and 18 using an optimization for 90° rotation.

FIGS. 21A–21D conceptually illustrate substitution processing according to one embodiment of the present invention.

FIGS. 29A–29H conceptually illustrate the scanned image rotation processing of FIGS. 27 and 28.

DETAILED DESCRIPTION OF THE INVENTION

Figure 1:
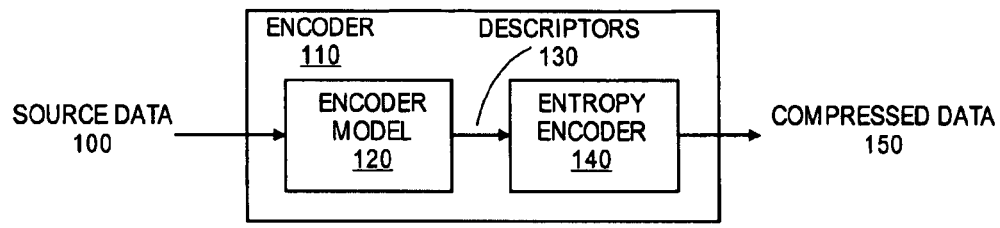
FIG. 1 is a simplified block diagram of a typical (prior art) encoder.

Apparatus and methods are described for encoding independently decodable pieces of compressed data to accommodate reordering of the pieces of compressed data before or after manipulation. Because of the absolute torrent of data that requires processing in a very short computational window, efficient manipulation of compressed images, such as rotation, is important in the context of large-scale digital color printing, for example.

In brief, according to one embodiment of the present invention a two stage process may be employed in processing a compressed data stream. Rather than simply sequentially processing a compressed data stream according to the order in which it appears, a two stage technique is employed which allows portions of the reconstructed data to be extracted from different parts of the compressed data stream. During a reentry information generation stage, a scan is made through the compressed data stream to identify locations in the compressed data and preserve associated state information to allow subsequent decoding to resume at those locations. The locations identified may represent convenient places at which to reenter the compressed data or they may identify places at which data manipulation is anticipated. For example, reentry information may be provided on a periodic basis, at particular intervals, or reentry information may simply be generated when conditions are considered favorable. During a second stage, the reentry information generated by the first stage is used. Since there are multiple reentry points into the compressed data stream, the entire reconstructed data need not be stored since the reentry points may be used to selectively access desired reconstructed data. Additionally, access to the compressed data stream is no longer restricted to sequential, rather the compressed data steam may be accessed and decoded in an order that is appropriate for a particular data manipulation operation.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product that may include a machine-readable medium having stored thereon instructions that may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

For convenience, various embodiments of the present invention will be described with reference to the JPEG data stream. However, the present invention is not limited to any particular compressed data format. In alternative embodiments, various other compressed data streams may be employed, such as satellite data transmissions, audio, e.g., MPEG audio, video, e.g., MPEG-1 and MPEG-2 video, speech, text, e.g., LZW, and image compressed formats, such as that produced by ITU-T T.4 Group 3 two dimensional coding standard for facsimile (also referred to as G3), and ITU-T T.6 Group 4 two dimensional coding standard for facsimile (also referred to as G4).

Also, while embodiments of the present invention will be described with reference to two particular entropy coding techniques, e.g., Huffinan coding and Arithmetic coding, other entropy coding techniques may be employed. Finally, while only a limited number of presentation devices are specifically referred to herein, such as printers, the method and apparatus described herein are equally applicable to other presentation devices that are capable of producing images on a physical medium, such as displays, facsimile devices, copiers, scanners, and the like. Additionally, the method and apparatus described herein are applicable to other intermediate devices that are capable of retransmission, such as a server, router, bridge, print server, or a base station for satellite or cellular communications, for example.

While embodiments of two-level processing are described in terms of entropy decoders and encoders and models as the two levels, it is contemplated that other one, two or more level processing may be employed. Less than the full number of levels may need to be undone before the manipulation process in which case the encoder would be replaced with a process that redoes as much as the decoder had to undo. An example of a two-level data compression coding scheme without entropy coding could be based upon a hierarchical scheme. For a graphics source image (i.e., computer generated without noise), a 2:1 along each axis reduced version of the graphics source image is first sent in the data stream. The full original-sized image is predicted from a bilinear interpolation 2:1 scale-up in both directions from the reduced image. Each prediction difference can be stored in a byte (i.e., 8-bit modulo arithmetic on the 9-bit prediction difference). Then, along the horizontal axis, traditional run-coding of constant values works well since constant errors in the original image will give zero differences after interpolation of the reduced image. This run-coding does not have to be performed by an entropy coder. Rather, the coding scheme may use fixed-length codes for each run. Alternatively, it might replace repeats of four or more differences that are the same with three differences and the fourth byte interpreted as how many more (from 0–255) will be the same. In this example, the partial decoder removes the run-length codes. After rotation, the partial encoder run-length codes on the new axis, but all of the prediction, interpolation, scale-up, etc. is not affected by the rotation.

Finally, for convenience, embodiments of the present invention will be described with reference to rotation of compressed images. However, such examples are merely illustrative of the power and efficiencies that can be achieved by employing the techniques of the present invention. The applicability of the present invention is not limited to any particular type of data manipulation. In alternative embodiments, various other data manipulations may take advantage of the techniques described herein, such as clipping, substitution, merging, editing, dubbing, etc.

The verbs "print" and "output" in the context of this application, refer broadly to the act of communicating a data stream containing data that is destined for a presentation device or something capable of retransmitting the data stream to a presentation device. These definitions include, but are not limited to, the traditional meaning of print, e.g., sending data to a printer in order to produce character shapes, graphics pictures, images, or other symbols with ink, toner, or the like on a physical medium, such as paper. According to these definitions, data may be said to be "printed" or "output" to various types of presentation devices, such as printers, facsimile devices, fax servers, email servers, pagers, televisions, file viewers, copiers, and other devices that are capable producing images on a physical medium. As used herein, the phase "compressed data" generally refers to any type of encapsulated data that cannot normally be reentered without additional side information or pointers at a granularity finer than a byte.

Encoding, Decoding, and Transcoding Overview

FIG. 1 is a simplified block diagram of a typical (prior art) encoder 110. Source data 100 is input to the encoder 110. The encoder model 120 converts the source data 100 into descriptors 130. The descriptors 130 are input into an entropy encoder 140. Examples of entropy encoders include Huffman encoders and arithmetic coding encoders. The output of the entropy encoder 140 is compressed data 150.

Figure 2:
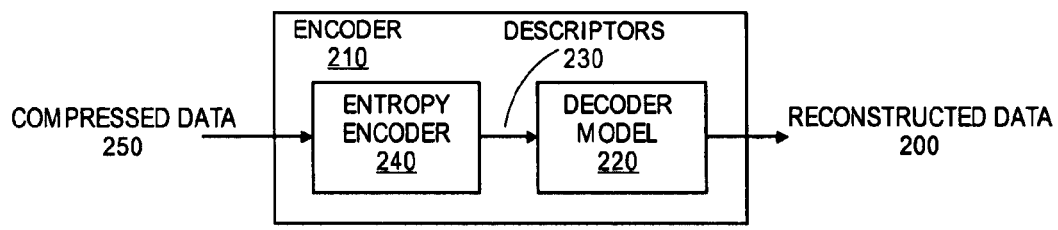
FIG. 2 is a simplified block diagram of a typical (prior art) decoder.

FIG. 2 is a simplified block diagram of a typical (prior art) decoder 210. Each step shown performs essentially the inverse of its corresponding main procedure within the encoder shown in FIG. 1. The compressed data 250 is input to the decoder 210 where it is first processed by an entropy decoder 240 which recovers the descriptors 230 from the compressed data 250. This part of the process is typically lossless. The descriptors 230 are input into a decoder model 220 that outputs reconstructed data 200 which may exactly match the source data 100 (lossless) or only approximate the source data 100 (lossy).

Figure 3:
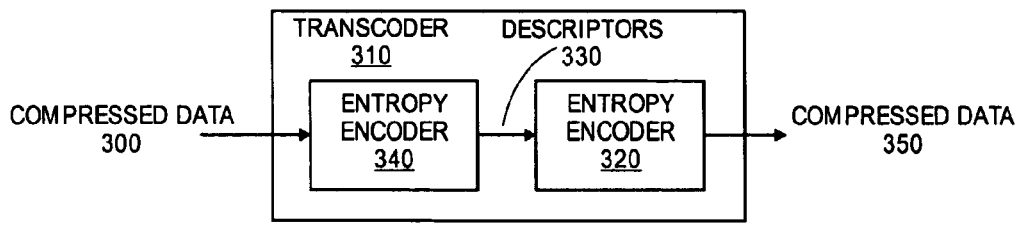
FIG. 3 is a simplified block diagram of a typical (prior art) transcoder.

FIG. 3 is a simplified block diagram of a typical (prior art) transcoder 310. The compressed data 300 is input to the transcoder 310 where it is first processed by an entropy decoder 340 (or other partial decoder) that recovers the descriptors 330 from the compressed data 300. The descriptors 330 are then input into an entropy encoder 320 (or other partial reencoder). The output of the entropy encoder 320 is compressed data 350. Examples of transcoding are converting between Huffman and arithmetic coding for DCT-based JPEG.

Exemplary Presentation Environment

Figure 4:
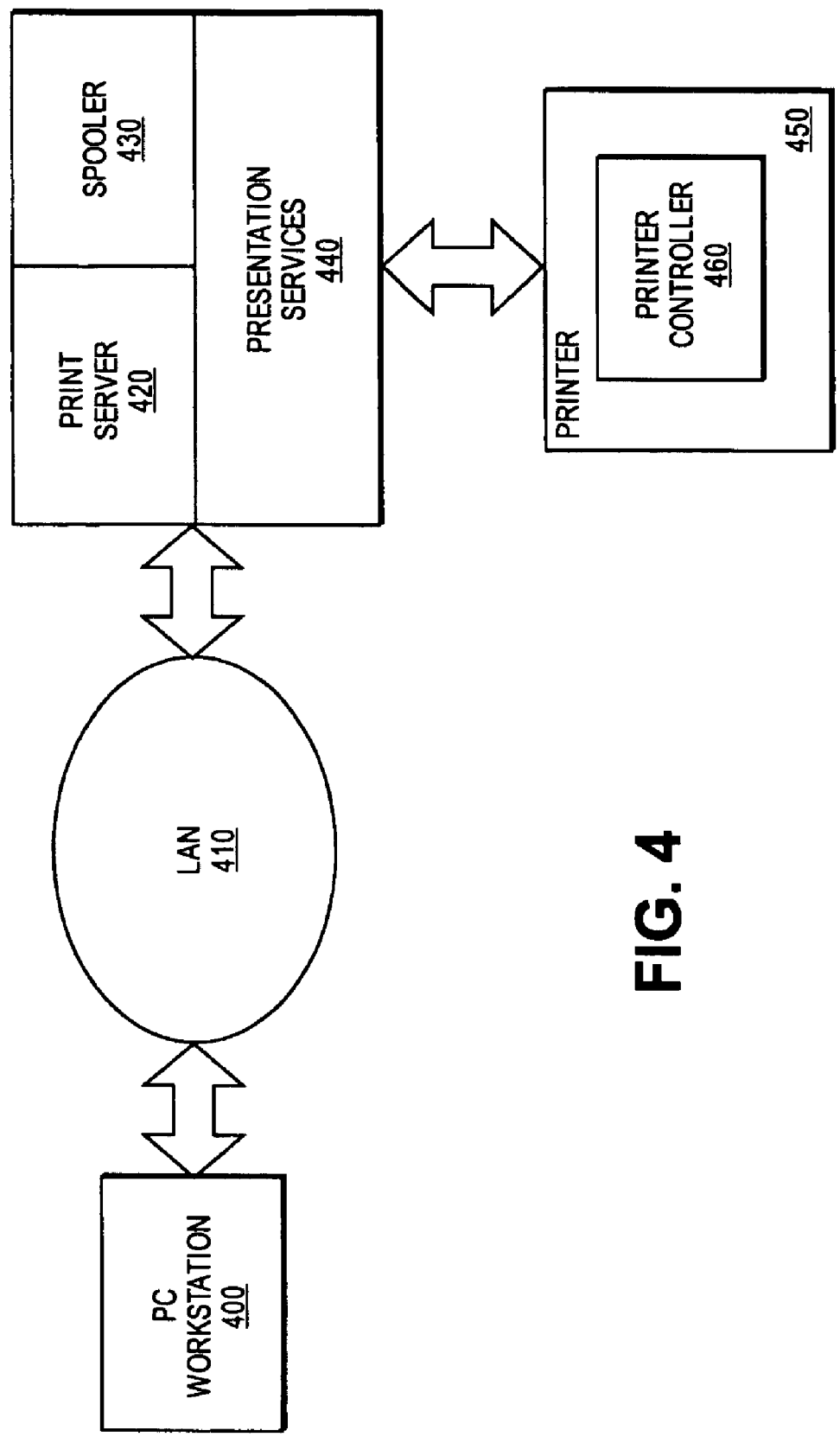
FIG. 4 is a simplified block diagram depicting a local area network (LAN) printing environment.

A simplified printing environment will briefly be described with reference to FIG. 4. In this example, a personal computer workstation 400 is coupled to a print server 420 via a LAN 410. The print server 420 includes a spooler 430 for controlling the spooling of data files and presentation services 440 for generating appropriate commands to drive an attached printer 450. The print server 420 may also include other components that are not shown for performing basic tasks, such as monitoring and configuring attached printers, and providing print job management. At any rate, when the PC workstation 420 has data to print, it sends print data to the print server 420. Among the functions typically provided by a print server is the conversion of the data stream containing the print data to a data stream supported by the printer to which the print data is destined. For instance, the printer 450 may accept the Intelligent Printer Data Stream (IPDS), PostScript, or some other printer data stream. Therefore, in this example, the print server 420 also includes a means for converting between the various input data streams that may be received and the data streams accepted by the printers 450. The print server 420 may also be configured to perform manipulation of compressed images, such as rotation, to allow more efficient processing by the printer 450. Alternatively, the compressed image manipulation processing described herein may be performed local to the printer 450, e.g., by the printer controller 460.

An Exemplary Computer Architecture

Figure 5:
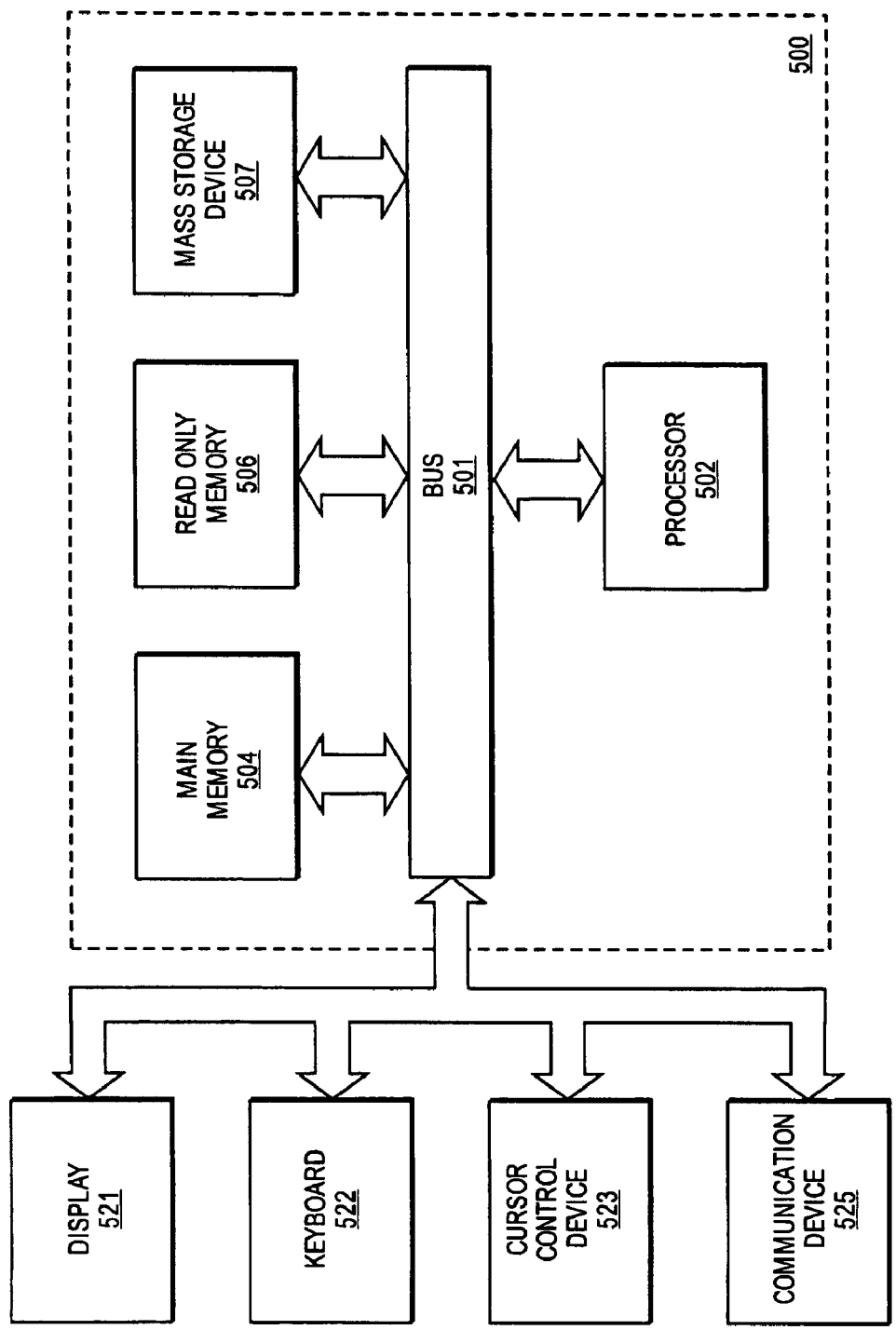
FIG. 5 is an example of a typical computer system upon which one embodiment of the present invention or components thereof may be implemented.

Having briefly described an exemplary environment in which the present invention may be employed, an exemplary machine in the form of a computer system 500 in which features of the present invention may be implemented will now be described with reference to FIG. 5. Computer system 500 may represent a workstation, host, server, print server, or printer controller. Computer system 500 comprises a bus or other communication means 501 for communicating information, and a processing means such as processor 502 coupled with bus 501 for processing information. Computer system 500 further comprises a random access memory (RAM) or other dynamic storage device 504 (referred to as main memory), coupled to bus 501 for storing information and instructions to be executed by processor 502. Main memory 504 also may be used for storing temporary variables or other intermediate information during execution of instructions by processor 502. Computer system 500 also comprises a read only memory (ROM) and/or other static storage device 506 coupled to bus 501 for storing static information and instructions for processor 502.

A data storage device 507 such as a magnetic disk or optical disc and its corresponding drive may also be coupled to bus 501 for storing information and instructions. Computer system 500 can also be coupled via bus 501 to a display device 521, such as a cathode ray tube (CRT) or Liquid Crystal Display (LCD), for displaying information to an end user. Typically, an alphanumeric input device 522, including alphanumeric and other keys, may be coupled to bus 501 for communicating information and/or command selections to processor 502. Another type of user input device is cursor control 523, such as a mouse, a trackball, or cursor direction keys for communicating direction information and command selections to processor 502 and for controlling cursor movement on display 521.

A communication device 525 is also coupled to bus 501. Depending upon the particular presentation environment implementation, the communication device 525 may include a modem, a network interface card, or other well known interface devices, such as those used for coupling to Ethernet, token ring, or other types of physical attachment for purposes of providing a communication link to support a local or wide area network, for example. In any event, in this manner, the computer system 500 may be coupled to a number of clients and/or servers via a conventional network infrastructure, such as a company's Intranet and/or the Internet, for example.

The present invention is related to the use of computer system 500 to direct the execution of one or more software and/or firmware routines to manipulate compressed images as discussed herein. As computer system 500 executes the one or more routines, the processor 502 may access compressed image data stored within main memory 504, ROM 506, or another storage device to manipulate the compressed image in accordance with desired presentation attributes. Importantly, the present invention is not limited to having all of the routines located on the same computer system. Rather, individual objects, program elements, or portions thereof may be spread over a distributed network of computer systems. Additionally, it is appreciated that a lesser or more equipped computer system than the example described above may be desirable for certain implementations. Therefore, the configuration of computer system 500 will vary from implementation to implementation depending upon numerous factors, such as price constraints, performance requirements, and/or other circumstances. For example, according to one embodiment of the present invention, an embedded printer controller may comprise only a processor and a memory for storing static or dynamically loaded instructions and/or data.

Reentry Processing Overview

Figure 6:
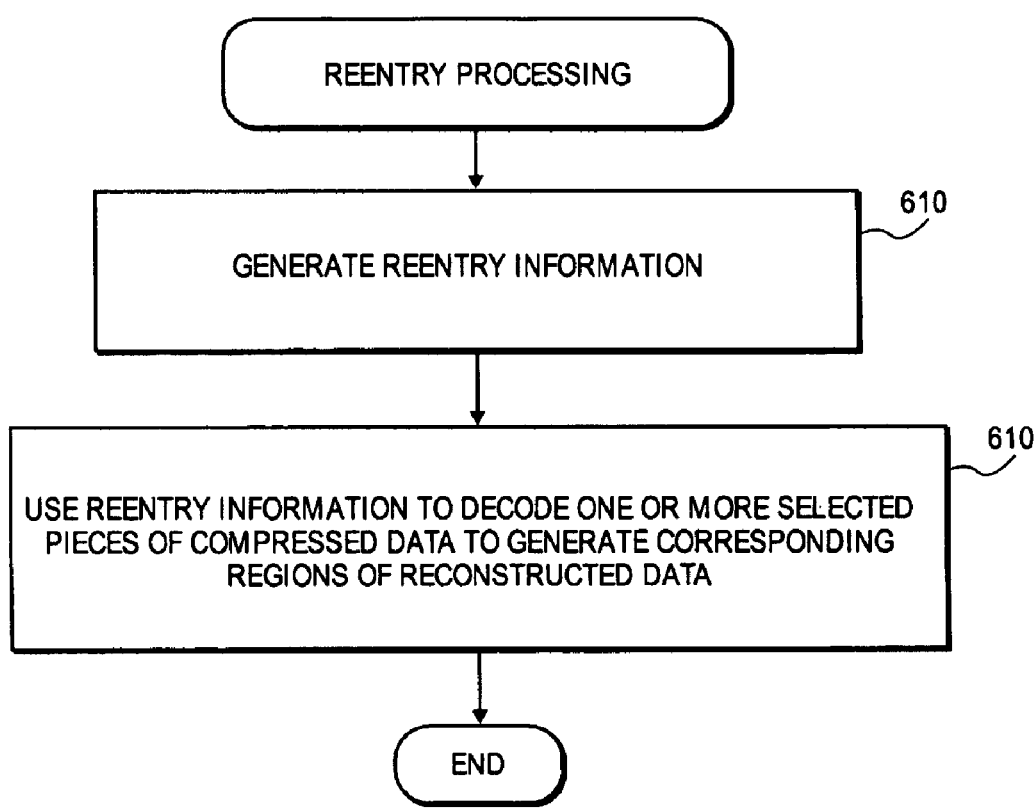
FIG. 6 is a flow diagram illustrating high-level reentry processing of a compressed data stream according to one embodiment of the present invention.

FIG. 6 is a flow diagram illustrating high-level reentry processing of a compressed data stream according to one embodiment of the present invention. In one embodiment, the processing described below may be performed under the control of a programmed processor, such as processor 502. However, in alternative embodiments, the processing may be fully or partially implemented by any programmable or hardcoded logic, such as Field Programmable Gate Arrays (FPGAs), TTL logic, or Application Specific Integrated Circuits (ASICs), for example.

At processing block 610, reentry information into a compressed data stream is generated. As discussed below, the reentry information may be generated by an encoder, a decoder, a reentry decoder, an entropy decoder, or an entropy encoder. The purpose of the reentry information is to allow a decoder to initiate decoding at specified locations in the compressed data stream. This is very useful, for example, in connection with parallel decoding and also for minimizing local storage by being able to extract regions of reconstructed data from the compressed data instead of having to store the entire reconstructed data.

Preferably, the reentry information includes optional state information to allow the decoder to resume decoding and a pointer into the compressed data stream that identifies the location at which decoding is to resume. This pointer often has granularity finer than byte boundaries. This reentry information is particularly useful when the compressed data does not contain restart points, such as JPEG restart markers and G3 end-of-line codes. This also avoids extra overhead in the compressed data as the reentry information can be generated and used locally in the decoder. Importantly, in a closed environment, codes to separate independently decodable pieces of compressed data may be inserted arbitrarily (i.e., violate the rules of the data compression standard, such as JPEG restart markers on other than fixed restart intervals). State information may be needed to correctly interpret the results. State information in the context of markers may be as simple as the location of the marker within the compressed data stream. For illegally placed markers, state information may also include the location in the reconstructed image of independently decodable pieces of compressed data.

At processing block 620, the reentry information is used to decode one or more selected pieces of compressed data to generate corresponding regions of reconstructed data. The encoder may have saved pointers and associated state information into the compressed data stream periodically in the compressed data or periodically in the source data. The decoder, however, knows the relevant pieces of information and preserves only what it needs. For example, the decoder may selectively discard certain pieces of the compressed data stream and save reentry information to initiate decoding into each of the remaining pieces of the compressed data stream. This has the advantage that the decoder does not have to serially decompress the compressed data from the start of the compressed data stream. Rather, the decoder may skip to the closest pointer preceding the relevant piece of compressed data and start decoding at the point. The decoder is not restricted to accessing the information from the pointers in sequential order. This provides limited random access into the compressed data stream.

Decoder Architecture

Figure 7:
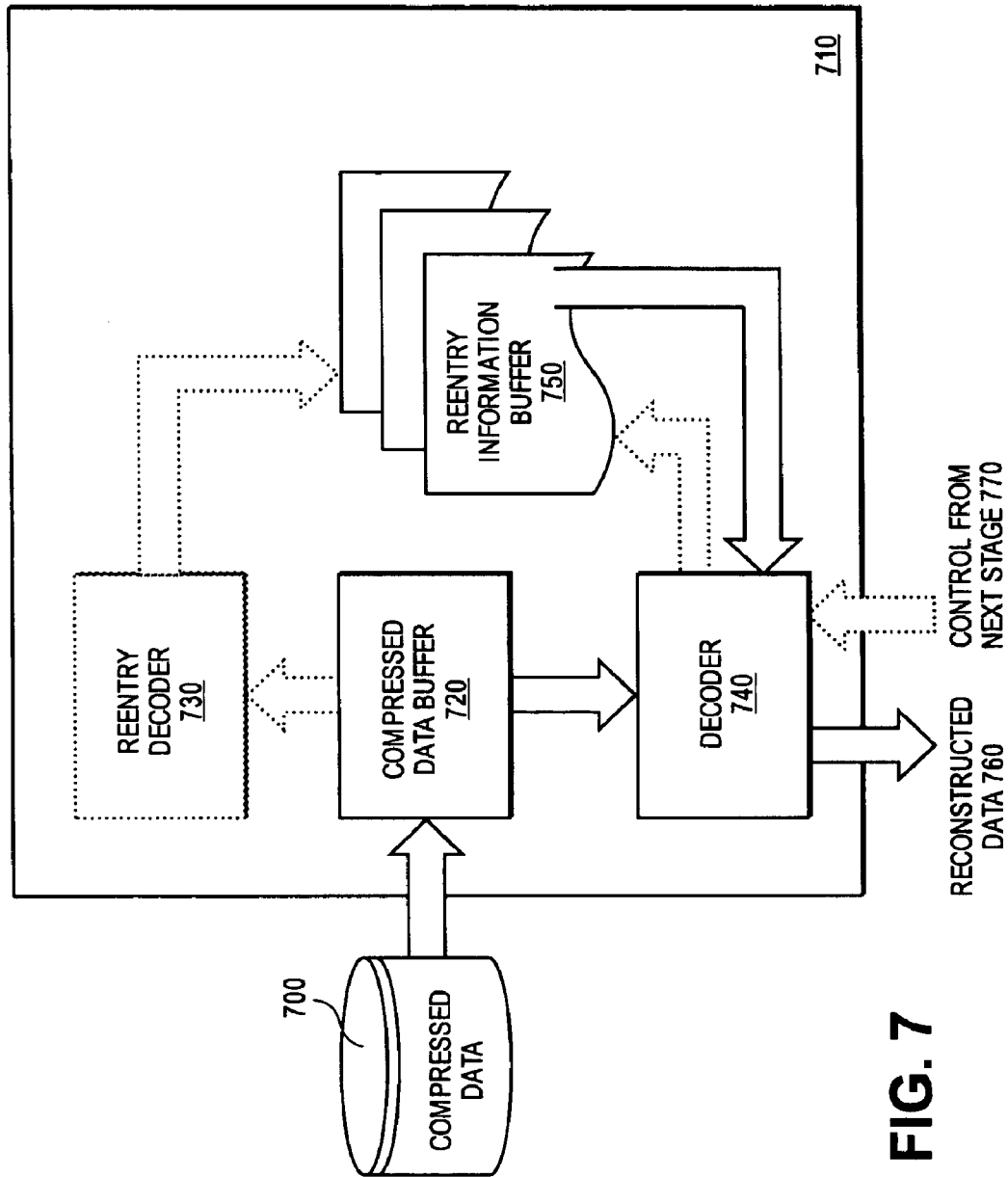
FIG. 7 is a block diagram illustrating an exemplary decoder architecture for generating reentry information according to one embodiment of the present invention.

FIG. 7 is a block diagram illustrating an exemplary decoder architecture for generating reentry information according to one embodiment of the present invention. In one embodiment, the components described below may be implemented as one or more software or firmware routines. However, in alternative embodiments, the components may be fully or partially implemented by any programmable or hardcoded logic, such as Field Programmable Gate Arrays (FPGAs), TTL logic, Application Specific Integrated Circuits (ASICs) or other special purpose hardware, for example.

In this example depicted, the decoder architecture 710 includes an optional reentry decoder 730, a compressed data buffer 720, a decoder 740, and a reentry information buffer 750. Although in the embodiment depicted the reentry decoder 730, the compressed data buffer 720, the decoder 740, and the reentry information buffer 750 are shown as separate elements, various other implementations may combine one or more of these elements.

According to one embodiment, the decoder 740 may generate reentry information into the compressed data stream as it decodes and reconstructs data 760. Alternatively, the decoder 740 may use reentry information 750 previously generated by the optional reentry decoder 730 to identify appropriate pieces of compressed data in the compressed data buffer 720 and reconstruct the desired regions of reconstructed data 760.

When the decoder 740 reconstructs the data the first time through the compressed data in the compressed data buffer 720, it may store reentry information at predetermined or advantageous locations, such as buffer boundaries, in the compressed data stream. If the processing stage following the decoder 740 needs access to one or more regions of the reconstructed data 760, the decoder 740 may regenerate the desired reconstructed data by using the reentry information in the reentry information buffer 750 to access the corresponding compressed data from the compressed data buffer 720. Advantageously, this means the processing stage following the decoder 740 may be designed with less than worst case buffering because it can request desired regions of reconstructed data at less than the cost of a full decode from the start of the compressed data stream to the end of the desired region. For example, an image manipulation stage following the decoder 740 may provide optional control information 770 to the decoder 740 requesting reconstructed data 760 that the image manipulation stage discarded because its buffers were too small. Then, when the image manipulation stage is ready for the discarded information and has some free buffers, the decoder 740 may use the reentry information to generate the requested reconstructed data 760. One particularly useful environment for such regeneration would be data transmission between two devices. In this case, if the reconstructed data 760 is received by the destination in error, e.g., a packet is corrupted or lost during transmission, the decoder 740 may resend the reconstructed data 760 by using the reentry information to decode the relevant pieces of compressed data without having to store the reconstructed data and without having to restart from the beginning of the compressed data 700.

As will be described further below, one use of the reentry decoder 730 may be to facilitate parallel decoding by multiple decoders. The reentry decoder 730 may be a special purpose decoder that only entropy decodes the compressed data stream and stores reentry information at predetermined or advantageous locations, such as buffer boundaries, in the compressed data stream. Alternatively, the reentry decoder 730 may be a fully functional decoder and after it completes its reentry decoding processing it switches to become one of the parallel decoders. Importantly, the reentry decoder 730 does not need to process the entire contents of the compressed data buffer 720. It can stop once it has completed the desired reentry information and stored it in the reentry information buffer 750.

According to one embodiment, the reentry decoder 730 may generate a coarse grid of reentry information. The decoder 740 may take the closest preceding coarse reentry point and while decoding save a finer grid of reentry information. The decoder 740 may also at any time supplement the current reentry information. For example, JBIG has SDRST markers that allow independent decoding from these byte-aligned markers. While decoding, either or both of the reentry decoder 730 and the decoder 740 may save additional reentry information which, for example, could allow decoding between these markers.

Encoder Architecture

Figure 8:
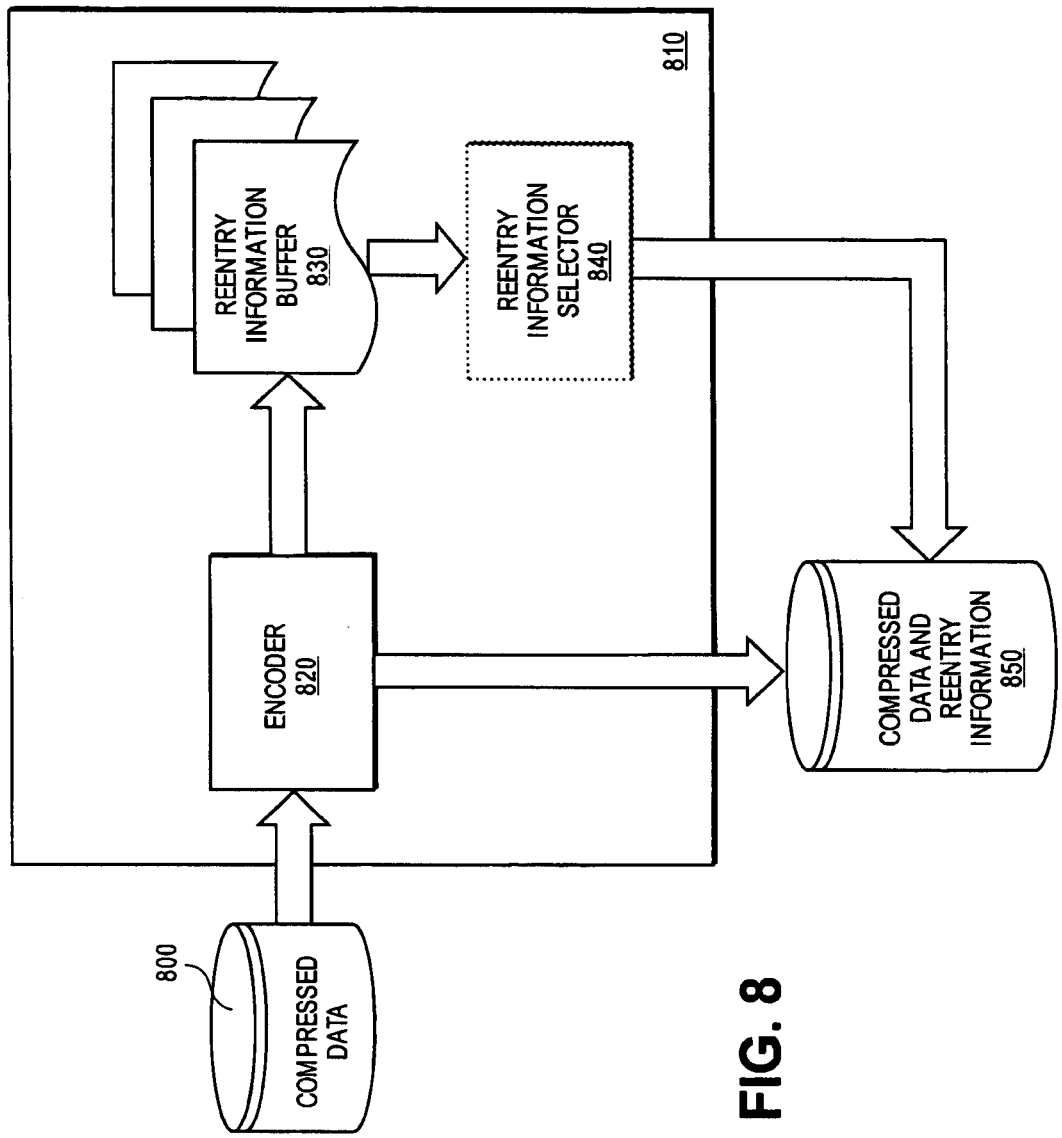
FIG. 8 is a block diagram illustrating an exemplary encoder architecture for generating reentry information according to another embodiment of the present invention.

FIG. 8 is a block diagram illustrating an exemplary encoder architecture for generating reentry information according to another embodiment of the present invention. In this example, the encoder architecture 810 includes an encoder 820, a reentry information buffer 830, and an optional reentry information selector 840. Although in the embodiment depicted the encoder 820 and the reentry information buffer 830 are shown as separate elements, various other implementations may combine these elements.

According to one embodiment, the encoder 820 may generate compressed data and reentry information 850 into the compressed data stream as it encodes source data 800. Alternatively, the optional reentry information selector 840 may select a subset of the reentry information generated by the encoder 820 for storage. An example of this may be the encoder 820 generating reentry information for every line and the reentry information selector 840 choosing reentry information for G4 MMR compressed data for which the history line is all white and the current line is not all white thereby minimizing cost of storing the reentry information. A reentry decoder may start decoding at the closest reentry information saved by the encoder and save additional reentry information such as the location of the first data that the printer needs to process. Thus, the full decode can be avoided until the relevant region of source data has been found.

Architecture for Manipulation and/or Transcoding

Figure 9:
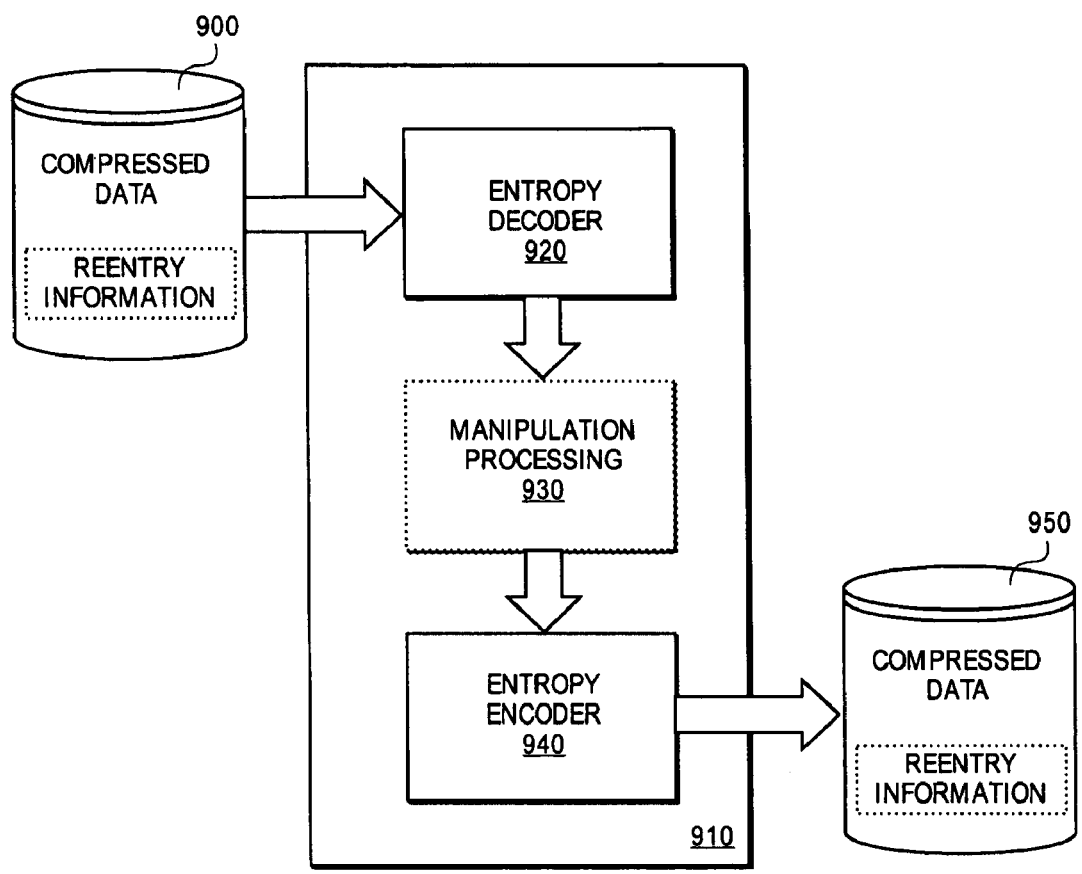
FIG. 9 is a block diagram illustrating an exemplary architecture for manipulating and/or transcoding a compressed data stream according to one embodiment of the present invention.

FIG. 9 is a block diagram illustrating an exemplary architecture 910 for manipulating and/or transcoding a compressed data stream according to one embodiment of the present invention. The embodiment shows compressed data 900 with optional reentry information input into an entropy decoder 920 (or other partial decoder). After optional manipulation by the manipulation processing 930, the entropy encoder 940 (or other partial reencoder) outputs compressed data 950 with optional reentry information. If the reentry information is present in compressed data 900, the entropy decoder does not have to serially decode the compressed data 900. In an example of straight transcoding, the entropy encoder 940 may chose to refer to the same regions of reconstructed data with its reentry information. Whereas, if the reentry information is related to compressed buffer boundaries, the entropy encoder 940 will typically refer to different regions.

DCT-based Encoder/Decoder

Figure 10:
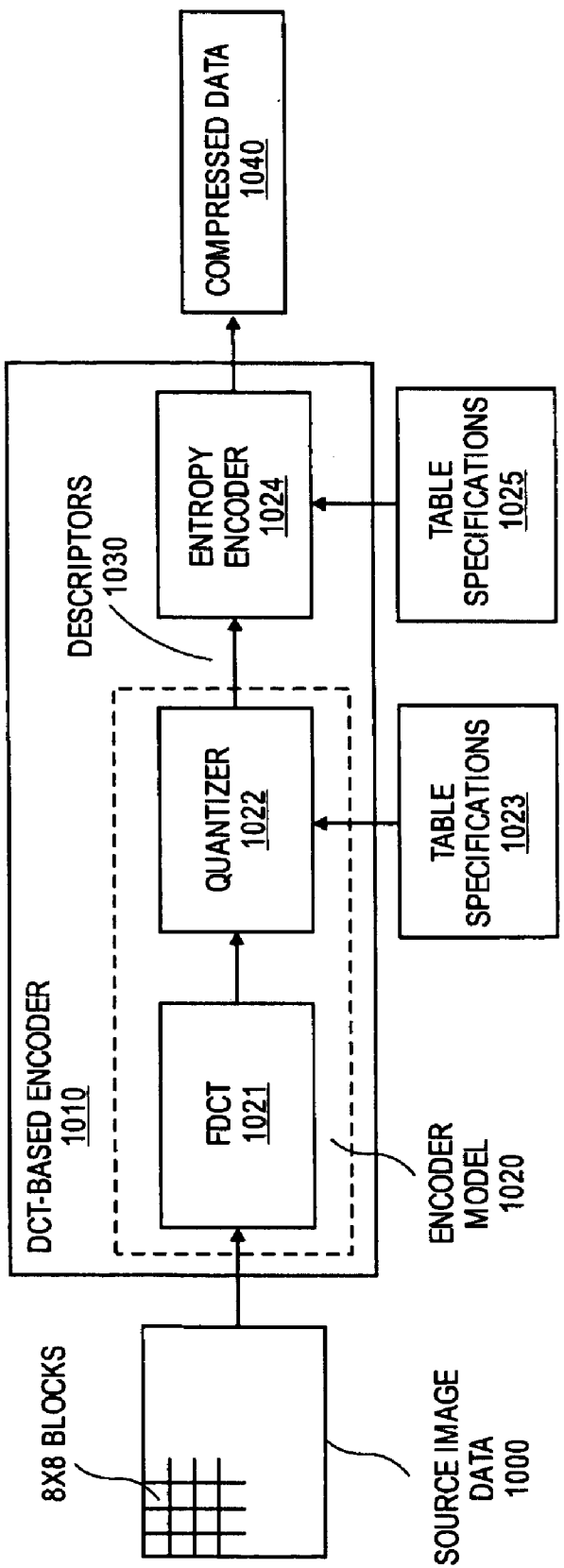
FIG. 10 is a simplified block diagram of a prior art DCT-based encoder.

FIG. 10 is a simplified block diagram of a prior art DCT-based encoder. Source image data 1000 sampled data in 8×8 blocks is input to a DCT-based encoder 1010. Each 8×8 block is transformed by the FDCT 1021 into a set of 64 values, referred to as the DCT coefficients. One of these values is referred to as the DC coefficient, and the other 63 values are referred to as AC coefficients. Each of the 64 coefficients is then quantized by quantizer 1022 using one of 64 corresponding values from a quantization table 1023. After quantization, the DC coefficient and the 63 AC coefficients are output as descriptors 1030 from the encoder model 1020 and input into the entropy encoder 1024. Inside the entropy encoder 1024, the previous quantized DC coefficient is used to predict the current DC coefficient and the difference is encoded. The 63 AC coefficients, however, are not differentially encoded but, rather, are converted into a zig-zag sequence. One of two entropy encoding procedures may be used by the entropy encoder 1024, Huffinan encoding or arithmetic encoding. If Huffinan encoding is used, then Huffinan table specifications are provided by the table specifications 1025, but if arithmetic encoding is used, then arithmetic coding conditioning table specifications are provided by table specifications 1025. The output of the entropy encoder 1024 is the compressed data 1040.

Figure 11:
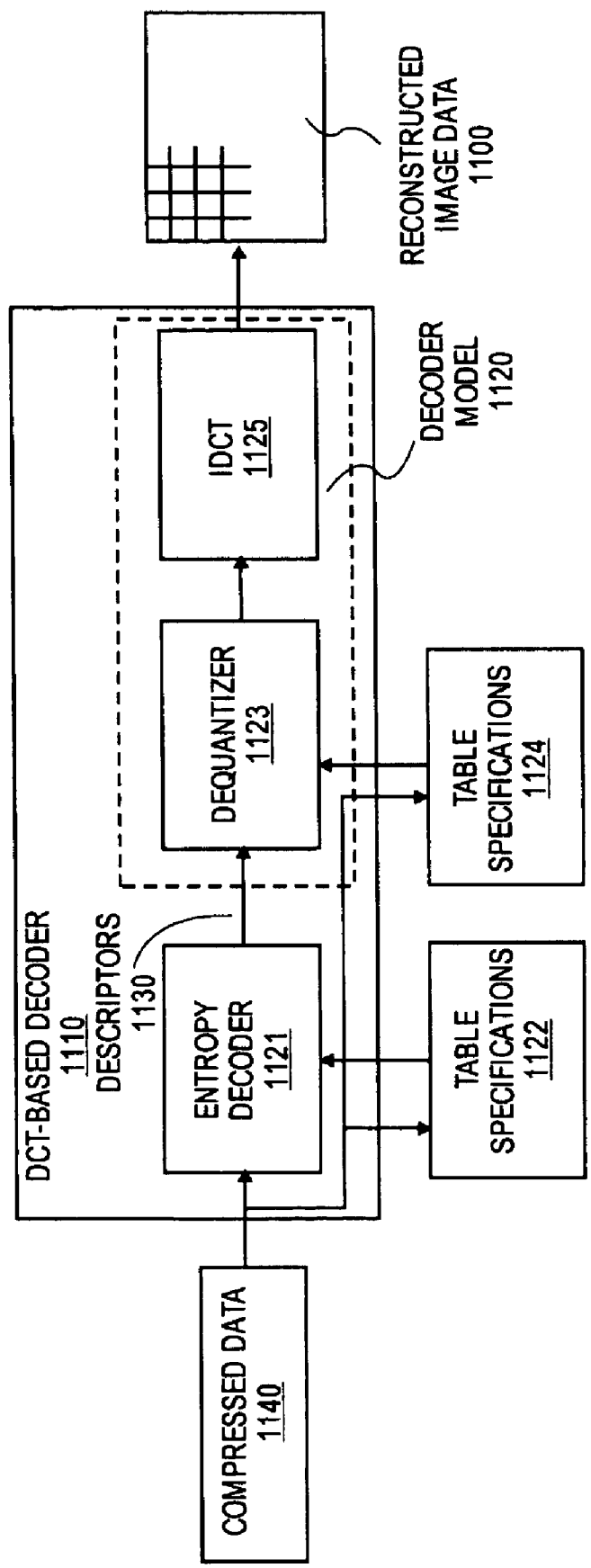
FIG. 11 is a simplified block diagram of a prior art DCT-based decoder.

FIG. 11 is a simplified block diagram of a prior art DCT-based decoder. Each processing block shown performs essentially the inverse of its corresponding main procedure within the encoder shown in FIG. 10. The compressed image data 1140 is input to the DCT-based decoder 1110 where it is first processed by an entropy decoder 1121 which decodes the zig-zag sequence of the quantized DCT coefficients. This is done using either Huffinan table specifications or arithmetic coding conditioning table specifications 1122 which were extracted from the compressed data 1140, depending on the coding used in the encoder. The entropy decoder 1121 also recovers the DC value from the difference and the DC prediction. Then, the descriptors 1130 (i.e., the quantized DCT coefficients output from the entropy decoder 1121) are input to the dequantizer 1123 which, using table specifications 1124 (the quantization table extracted from the compressed data 1140), outputs dequantized DCT coefficients to IDCT 1125. The output of the decoder model 1120 is reconstructed image data 1100.

In FIGS. 10 and 11, the entropy encoder 1024 and the entropy decoder 1121 were defined to make transcoding at the descriptor-level 1030 and 1130 convenient. This same definition may be used for reentering the data stream if the reentry information saves the DC predictor per component and has a bit-level pointer into the compressed data for an MCU boundary for JPEG and a bit-level pointer to a macroblock for MPEG. In some embodiments, it may also be convenient to store the location of the MCU or macroblock. Saving reentry information for JPEG MCU boundaries or MPEG macroblock boundaries minimizes storage for the reentry information while allowing reentry into the compressed data at points that are not required to be byte-aligned. For the cost of additional overhead in saving the reentry information, this approach allows arbitrary reentry into the compressed data.

Exemplary Manipulation Processing

Figure 12:
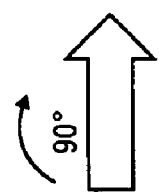
FIG. 12 is a simplified block diagram that conceptually illustrates the result of rotating an image by 90°.

FIG. 12 is a simplified block diagram that conceptually illustrates the result of rotating an image by 90°. In FIG. 12, an input image 1200 and an output image 1210 are depicted. The output image 1210 corresponds to a 90° (clockwise) rotation of the input image 1200. The input image 1200 is shown divided into nine portions 1201–1209. While portions 1201, 1202 and 1203 are the first encountered in a sequential scan of the input image 1200, portion 1203 is the last portion of the output image 1210 to be output. Consequently, as illustrated by FIGS. 14A–14I, image rotation processes must accumulate the whole image in memory or on disk before the rotated image can be output.

Figure 13:
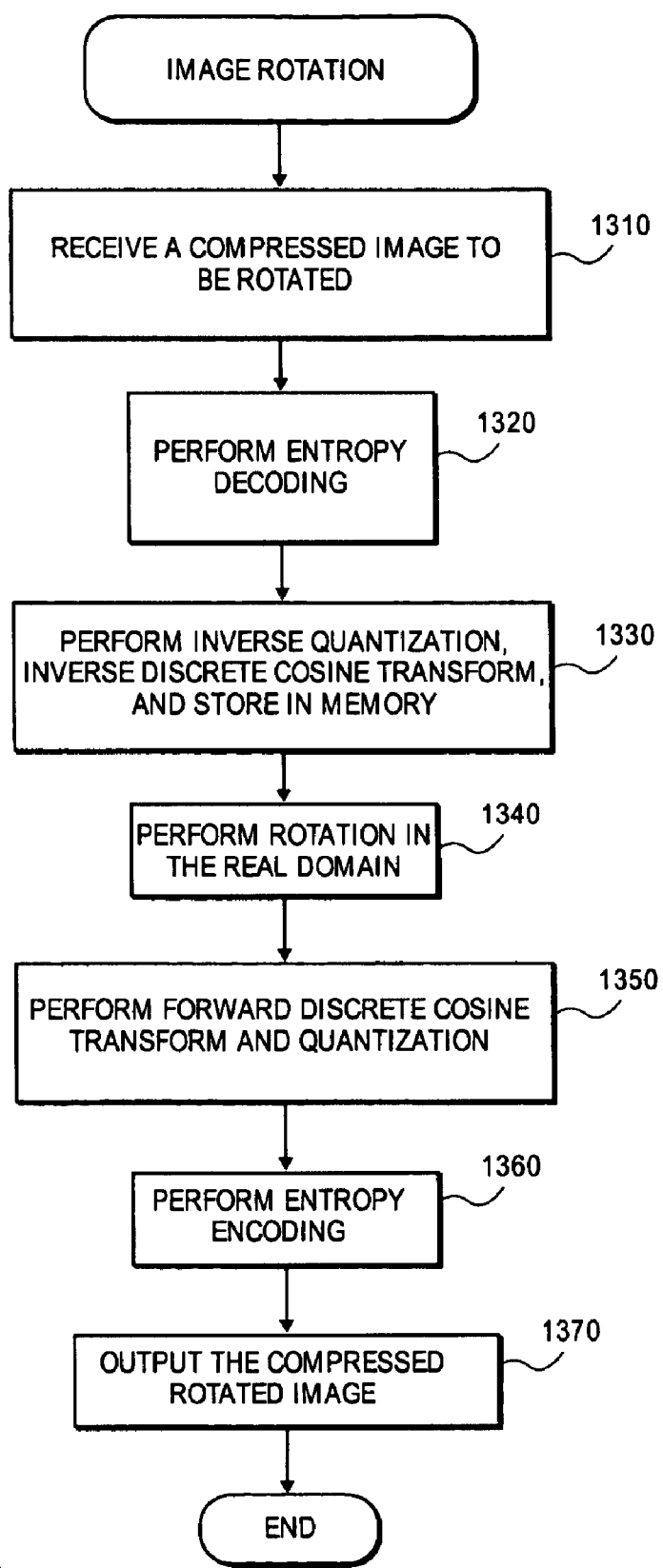
FIG. 13 is a flow diagram illustrating a prior art approach for rotation of compressed images.

FIG. 13 is a flow diagram illustrating a prior art approach for rotation of compressed images. At step 1310, a compressed image to be rotated is received. At step 1320, the compressed image is entropy decoded. Then, at step 1330, inverse quantization and inverse DCT are performed and the output is stored. The rotation is performed by reordering the image samples in the real domain at step 1340. Then, in step 1350, the FDCT and requantization are performed. In step 1360, the entropy encoding is performed. Finally, in step 1370, the compressed, rotated image is output.

Notably, many disadvantages arise from this prior art approaches conversion between the transform domain and the real domain. First, it requires both IDCT and FDCT and the accompanying multi-generation problems due to the integer representation in the real domain. Additionally, this approach may require the entire image to be buffered since, as illustrated by FIGS. 14A–14I, the first pixels read by the rotation process contain some of the last pixels to be output. Finally, such an approach is also inefficient in terms of its use of CPU cycles.

Figure 14A:
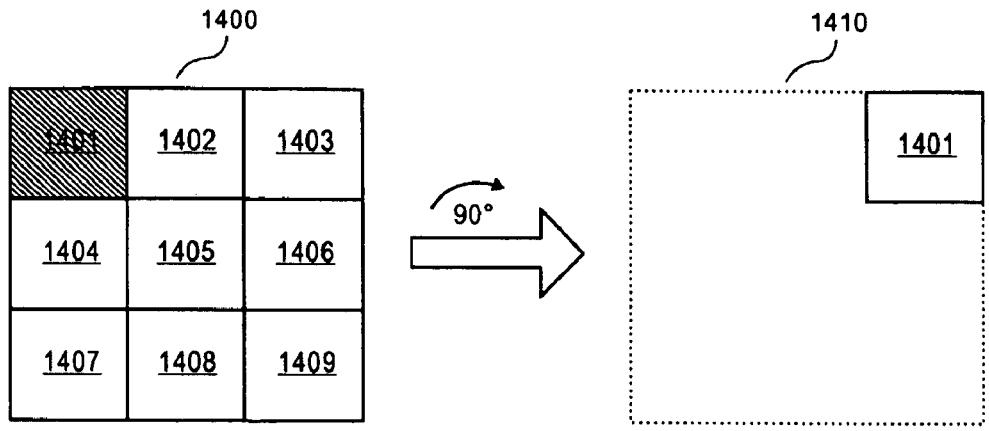
FIGS. 14A–14I illustrate the order in which portions of the image are processed according to the prior art rotation approach of FIG. 13.
Figure 14B:
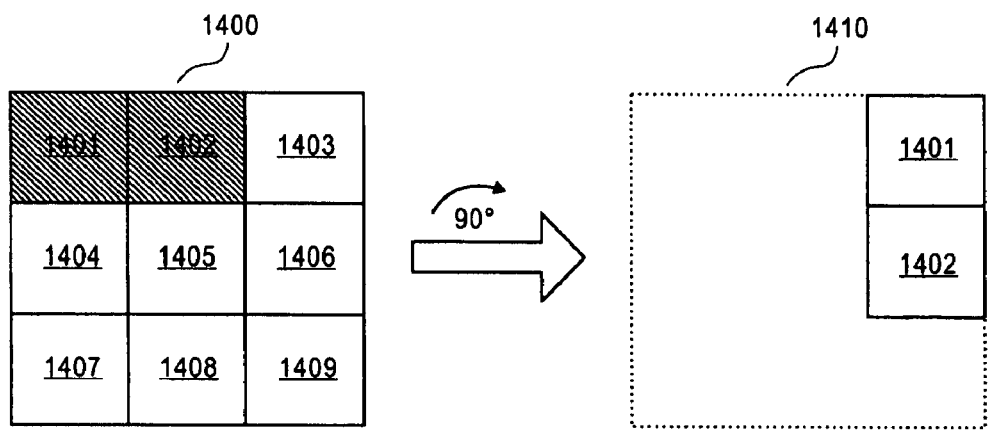
Figure 14C:
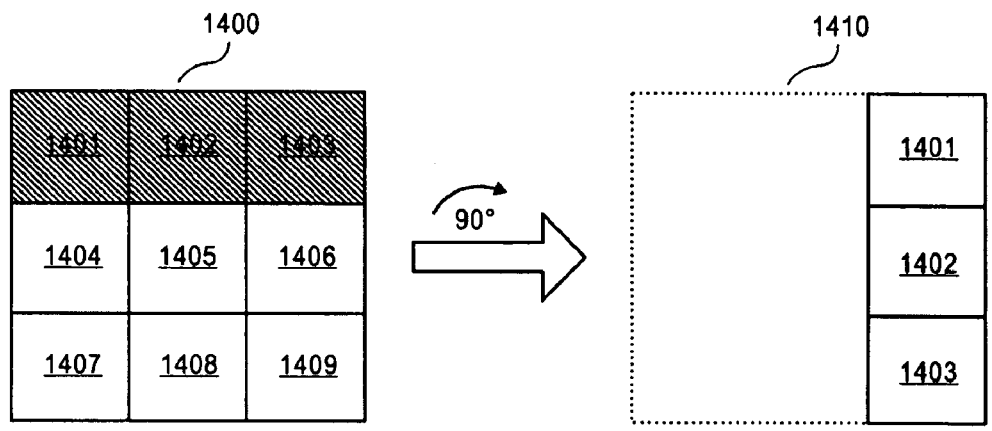
Figure 14D:
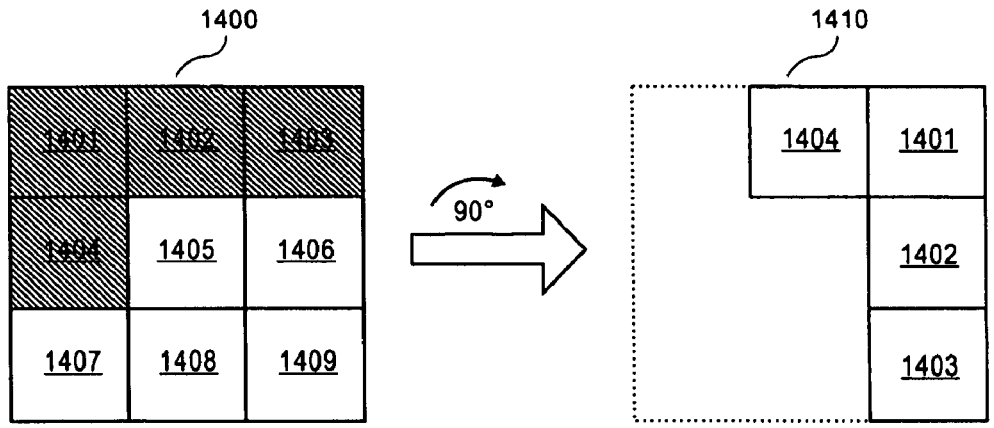
Figure 14E:
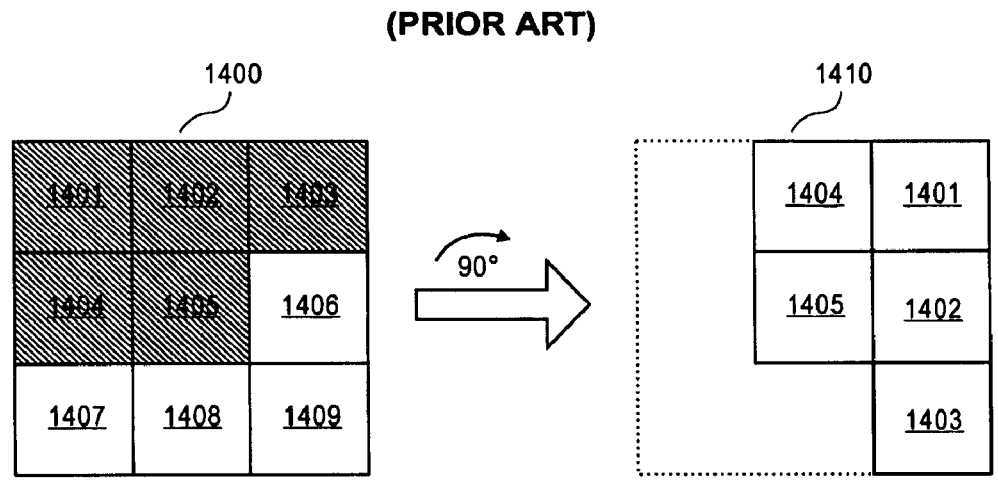
Figure 14F:
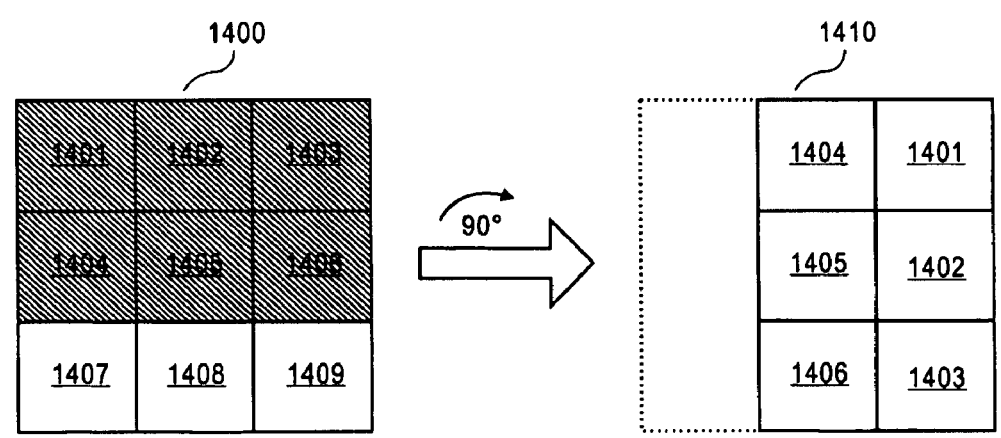
Figure 14G:
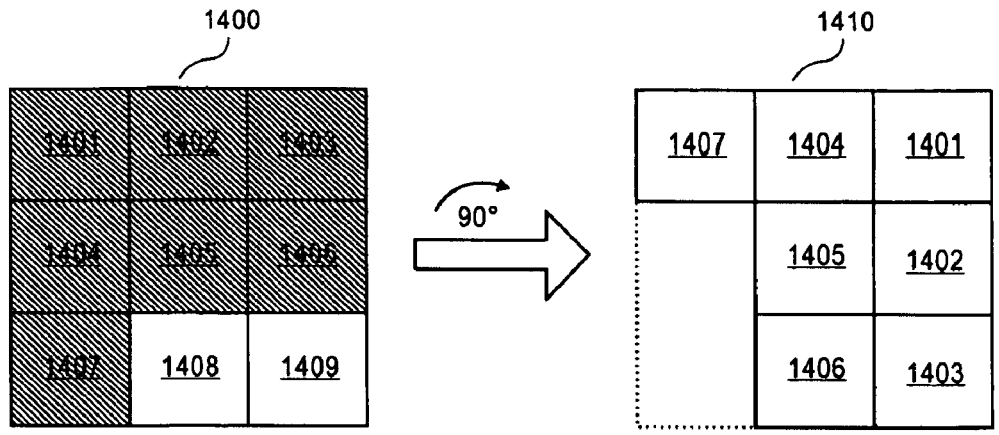
Figure 14H:
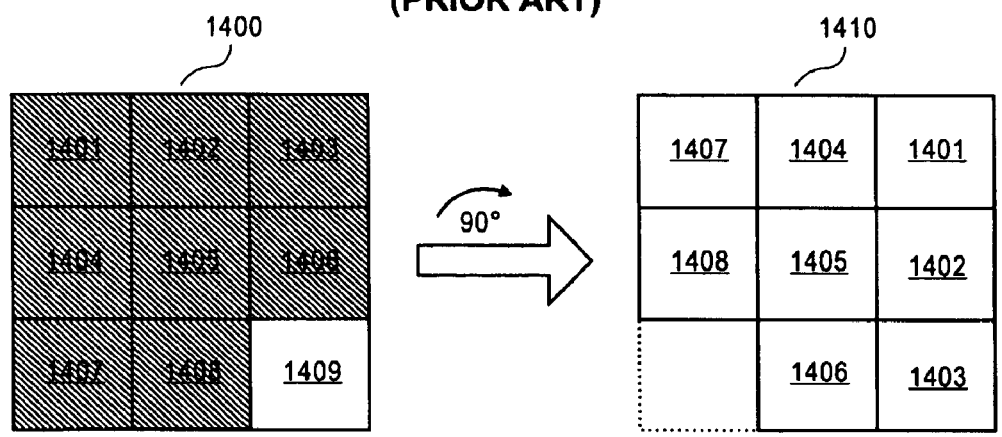
Figure 14I:
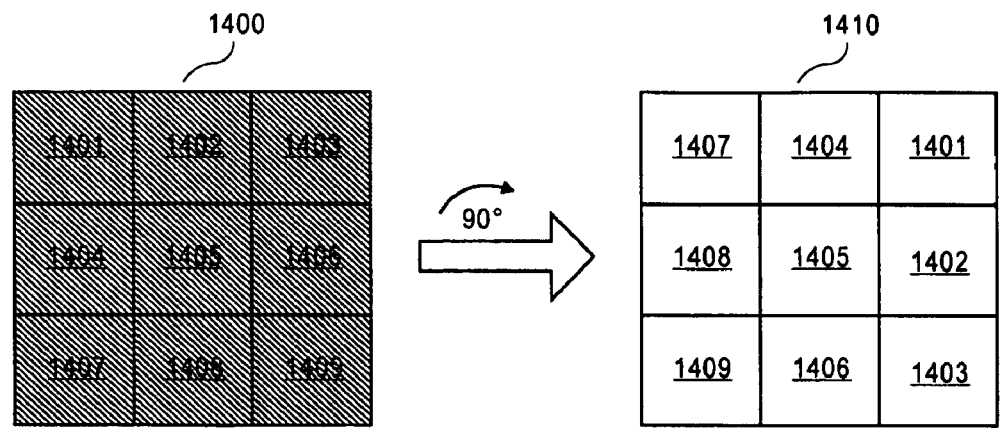

FIGS. 14A–14I illustrate the order in which portions of the image are processed according to the prior art rotation approach of FIG. 13. In FIGS. 14A–14I, input image 1400 is sequentially processed to produce a rotated image 1410. In this example, the input image 1400 is rotated by 90 degrees (clockwise) to produce the rotated image 1410. If output of the rotated image 1410 is desired, the first blocks read and processed (e.g., blocks 1401, 1402, and 1403) by the rotation process cannot be immediately output and therefore need to be buffered. The order of processing of input image 1400 is block 1401, block 1402, block 1403, block 1404, block 1405, block 1406, block 1407, block 1408, and block 1409. In contrast, the output order, as shown in FIG. 14I, is block 1407, block 1404, block 1401, block 1408, block 1405, block 1402, block 1409, block 1406, and block 1403. Consequently, as mentioned above, prior art rotation techniques may require worst case buffering of the entire image.

In view of the foregoing, it is desirable to reduce the buffering requirements for such compressed data manipulations. Additionally, it would be advantageous to be able to selectively extract desired pieces of compressed data from a compressed data stream thereby allowing immediate output of processed data. For example, referring back to FIGS. 14A–14I, if blocks 1407, 1404, and 1401 could be accessed and manipulated first by the rotation process, then upon completion of this row, the blocks could be immediately output.

DCT Coefficient Manipulation for Transform Domain Rotations

Figure 15:
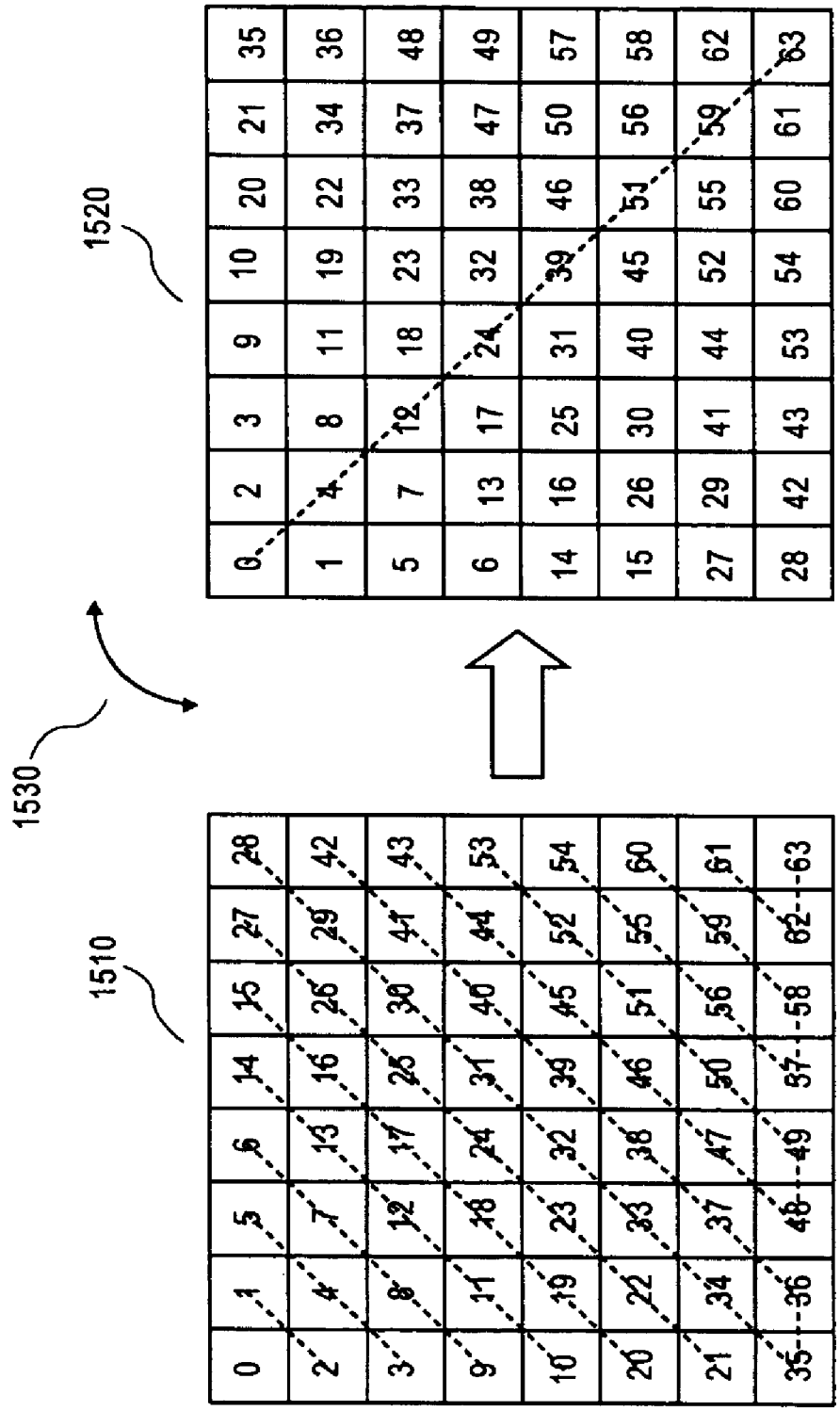
FIG. 15 illustrates the transposition of coefficients within each block for transform domain rotations.
Figure 16:
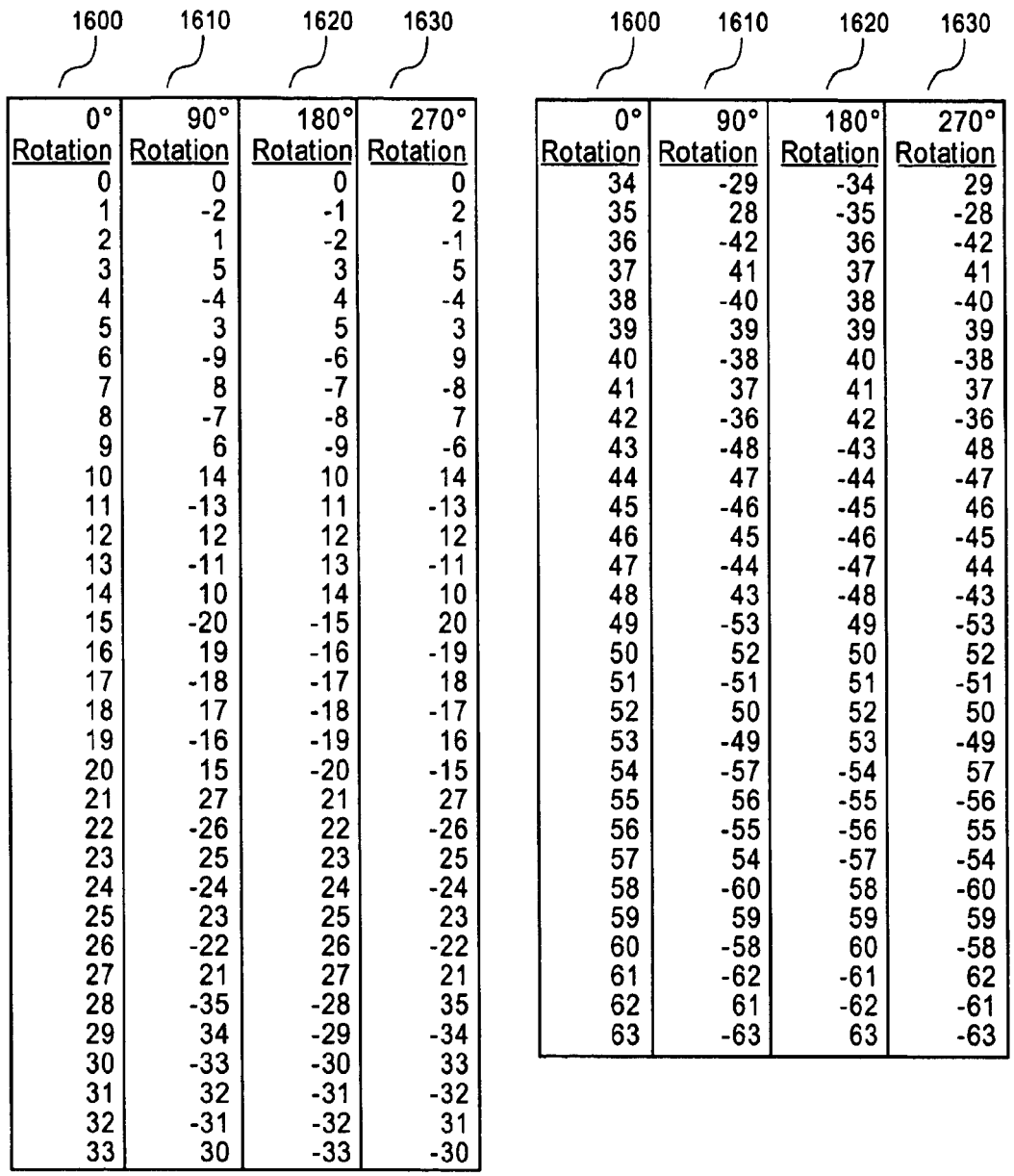
FIG. 16 is a table of the zig-zag scan ordered coefficients and their respective signs to accomplish 0°, 90°, 180°, and 270° rotation.

FIG. 15 illustrates the transposition of coefficients within each block for transform domain rotations. Working with the zig-zag ordering of the DCT coefficients specified by JPEG, rotations by integer multiples of 90 degrees (clockwise) are accomplished as shown in the columns of FIG. 16. The entries in 8×8 block 1510 give the positions of the DCT coefficients in zig-zag scan order (also shown by the zig-zag line in block 1516). The entries in 8×8 block 1520 show the new positions of the DCT coefficients after the transpose. In this example, the transposition essentially comprises moving a DCT coefficient from its present position in block 1510 to a corresponding position in block 1520 on the other side of diagonal 1530. For example, before transposition of the DCT coefficients of block 1510, DCT coefficient 1 is located in the first row, second column of the block 1510. After transposition, coefficient 1 is located in the second row, first column of block 1520.

Importantly, the transpose operation depicted in FIG. 15 requires less CPU cycles than would be required if the image data was rotated in the real domain. Recall, in order to rotate in the real domain and return to the compressed format, an inverse DCT and forward DCT are required, resulting in image degradation and additional processing. Therefore, one advantage of rotating in the transform domain, e.g., the quantized DCT coefficient domain, is that the quality of the image will be unaffected since it is a lossless process.

FIG. 16 is a table of the zig-zag scan ordered coefficients and their respective signs to accomplish 0°, 90°, 180°, and 270° rotation. In this example, the number in column 1600 represents the DCT coefficient position prior to rotation; and the values in columns 1610, 1620, and 1630 represent where that DCT coefficient that will be in zig-zag order after 90 degree, 180 degree, and 270 degree rotations, respectively, and whether or not a negation operation is needed. According to the table of FIG. 16, rotations by integer multiples of 90 degrees (clockwise) are accomplished by transposing the DCT coefficients of block 1510 and negating zero or more of the transposed DCT coefficients. For example, the DCT coefficient in position 1 of the zig-zag order prior to a 90 degree rotation will move to position 2 and be negated.

Reentry JPEG Compressed Image Processing Overview

A technique for processing a compressed image will now be briefly summarized with reference to rotation of JPEG compressed images. According to one embodiment, rather than simply sequentially processing MCUs according to the order in which they appear in the input data stream, MCUs are extracted from different parts of the compressed image in accordance with the order in which the MCUs will appear in the output data stream. During a reentry information generation stage, the compressed image is partially entropy decoded to identify pointers, e.g., offsets, to each desired reentry point, e.g., at MCU boundaries. Importantly, since MCUs are not necessarily byte aligned in the coded data stream, it should be understood that these pointers are bit-level pointers into entropy encoded image data. That is, the pointers contain enough resolution to identify the byte and bit position within the byte of the start of the code for the desired MCUs. Other state information may also be recorded as necessary during this stage. For example, in the case of a JPEG image, history information, such as DC predictors, are needed because DC values are differentially encoded. Consequently, determining the DC value for a current block depends upon the preceding DC value within the scan that is coded for the same component. Therefore, in the case of a JPEG image, a predictor per component is also recorded during this stage. During a second stage through the compressed image, e.g., a manipulation stage, such as a rotation stage, decoding may be restarted at each saved pointer. The compressed image is processed in such an order that the resulting MCUs, when rotated, can be assembled into a proper rotated image. Preferably, the order of processing also allows rendering of the output image to begin immediately, for example, by assembling the output image in a top-down order. Advantageously, in this manner, there is no longer a need to accumulate the whole input image in memory before beginning to output the rotated image.

Server-Side, Reentry JPEG Compressed Image Rotation Processing

Figure 17:
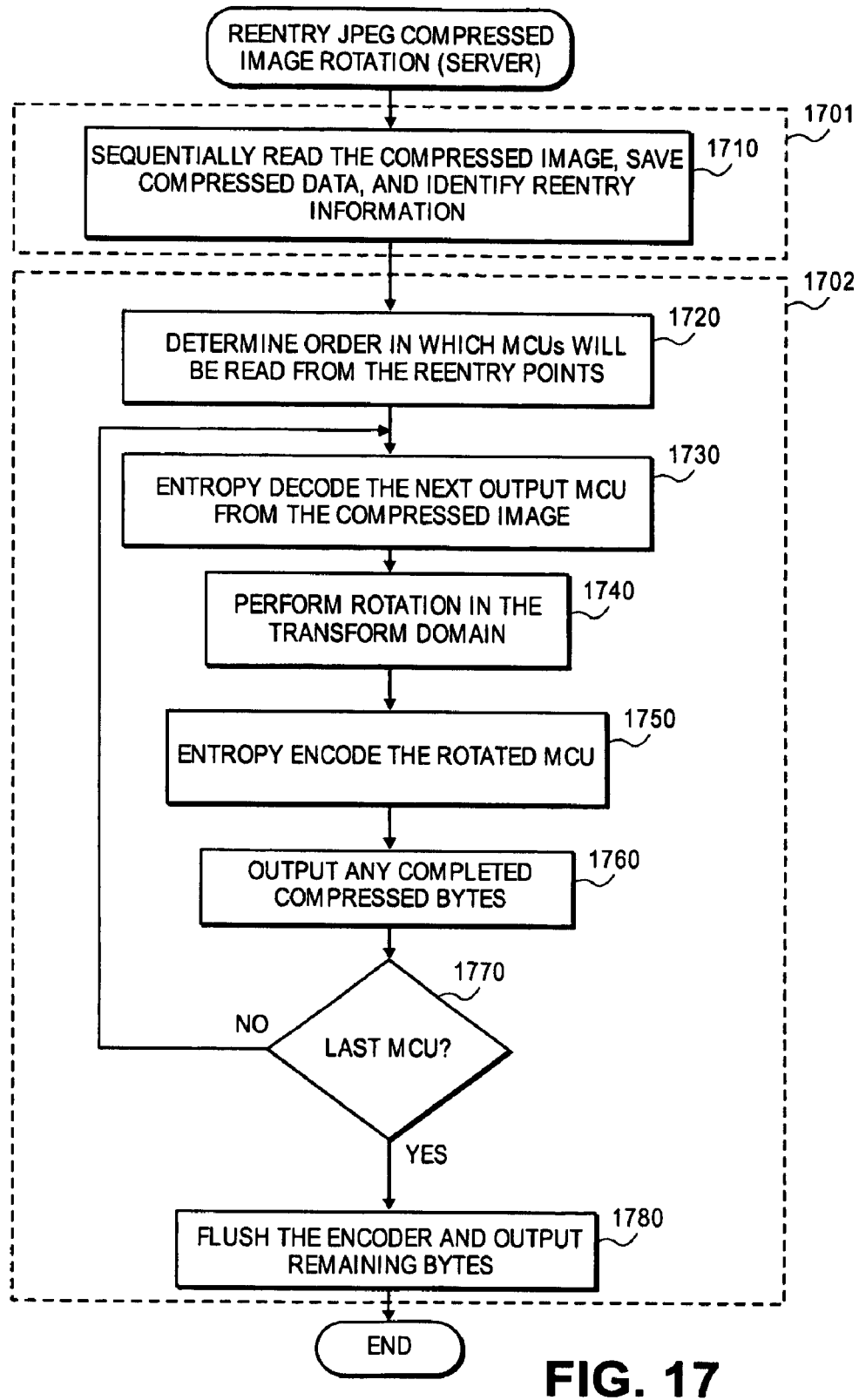
FIG. 17 is a flow diagram illustrating a JPEG compressed image rotation processing technique that employs reentry according to one embodiment of the present invention.

FIG. 17 is a flow diagram illustrating a JPEG compressed image rotation processing technique that employs reentry for use on a print server according to one embodiment of the present invention. In this example, the rotation process generally breaks down into a reentry information identification stage 1701 and a reentry information usage stage 1702. The identification stage 1701 is represented by processing block 1710 and the usage stage 1702 includes processing blocks 1720–1780.

The rotation method begins at processing block 1710, where a compressed image is sequentially read and reentry information into the compressed image is identified by the print server. This reentry information may be generated by a reentry decoder that generates the exact list of reentry information. Alternatively, the reentry information may have been saved with the compressed data by the encoder. Also it is possible to provide the reentry information concurrently with the compressed data. In another embodiment, the reentry information may have been previously generated during a prior rotation and saved locally in anticipation of subsequent reuse. As shown in FIGS. 19 and 20, 90 degree counterclockwise rotation requires more reentry information than 90 degree clockwise rotation. In such a situation, the identification stage 1701 may selectively discard unnecessary reentry information points thereby retaining in local storage only those that will be needed in the usage stage 1702.

At processing block 1720, a determination is made with regard to the order in which MCUs will be read from the compressed image based upon the reentry information identified and the particular rotation desired.

At processing block 1730, the next MCU to be placed into the output image is entropy decoded. Note, as explained with reference to FIG. 11, the output of the entropy decoder 1121 is the complete DC coefficient (prediction has been removed).

At processing block 1740, the MCU is rotated in the transform domain. It is then re-entropy encoded at processing block 1750. Any completed compressed bytes are output at processing block 1760. Preferably, the output is in MCU row order thereby allowing immediate transfer to the printer controller.

At processing block 1770, a determination is made whether or not this is the last MCU of the output image. If so, encoding is terminated by flushing the encoder and outputting the final bytes of compressed data at processing block 1780. Otherwise, processing returns to processing block 1730.

Advantageously, in this manner, the printer controller is able begin decoding in MCU row order as soon as it receives the first compressed byte of the rotated image from the server. Notably, in the prior art, effectively the whole rotated transform coefficients need to be buffered before recompression for output to the printer controller can begin.

Note that in this example it is assumed that the rotation will not cause unwanted data to remain in the picture (e.g., the printer can discard the rotated padding if it is no longer on the right or the bottom of the image).

Printer Controller Reentry JPEG Compressed Image Rotation Processing

Figure 18:
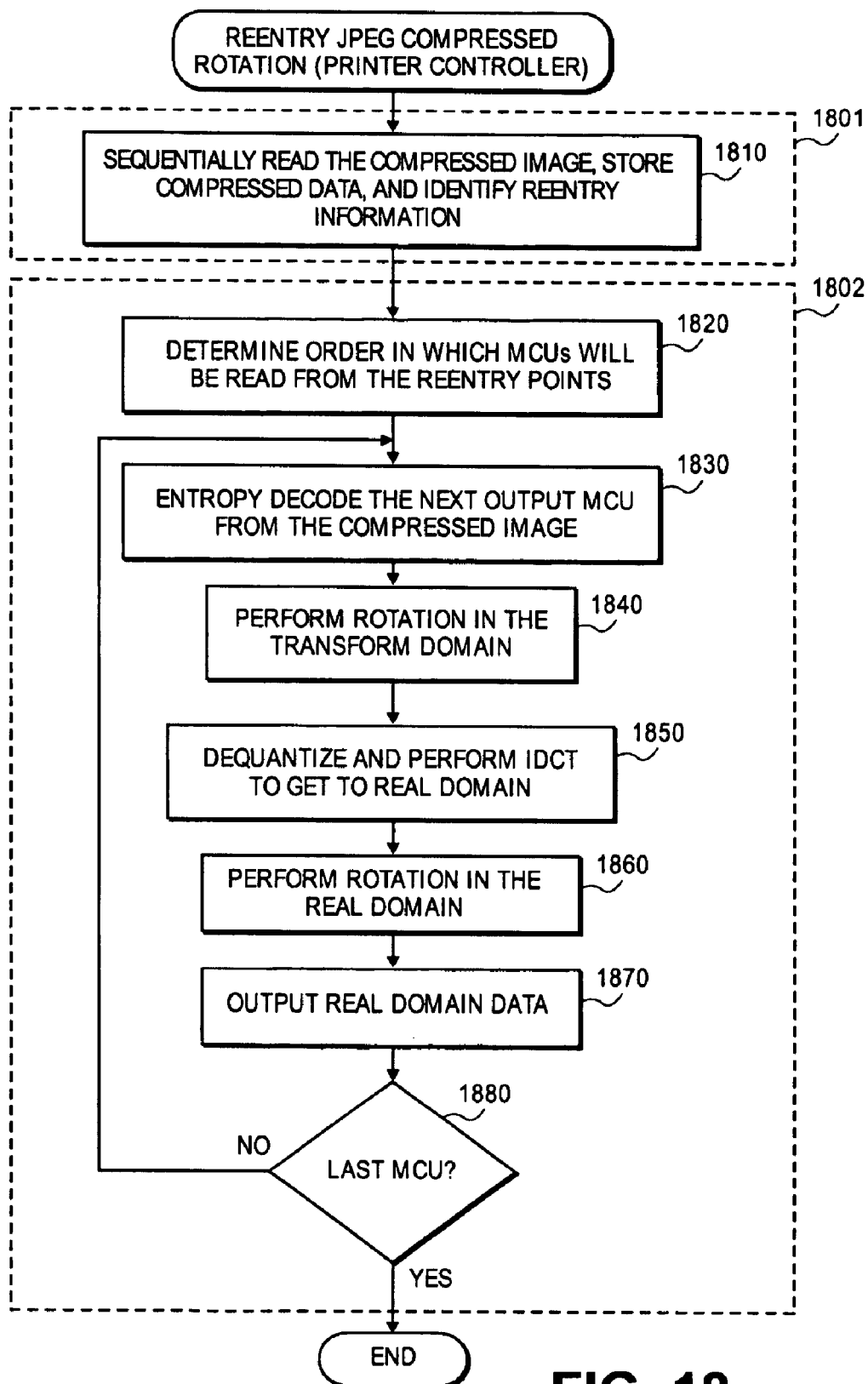
FIG. 18 is a flow diagram illustrating a JPEG compressed image rotation processing technique that employs reentry according to another embodiment of the present invention.

FIG. 18 is a flow diagram illustrating a JPEG compressed image rotation processing technique that employs reentry for use in a printer controller according to another embodiment of the present invention. As above, in this example, the rotation processing process generally breaks down into a reentry information identification stage 1801 and a reentry information usage stage 1802. The identification stage 1801 is represented by processing block 1810 and the usage stage 1802 includes processing blocks 1820–1880.

The rotation method begins at processing block 1810, where a compressed image is sequentially read and reentry information into the compressed image is identified by the printer controller. This reentry information may be generated by a reentry decoder that generates the exact list of reentry information. Alternatively, the reentry information may have been saved with the compressed data by the encoder. Also it is possible to provide the reentry information concurrently with the compressed data. In another embodiment, the reentry information may have been previously generated during a prior rotation and saved locally in anticipation of subsequent reuse.

At processing block 1820, a determination is made with regard to the order in which MCUs will be read from the compressed image based upon the reentry information identified and the particular rotation desired.

At processing block 1830, the next MCU to be placed into the output image is entropy decoded. Note, as explained with reference to FIG. 11, the output of the entropy decoder 1121 is the complete DC coefficient (prediction has been removed).

At processing block 1840, the MCU is optionally rotated in the transform domain. Dequantization and IDCT is then performed to return to the real domain at processing block 1850. At processing block 1860, rotation is performed in the real domain if rotation was not performed in processing block 1840. While blocks 1850 and 1860 are shown separately in this example, it is contemplated that these two processing blocks could be combined thereby allowing rotation and IDCT to be performed simultaneously. At processing block 1870, the real domain data is output. At processing block 1880, a determination is made whether or not this is the last MCU to be processed. If so, rotation is complete. Otherwise, processing returns to processing block 1830.

Reentry JPEG Compressed Image Manipulation Processing Illustrations

FIGS. 19A–19D conceptually illustrate the processing of FIGS. 17 and 18 for a 270° rotation. In FIG. 19A, a source image 1910 is illustrated having blocks 1901 to 1909. The source image 1910 is encoded and reentry information is generated by either an encoder or by a reentry decoder. The saved reentry information (represented by arrows) includes a bit-level pointer into the compressed data 1920 and the DC prediction for the block. The encoding and/or reentry information generation may be performed at different points in time. For example, instead of encoding source image 1910 and generating reentry information in the encoder, a reentry decoder could operate on the compressed image data to generate the reentry information at a later time. For convenience, the compressed data for each block is shown as the same size as the source blocks 1901 to 1909 and identified with the same number.

Assuming the compressed data 1920 and the reentry information are contained in storage and rotated output is desired and following the method described with regard to FIG. 18, e.g., printer controller processing, the decoder selectively extracts pieces of compressed data according to the desired output order, entropy decodes the next piece, performs rotation in the transform domain (following FIGS. 15 and 16), dequantizes and performs the IDCT to output the rotated image data. Ultimately, the rotation in the transform domain could be skipped and the rotation could be performed in the real domain as described above. In this illustration, the order in which the pieces of compressed data are selected is as shown by the reentry points labeled 1991 to 1999. Therefore, the decoder starts decoding at reentry point 1991 and decodes block 1903 outputting it in rotated order. At the end of block 1903, the decoder skips to reentry point 1992 and proceeds to decode and output block 1906. This process is repeated until the rotated image is output.

Alternatively, if the desired output is a rotated image in compressed form, e.g., server processing, as described with respect to FIG. 17, then after identifying the reentry points 1991 to 1999 in the desired order, the decoder selectively extracts pieces of compressed data according to the desired output order, entropy decodes the next piece, performs rotation in the transform domain (following FIGS. 15 and 16), entropy encodes the rotated, quantized, transform, data, i.e., MCU, and terminates the encoding after all the MCUs have been rotated.

FIGS. 20A–20D conceptually illustrate the processing of FIGS. 17 and 18 using an optimization for 90° rotation. In this example, the overhead for storing reentry information may be reduced by taking advantage of the fact that the end of decoding a particular piece of compressed data is the start of a piece of compressed data that will be accessed later. Consequently, less initial reentry pointers may be stored. For example, after competing entropy decoding of block 2007, the reentry information to later entropy decode block 2008 is available and may replace the reentry information including reentry point 2091, which is why reentry point in FIG. 20C is labeled both 2094 and 2091'. Similarly, after competing entropy decoding of blocks 2004 and 2001, the reentry information to later entropy decode blocks 2005 and 2002, respectively, is available and may replace the reentry information including reentry points 2092 and 2093. The remainder of the process is as described above with reference to FIGS. 19A–19D.

FIGS. 21A–21D conceptually illustrate substitution processing according to one embodiment of the present invention. In this example, reentry information into a first image 2110 in compressed form is used to take independent blocks of image data from the first image 2110 and to merge them into a second image 2130 on block boundaries. The concept works for more complex merging where overlapped partial blocks require more complex processing.

Figure 21C:
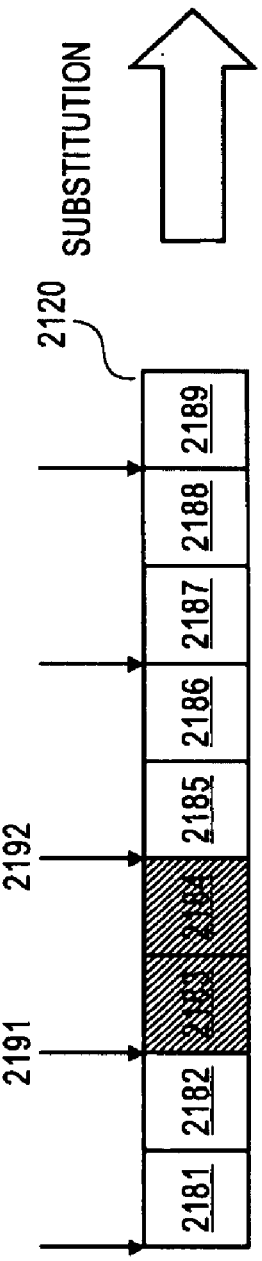
Figure 21D:
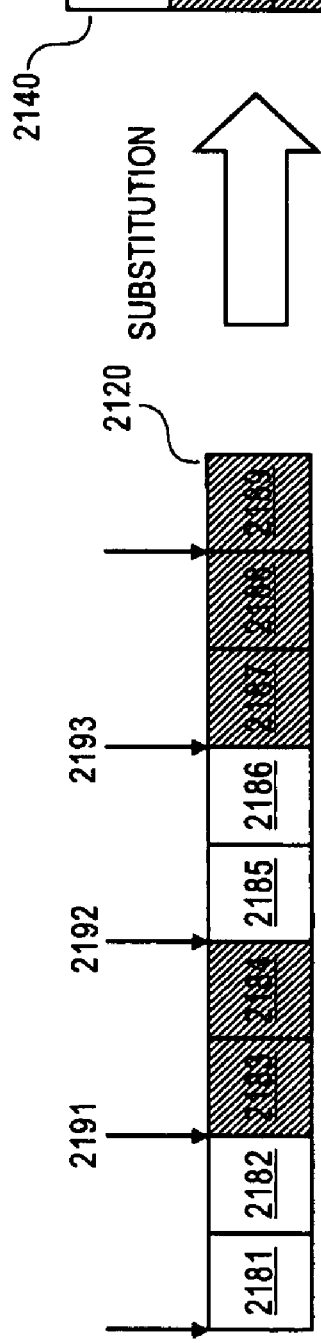

In a scenario where the second image 2130 is already decompressed and in storage, there is no need to decode the unused pieces of reconstructed data from the first image 2110. FIG. 21B illustrates that the first image 2110 exists in compressed form 2120 with periodic reentry information. FIG. 21C shows that the closest reentry information 2191 to the desired block 2184 enables decoding of blocks 2181 and 2182 to be skipped. Either the decoder may initiate decoding at reentry information 2191 or a reentry decoder may find the precise point to start decoding at 2184. The output replaces block 2104. In FIG. 21D, the reentry information 2193 is already correctly located and the rest of the compressed data may be decompressed and the output replaced.

When substitution of pieces of the first image 2110 are to be substituted into a compressed version of the second image 2130, then it is helpful to have reentry information into both compressed data streams. Additionally, the entropy code of the first substituted DC term needs to be corrected to reflect the predictor differences between the images at that point.

In an alternative embodiment, such a substitution can be made more efficient by generating reentry information precisely where needed.

Importantly, while this example has been illustrated with two-dimensional blocks, a similar substitution process may be used for dubbing one-dimensional audio data.

Parallel Decoding

Figure 22:
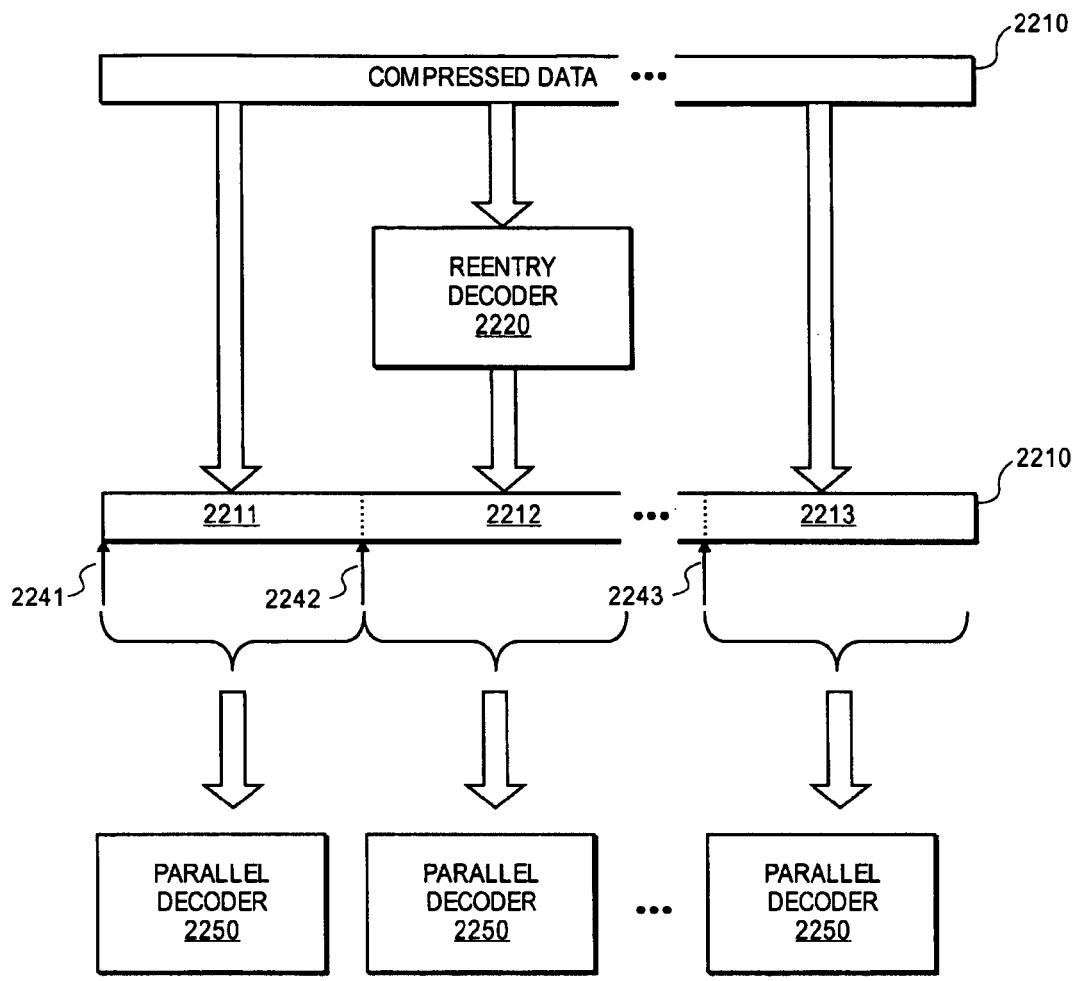
FIG. 22 conceptually illustrates parallel decoding processing according to one embodiment of the present invention.

FIG. 22 conceptually illustrates parallel decoding processing according to one embodiment of the present invention. In this example, compressed data 2210 is input into a reentry decoder 2220. The reentry decoder 2220 generates reentry information 2241, 2242, and 2243 into the compressed data 2210 that allows pieces of the compressed data 2211, 2212, and 2213 to be independently passed to multiple parallel decoders 2250. While in this example, a one-to-one correspondence exists between the number of pieces of compressed data 2211, 2212, and 2213 and the number of parallel decoders 2250, in a preferred embodiment, fewer parallel decoders 2250 may be employed and each may simply request another piece of compressed data upon completion of decoding of its piece. Importantly, the encoder and the compressed data are not affected. Rather, the reentry decoder 2220 may locally decide how many and what size to make the pieces of compressed data.

When there are fewer parallel decoders 2250 than pieces of compressed data 2211, 2212, and 2213, the pieces may be treated as a pool from which each parallel decoder 2250 pulls. That is, the parallel decoders 2250 decode from their current reentry starting point to the next reentry starting point and stop. Then, they request the next available reentry point from the pool.

Selecting Reentry Information to Minimize Storage

For the LZW text compression algorithm, the maximum size of the dictionary may be set in advance. New leaves are added until the maximum size is reached. The already generated leaves may be continued to be used until the content changes sufficiently so that the compression degrades. Then a "clear" code can tell the decoder that it should clear out the dictionary and reset to the minimum bits per codeword. The encoder is allowed to reset the dictionary by sending a "clear" code at anytime. Reentry information may include a bit pointer to the leading one bit contained in the clear code (decimal value 256 with a number of leading zeros dependent upon the size of the current codes). The encoder may also record information regarding the count of characters already compressed. Here is an example of where the encoder might choose to output the reentry information every time it encoded a "clear" code. The decoder may search for the closest preceding pointer to the desired data.

Overview of the Reordering of Compressed Data Embodiment

The goal of compressed data reordering is to save partial-out-of-order results as compressed data thereby minimizing internal buffers for intermediate results. The intermediate, out-of-order, pieces of compressed data, if decodable at all by a traditional decoder, would give scrambled reconstructed data. However, after the intermediate, out-of-order, pieces of compressed data are correctly ordered (without decoding), a traditional decoder can correctly reconstruct the manipulated data. For example, if there is 10:1 compression, saving the intermediate results in independently decodable pieces of compressed data would take an order of magnitude less buffering than saving the entire reconstructed manipulated data.

Figure 23:
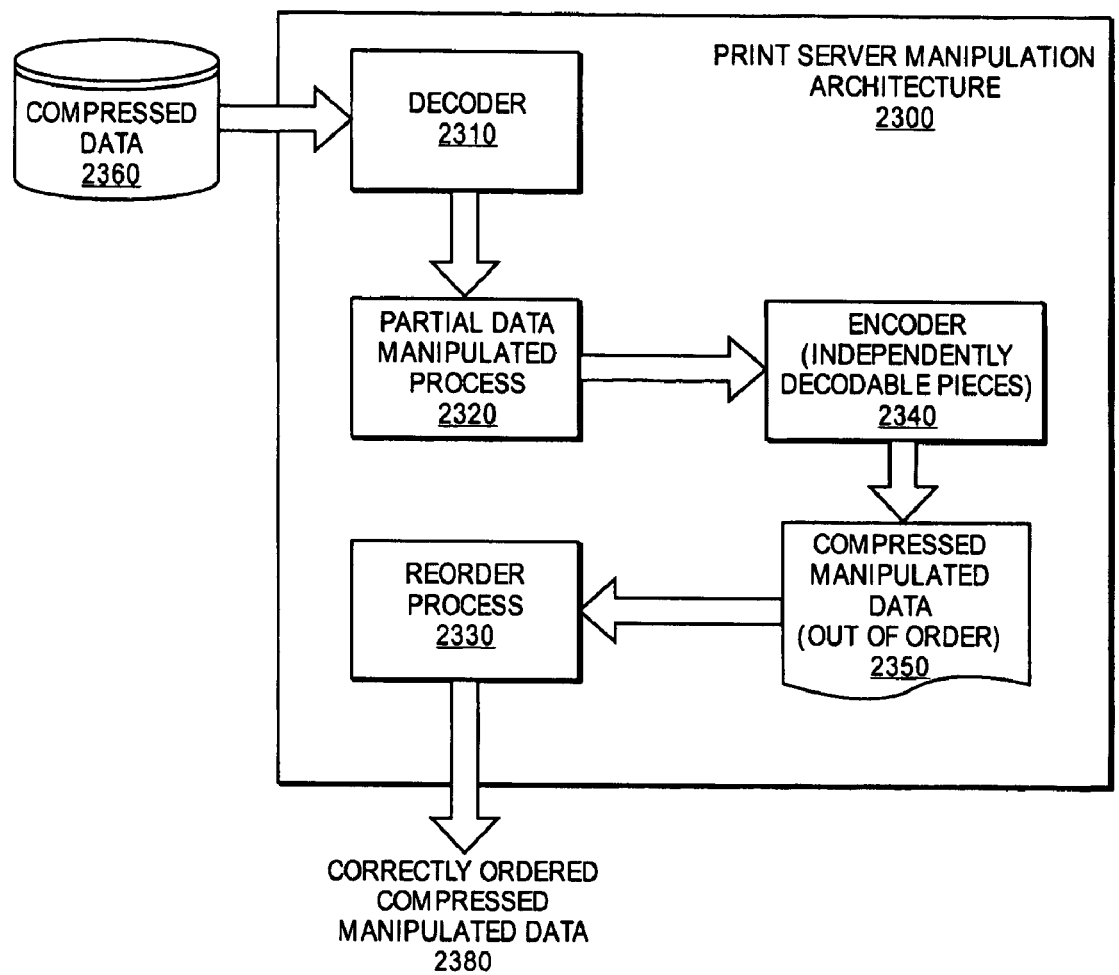
FIG. 23 is a block diagram illustrating an exemplary print server architecture for implementing manipulation with compressed data reordering according to one embodiment of the present invention.

FIG. 23 is a block diagram illustrating an exemplary print server architecture 2300 for implementing manipulation with compressed data reordering according to one embodiment of the present invention. In this example, the print server architecture 2300 includes a decoder 2310 that accepts compressed data 2360 input. The reconstructed data output by the decoder 2310 is input into a partial data manipulation process 2320. Importantly, this partial data manipulation process 2320 is able to work on less than the entire reconstructed data. Advantageously, in this manner, the buffering required by the print server architecture 2300 is greatly reduced. After manipulation, the manipulated data is encoded by encoder 2340 that compresses the manipulated data into independently decodable pieces. The compressed manipulated data 2350 may be stored out of order. Then, after enough compressed manipulated data 2350 is available, the reorder process 2330 orders the independently decodable pieces into the correct order (e.g., such that a traditional decoder can correctly reconstruct the manipulated data) and outputs the correctly ordered compressed manipulated data 2380.

Note that while decoder 2310 has been described as outputting reconstructed data so that the partial data manipulation is done in the real domain and then reencoded by encoder 2340, in an alternative embodiment, an entropy decoder (or partial decoder) may be employed. Thus, allowing the manipulation processing to be performed on descriptors in an intermediate domain and entropy reencoding (or partial reencoding). A specific example of manipulation processing in the transform domain (e.g., image rotation) will be described below with respect to FIG. 25.

Figure 24:
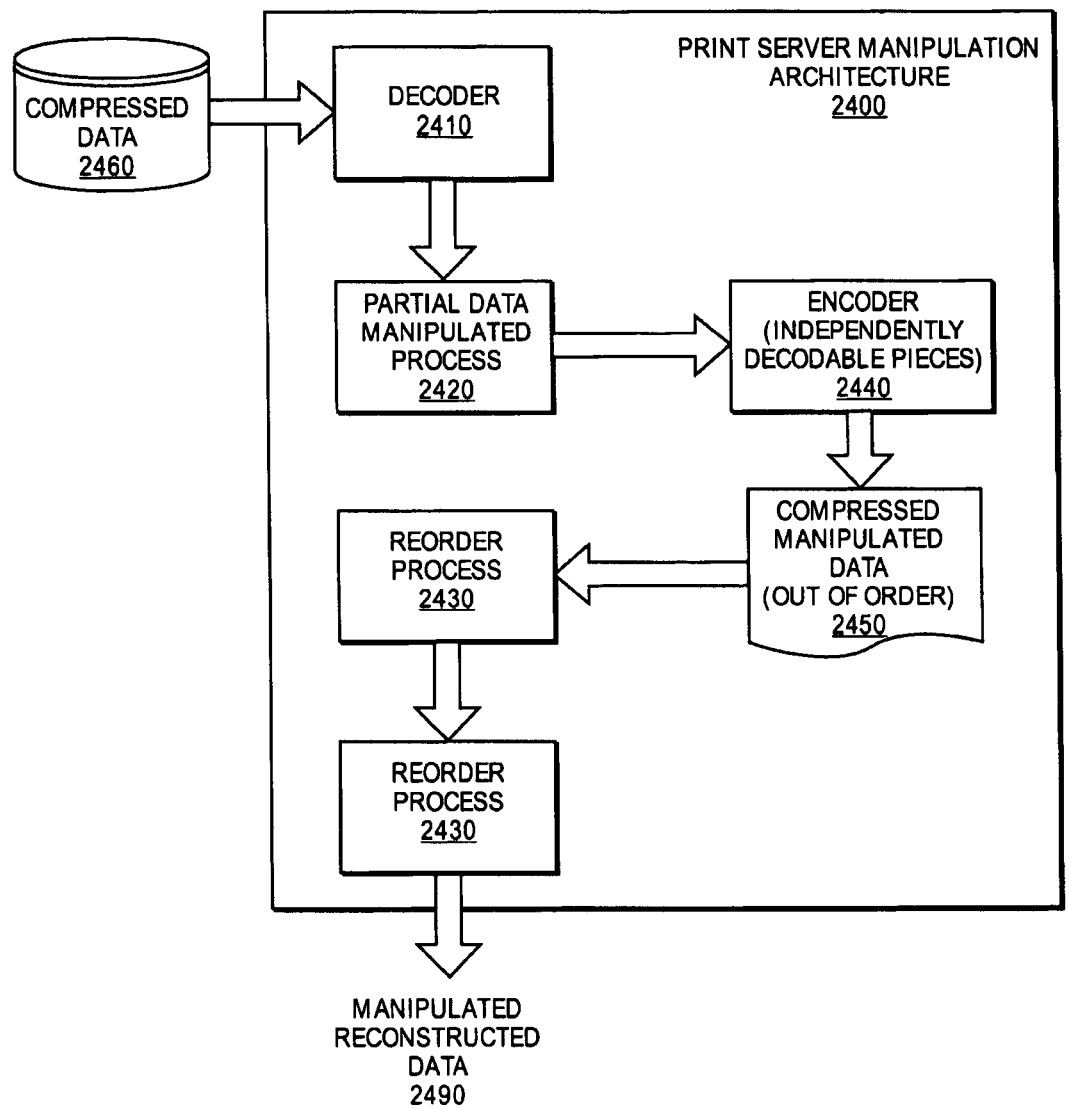
FIG. 24 is a block diagram illustrating an exemplary printer controller architecture for implementing manipulation with compressed data reordering according to one embodiment of the present invention.

FIG. 24 is a block diagram illustrating an exemplary printer controller architecture 2400 for implementing manipulation with compressed data reordering according to one embodiment of the present invention. In this example, the printer controller architecture 2400 includes a decoder 2410 that accepts compressed data 2460 input. The reconstructed data output by the decoder 2410 is input into a partial data manipulation process 2420. Again, the partial data manipulation process 2420 is able to work on less than the entire reconstructed data. Advantageously, in this manner, the buffering required by the printer controller architecture 2400 is greatly reduced. After manipulation, the manipulated data is encoded by encoder 2440 that compresses the manipulated data into independently decodable pieces. The compressed manipulated data 2450 may be stored out of order. Then, after enough compressed manipulated data 2450 is available, the reorder process 2430 orders the independently decodable pieces into the correct order, such that a decoder 2410 can correctly reconstruct the manipulated data 2490.

Note that while decoder 2410 has been described as outputting reconstructed data so that the partial data manipulation is done in the real domain and then reencoded by encoder 2440, in an alternative embodiment, an entropy decoder (or partial decoder) may be employed. Thus, allowing the manipulation processing to be performed on descriptors in an intermediate domain and entropy reencoding (or partial reencoding). Decoder 2415 could be the same as decoder 2410 if they are both full decoders.

Figure 25:
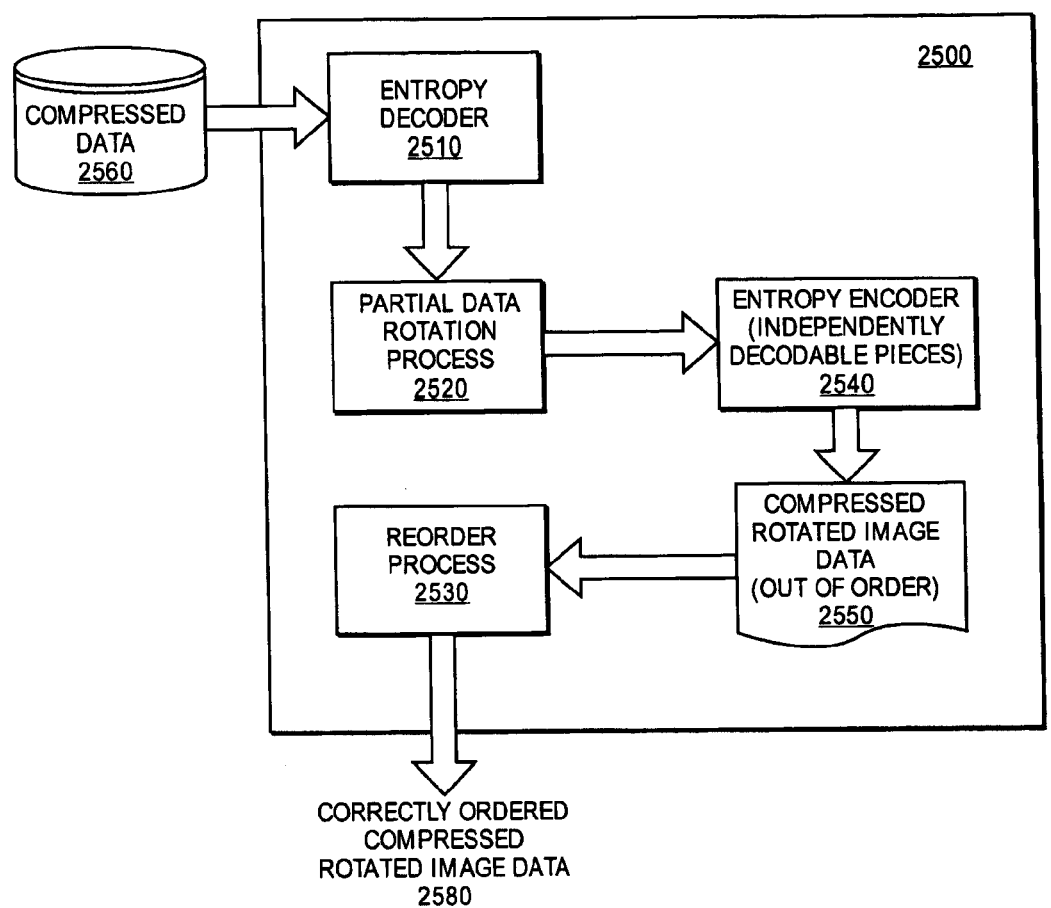
FIG. 25 is a block diagram illustrating an exemplary architecture for implementing rotation with compressed image reordering according to one embodiment of the present invention.

FIG. 25 is a block diagram illustrating an exemplary architecture for implementing rotation with compressed image reordering according to one embodiment of the present invention. In the example depicted, the rotation architecture 2500 includes an entropy decoder 2510 that accepts compressed data 2560 input. The quantized transform coefficients, e.g., descriptors, output by the entropy decoder 2510 are input into a partial data rotation process 2520. This partial data rotation process 2520 is able to work on individual MCUs or groups of MCUs in accordance with FIGS. 15 and 16. Advantageously, in this manner, the buffering required by the rotation architecture 2500 is greatly reduced. After rotation, the rotated descriptors are entropy encoded by entropy encoder 2540 into independently decodable pieces. The compressed rotated image data 2550 may be stored out of order. Then, after enough compressed rotated image data 2550 is available, the reorder process 2530 orders the independently decodable pieces in the correct order (e.g., such that a traditional decoder can correctly reconstruct the rotated image data) and outputs the correctly ordered compressed rotated image data 2580.

Figure 26:
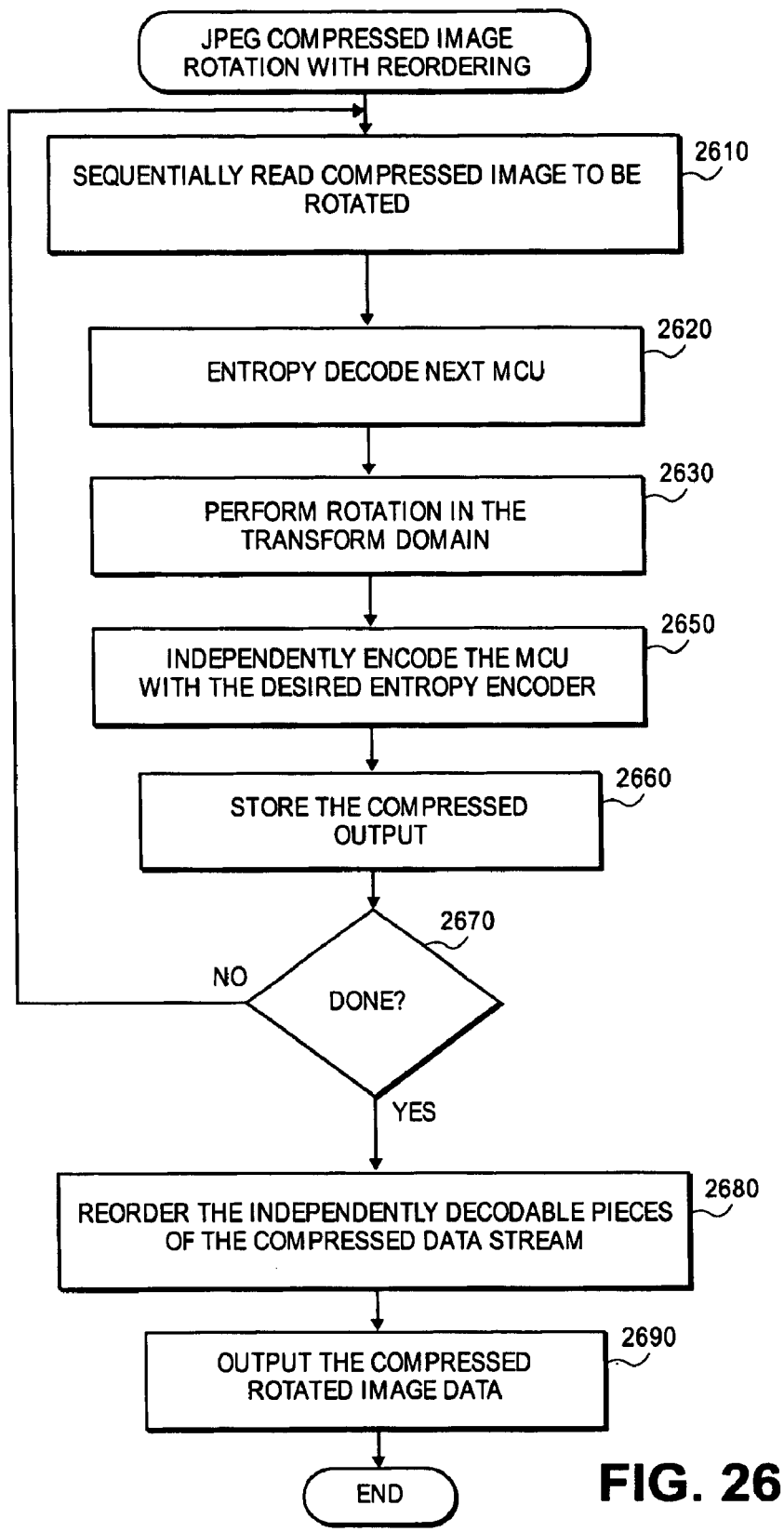
FIG. 26 is a flow diagram illustrating JPEG compressed image rotation with reordering according to one embodiment of the present invention.

FIG. 26 is a flow diagram illustrating JPEG compressed image rotation with reordering according to one embodiment of the present invention. At processing block 2610, the next piece of compressed data is sequentially read, if needed (there may still be enough from the last read operation), from a JPEG compressed image. At processing block 2620, entropy decoding is performed for the next MCU. At processing block 2630, the MCU is rotated in the transform domain according to FIGS. 15 and 16. At processing block 2650, the rotated MCU is independently encoded with the desired entropy encoder. In this context, an example of independent encoding is to insert a restart marker after every MCU. At processing block 2660, the compressed rotated MCU is stored. At decision block 2670, it is determined whether the JPEG compressed image is done, i.e., no more MCUs to be rotated. If so, processing continues with processing block 2680. Otherwise, processing returns to processing block 2610. At processing block 2680, the stored independently decodable pieces of compressed data are reordered. In the final processing block 2690, the compressed rotated image data is output.

In the example above, restart markers were added after every MCU. Assuming there is only one component and an MCU consists of only one block and assuming 10:1 compression, the original 64 bytes compressed to 6.4 bytes. After addition of a 2 byte restart marker and an average of one half byte of padding to byte boundaries, the block compresses to 8.9 bytes. Therefore, the 2 byte restart marker plus the padding add approximately 40% to the compressed data. However, this still results in a 7.2:1 compression ratio. In an embodiment where there are three interleaved components of identical size, the overhead is approximately 13%. If the luminance size is twice in each direction as the chrominance, then the overhead is only approximately 6.5% and the compression ratio is 9.4:1. This analysis does not take into account the effect of restarting the DC prediction at each marker. However, this effect is thought to be minimal. This analysis is effectively worse case. Typically there will be multiple MCUs in each restart interval. In the 10:1 compression ratio example, if 10 blocks are compressed between restart markers, the overhead would drop to approximately 4%.

Figure 27:
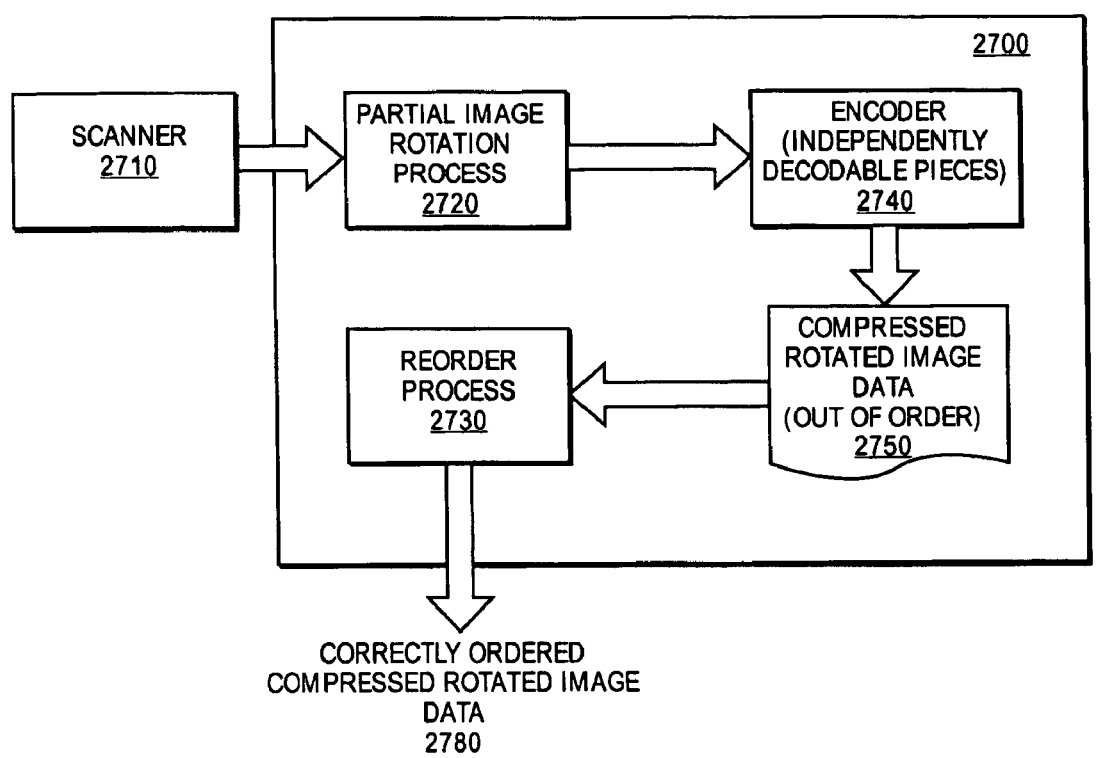
FIG. 27 is a block diagram illustrating an exemplary architecture for implementing partial image rotation of scanned image data according to one embodiment of the present invention.

FIG. 27 is a block diagram illustrating an exemplary rotation architecture 2700 for implementing partial image rotation of scanned image data according to one embodiment of the present invention. The rotation architecture 2700 depicted, includes a partial image rotation process 2720 that is capable of operating on a subset of an image received from a scanner 2710. The partial image rotation process 2720 takes the image in the buffer and provides a rotated version to the encoder 2740. The encoder 7740 encodes the rotated regions of the scanned image into independently decodable pieces of compressed data by inserting codes to separate the independently decodable pieces of compressed data. For JPEG, these codes are the restart markers. The compressed rotated image data 2750 may be stored out of order. Then, after enough compressed rotated image data 2750 is available, the reorder process 2730 orders the independently decodable pieces into the correct order (e.g., such that a traditional decoder can correctly reconstruct the rotated image data) and outputs the correctly ordered compressed rotated image data 2780.

Figure 28:
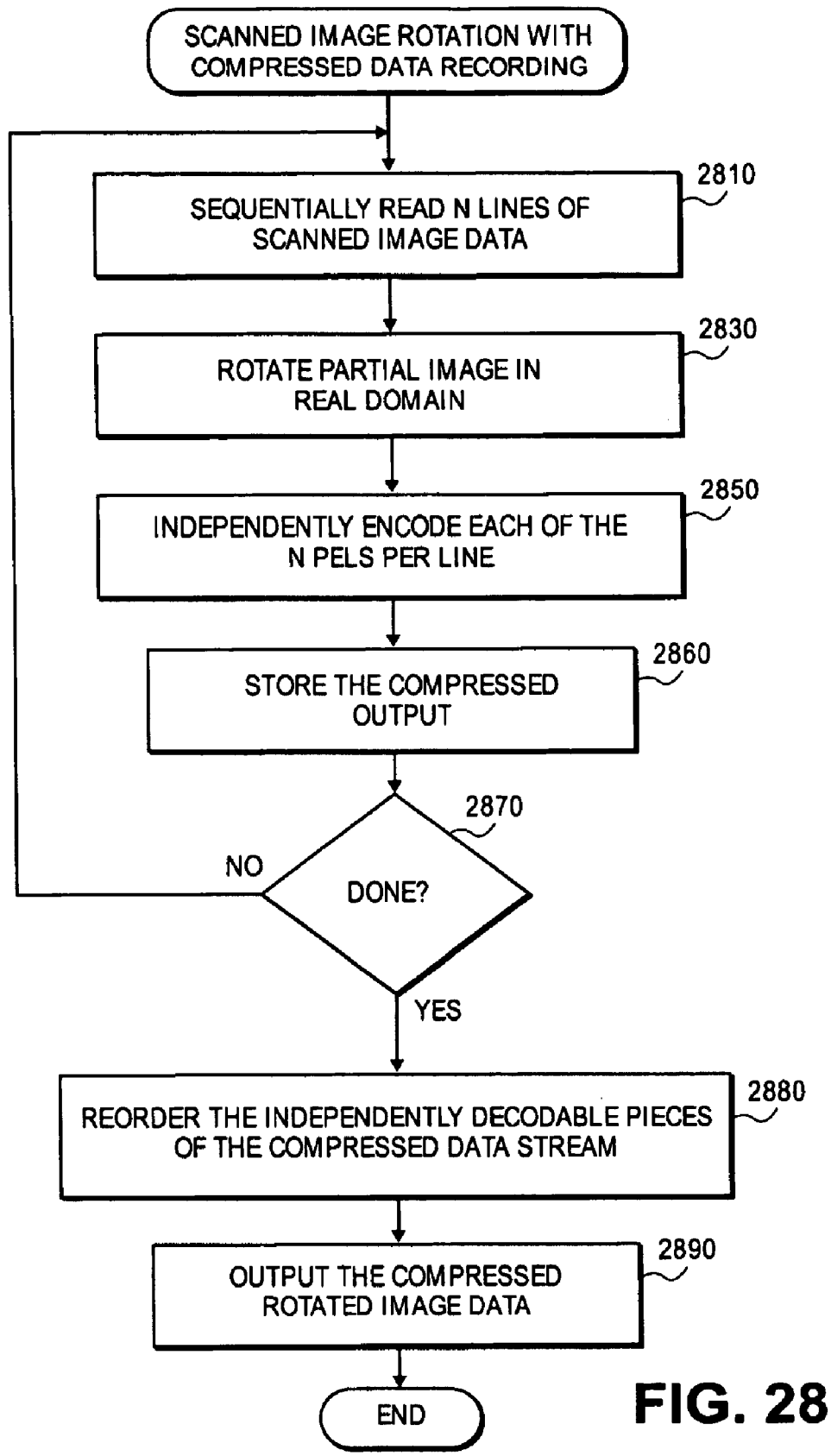
FIG. 28 is a flow diagram illustrating partial image rotation of scanned image data according to one embodiment of the present invention.

FIG. 28 is a flow diagram illustrating partial image rotation of scanned image data according to one embodiment of the present invention. The rotation process begins at processing block 2810 where the next N lines of scanned image data are read. At processing block 2830, the partial image is rotated in the real domain. The rotated partial image is then encoded to produce independently decodable pieces of compressed data at processing block 2850. The compressed rotated output is stored at processing block 2860. At decision block 2870, it is determined whether the scanned image is done, i.e., no more lines to be rotated. If so, processing continues with processing block 2880. Otherwise, processing returns to processing block 2810. At processing block 2880, the stored independently decodable pieces of compressed data are reordered. In the final processing block 2890, the compressed rotated image data is output.

Figure 29C:
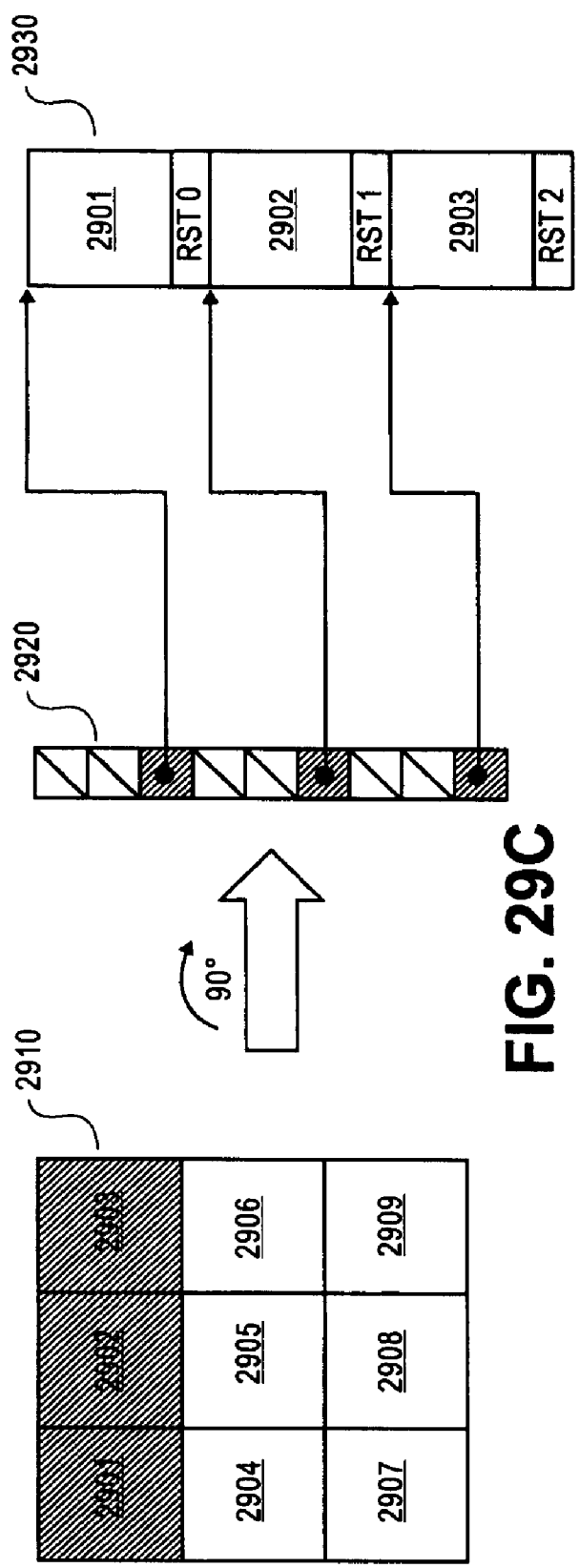
Figure 29D:
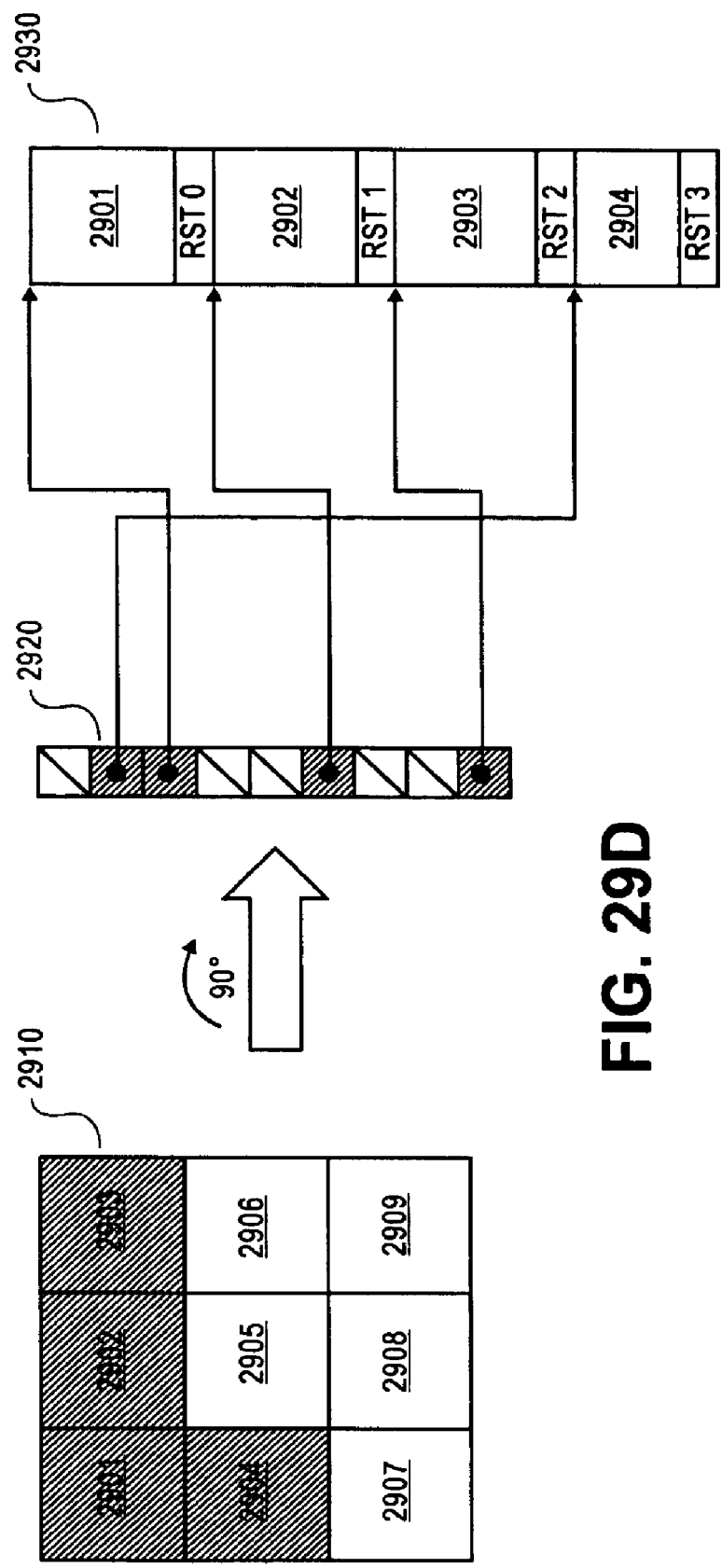
Figure 29E:
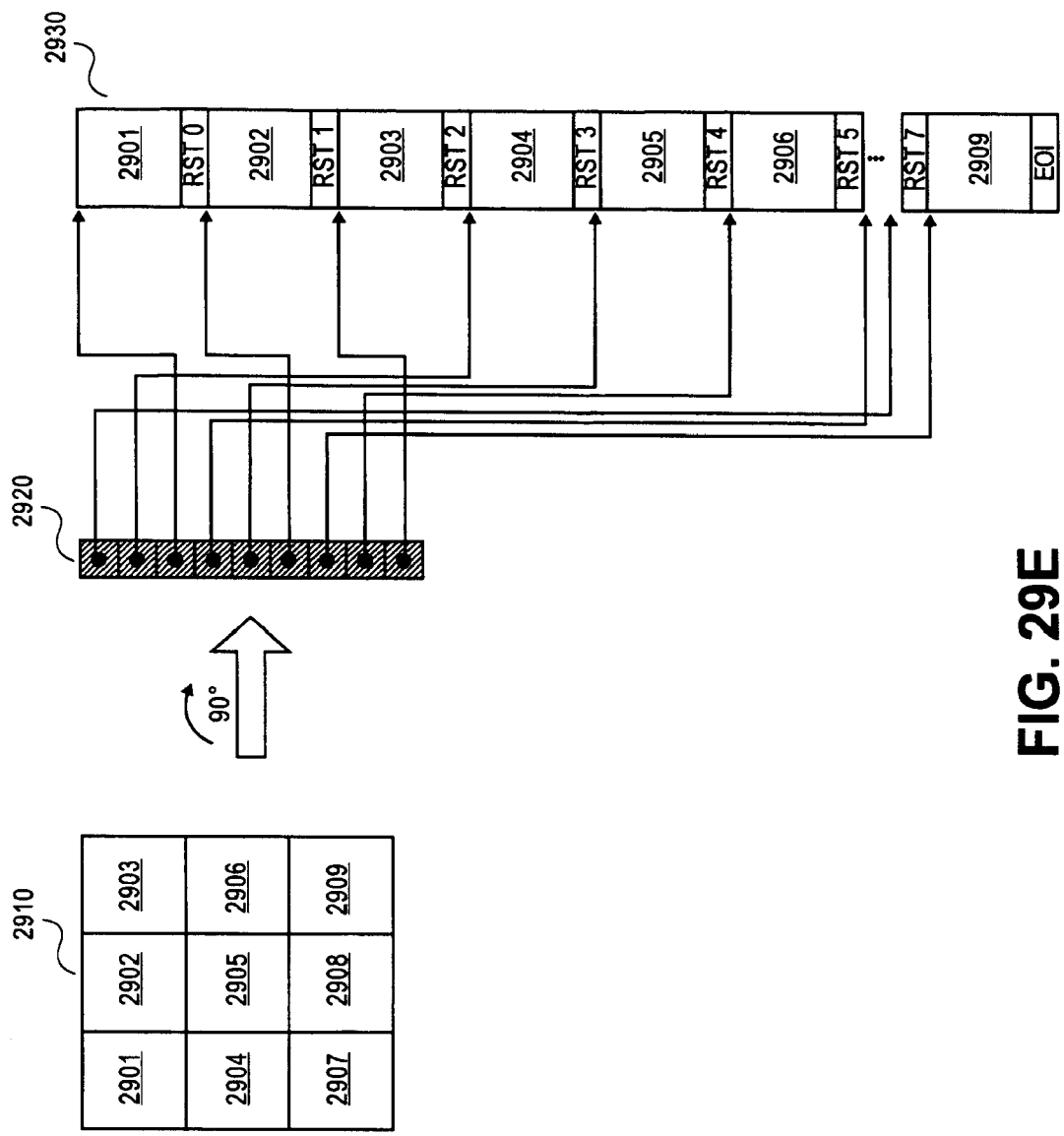

FIGS. 29A–29H conceptually illustrate the scanned image rotation processing of FIGS. 27 and 28. In the example depicted, source image data 2910 is rotated 90 degrees (clockwise). Each of the regions of source data 2901–2909 may be transformed into a corresponding JPEG MCU. A list of byte pointers 2920 may be created to be later used by the reorder process. FIG. 29A shows the first block 2901 processed (rotated and compressed) will be output third in correct compressed rotated order, but is first in a compressed data stream 2930 comprising independently decodable out-of-order pieces of compressed data. In FIG. 29B, a pointer is stored to the second block 2902 such that the second block 2902 will be output sixth in correct compressed rotated order and second in the compressed data stream 2930. In FIG. 29C, the third block 2903 processed (rotated and compressed) will be output last in correct compressed rotated order. In FIG. 29D, a pointer is stored to the fourth block 2904 such that the fourth block 2902 will be output second in correct compressed rotated order. Finally, FIG. 29E shows the final block 2909 will be output seventh in correct compressed rotated order, but currently has the last position and is followed by an end of image (EOI) marker.

In this example, the encoder output is shown as compressed blocks 2901–2909 with sequential restart markers indicating that the encoder is unaware that the data is actually out of order. In an alternative embodiment, the encoder can have such knowledge and update the modulo counters contained in the restart markers to reflect the correct order.

Figure 29F:
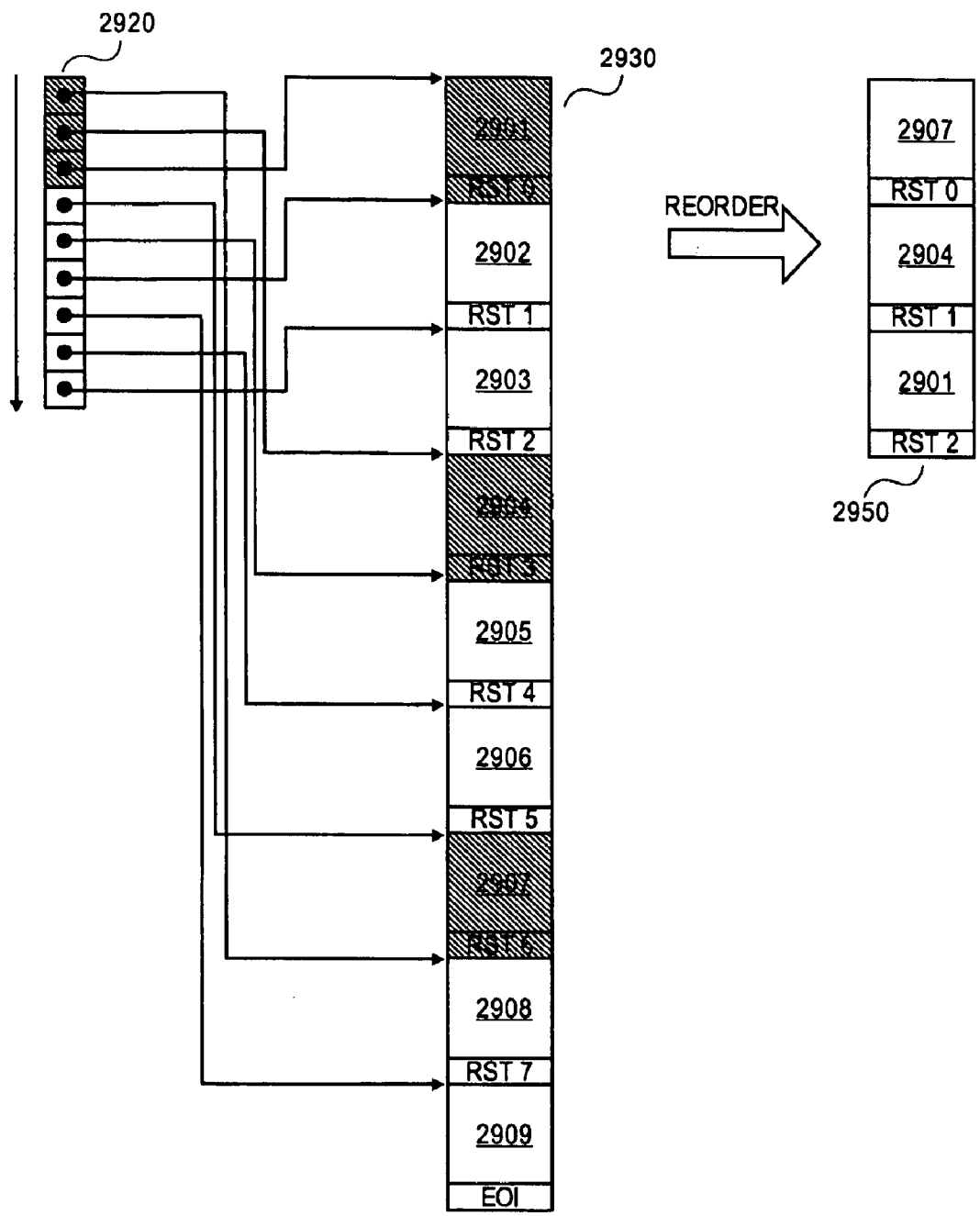
Figure 29G:
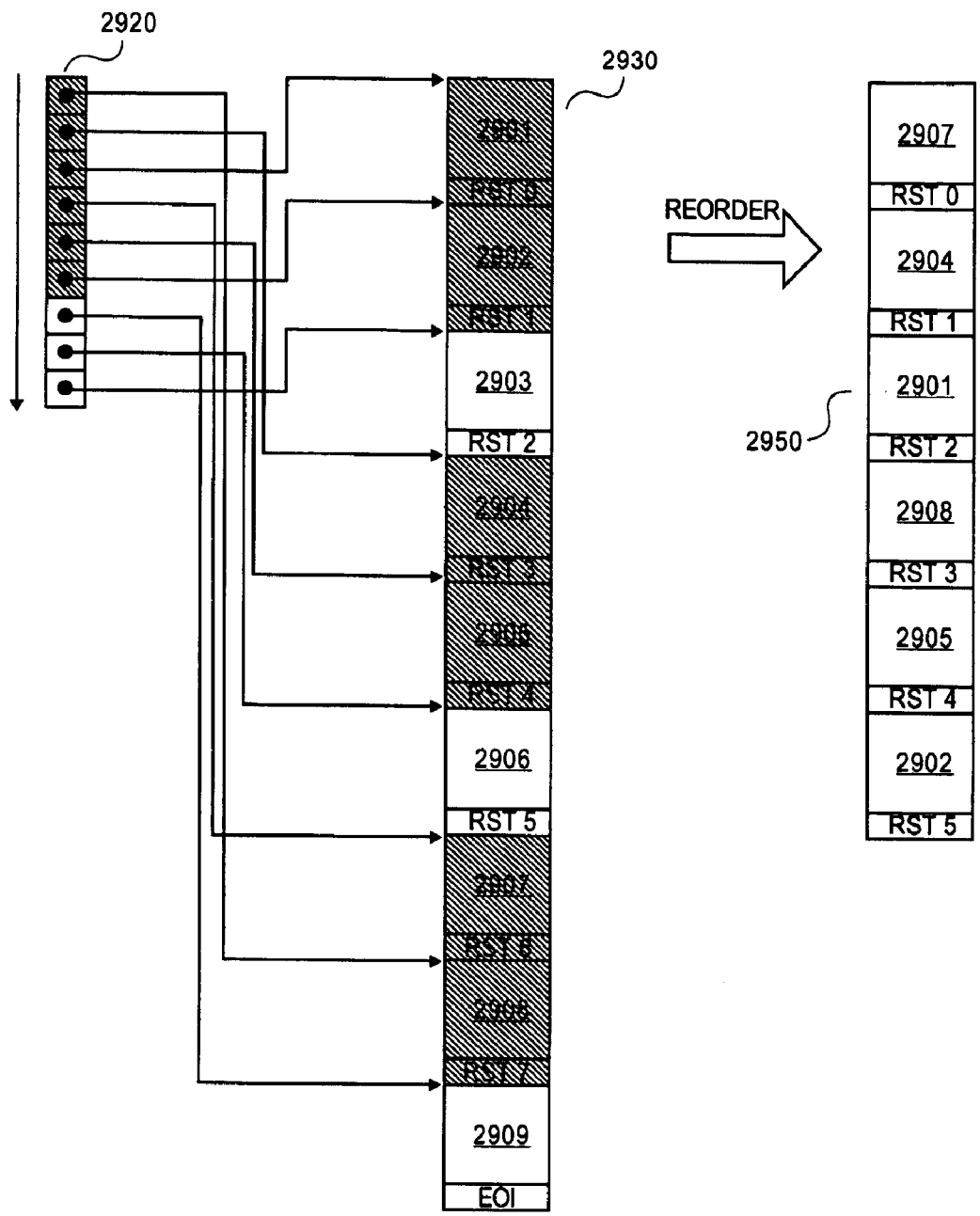
Figure 29H:
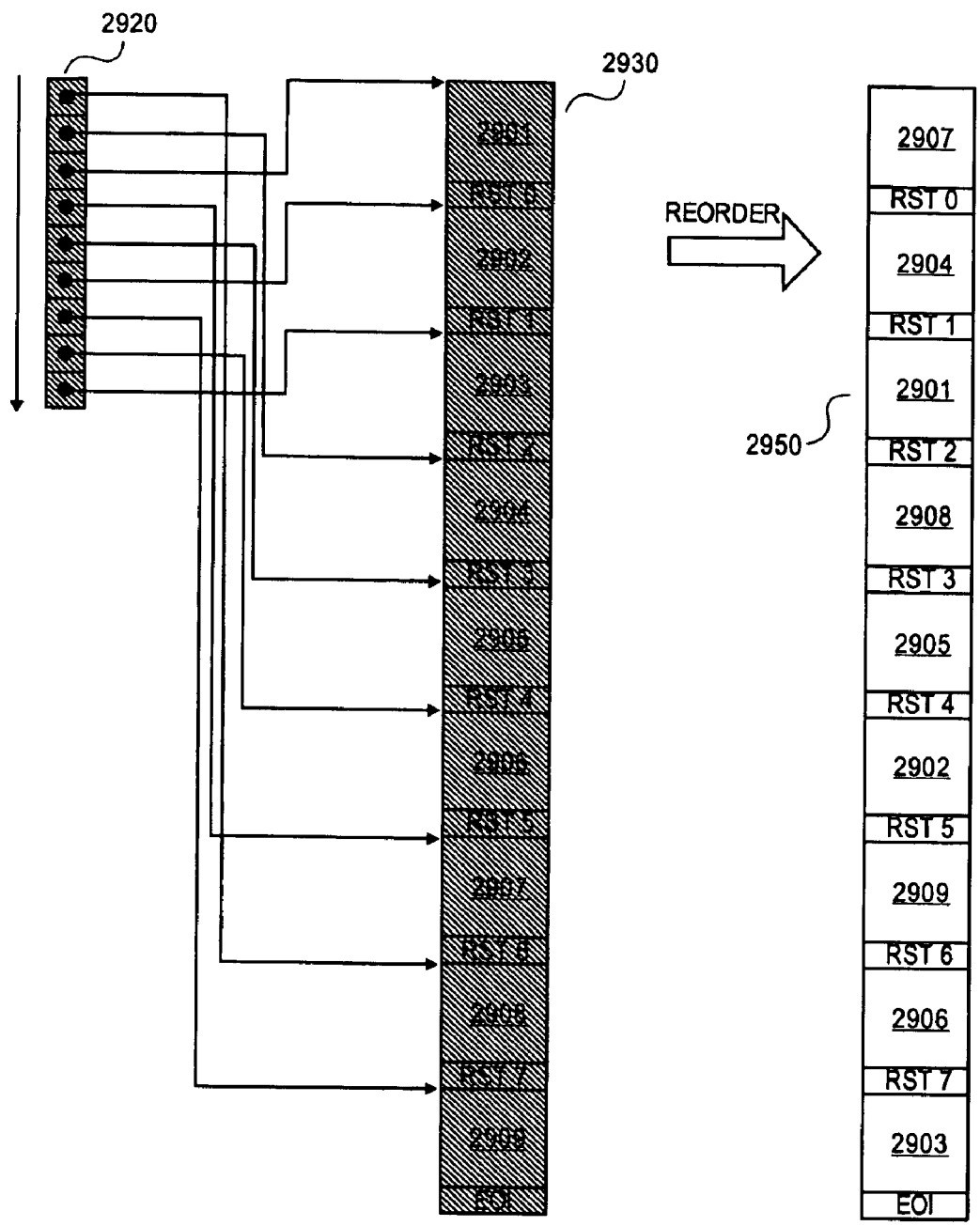

FIG. 29F uses the list of byte pointers 2920 to reorder the compressed blocks 2901–2909 into correct rotated order. As the reorder process traverses the list of byte pointers 2920 and reorders the compressed rotated data, it may update the modulo counters contained in the restart markers to reflect the correct order. FIGS. 29G and 29H continue the reordering process for the second and third rows.

While in this example, the reorder process is shown to be creating a second copy 2950 of the compressed blocks in the correct rotated order with sequential restart markers in between, in alternative embodiments, the correctly ordered compressed rotated data may be output to the next stage of processing (e.g., a decoder, a storage device, a transmission device, etc.) as the list of byte pointers 2920 is traversed.

For convenience, the compressed data for each block is shown as the same size as the source blocks 2901 to 2909 and identified with the same number. Alternatively, the source data 2910 may originally be in compressed form and transcoded into a compressed data stream 2930 comprising independently decodable pieces of compressed data.

Various other implementations are possible. For example, in alternative embodiments, the list of byte pointers 2920 may be created after compression by a parser that scans the compressed data stream 2930 for the restart markers and remembers their positions. Another alternative is to not maintain the list of byte pointers 2920 at all and simply have the parser take multiple passes through the compressed data stream 2930 and skip the entropy encoded segments between a predetermined number of restart markers as it finds the desired pieces in the correct order.

Figure 30:
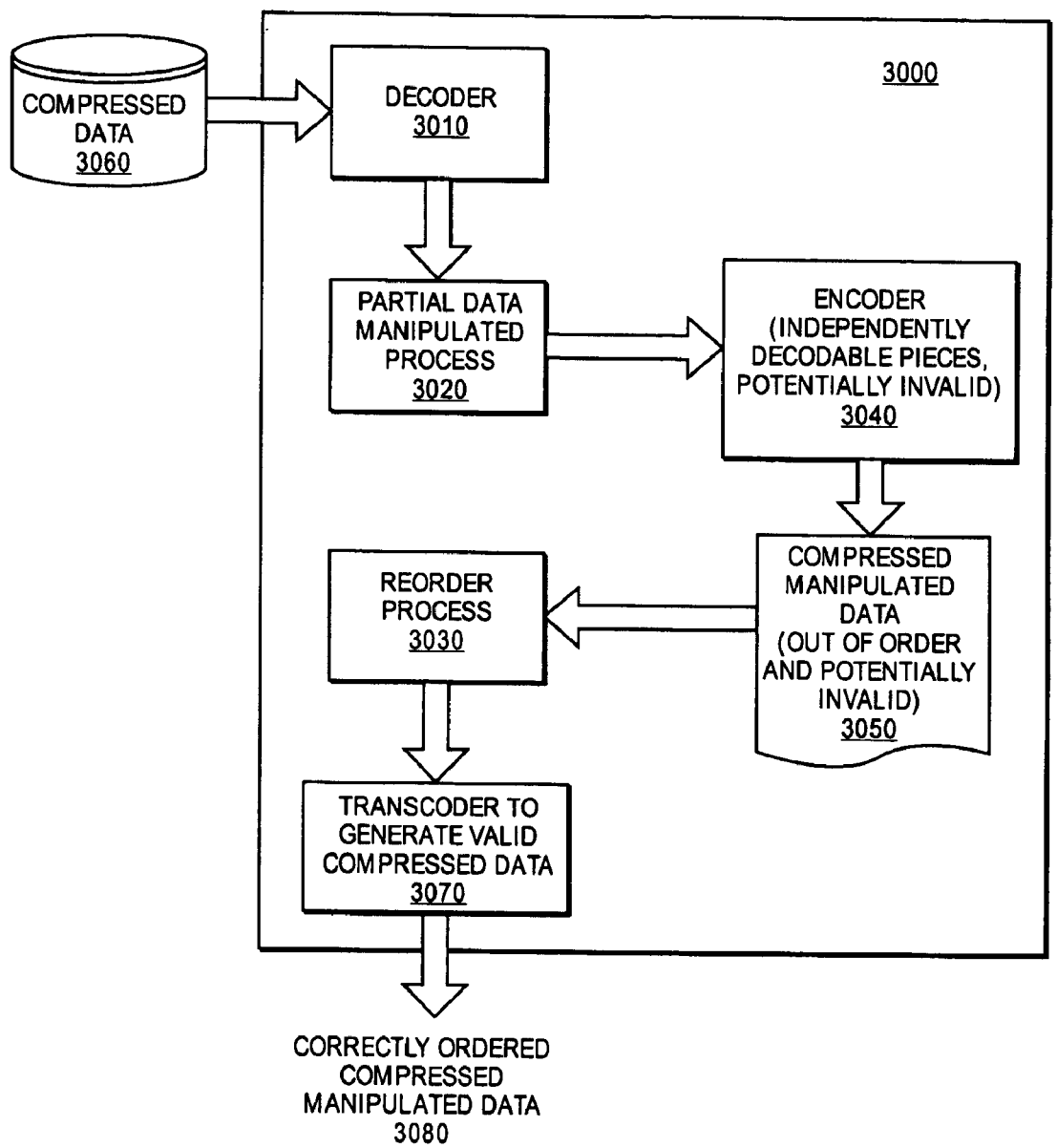
FIG. 30 is a block diagram illustrating an exemplary architecture for implementing rotation with compressed image reordering according to another embodiment of the present invention.

FIG. 30 is a block diagram illustrating an exemplary manipulation architecture 3000 for implementing manipulation with compressed data reordering according to another embodiment of the present invention. In the above examples, the compressed manipulated data has been stored out of order. However, the compressed manipulated data would properly decode even though reconstructed data would be scrambled. That is, the compressed manipulated data was a valid data stream although out of order. In the present example, the compressed manipulated data may potentially be stored in an intermediate representation that traditional decoders would consider invalid.

The manipulation architecture 3000 of the present example, includes a decoder 3010 that accepts compressed data 3060 input. The reconstructed data output by the decoder 3010 is input into a partial data manipulation process 3020. As explained above, the partial data manipulation process 3020 is able to work on less than the entire reconstructed data thereby greatly reducing the buffering that would otherwise be required. After manipulation, the manipulated data is encoded by encoder 3040 into independently decodable pieces.

Importantly, because of the closed environment of the manipulation architecture 3000, the encoding process is not obligated to produce a valid compressed data stream (e.g., one that would be capable of error-free processing by a traditional decoder). Consequently, the encoder may arbitrarily insert codes to separate the independently pieces of compressed data without regard to standards, e.g., JPEG restart markers on varying restart intervals rather than fixed intervals, multiple G3 end of line (EOL) codes per line, multiple JBIG SDRST markers per line instead of being limited to one per stripe where a stripe is at least a full line, or lossless JPEG with multiple restarts per line instead of being limited to restarts at the end of one or more complete lines. For example, it may be convenient to include multiple separator codes per line because the partial data manipulation process 3020 only outputs partial rotated lines. Importantly, the invalid compressed data steam may need some local state information that is not part of the compressed data. For example, locally stored reentry information may be used to enable decoding even for a data stream format that does not provide for independently decodable pieces.

The compressed manipulated data 3050 may be stored out of order. Then, after enough compressed manipulated data 3050 is available, the reorder process 3030 orders the independently decodable pieces into the correct order, but in this case it is the transcoder 3070 that creates a valid compressed data stream 3080 such that a traditional decoder can correctly reconstruct the manipulated data. For example, if the compressed manipulated data output by the reorder process 3030 is a G3 compressed data stream that is invalid as a result of having multiple EOLs per line, then the transcoder 3070 may generate valid compressed data by rejoining the runs and removing the extra EOLs to form a valid G3 compressed data stream having only one EOL per line. Alternatively, the transcoder 3070 may create any other valid compressed data stream for bilevel image data. If the compressed manipulated data output by the reorder process 3030 is a JBIG compressed data stream that is invalid as a result of having multiple SDRST markers per stripe, then the transcoder 3070 may generate valid compressed data by rejoining the runs and removing the extra SDRST markers to form a valid JBIG compressed data stream having only one SDRST per stripe or SDNRM per stripe. Alternatively, the transcoder 3070 may create any other valid compressed data stream for bilevel image data.

Figure 31:
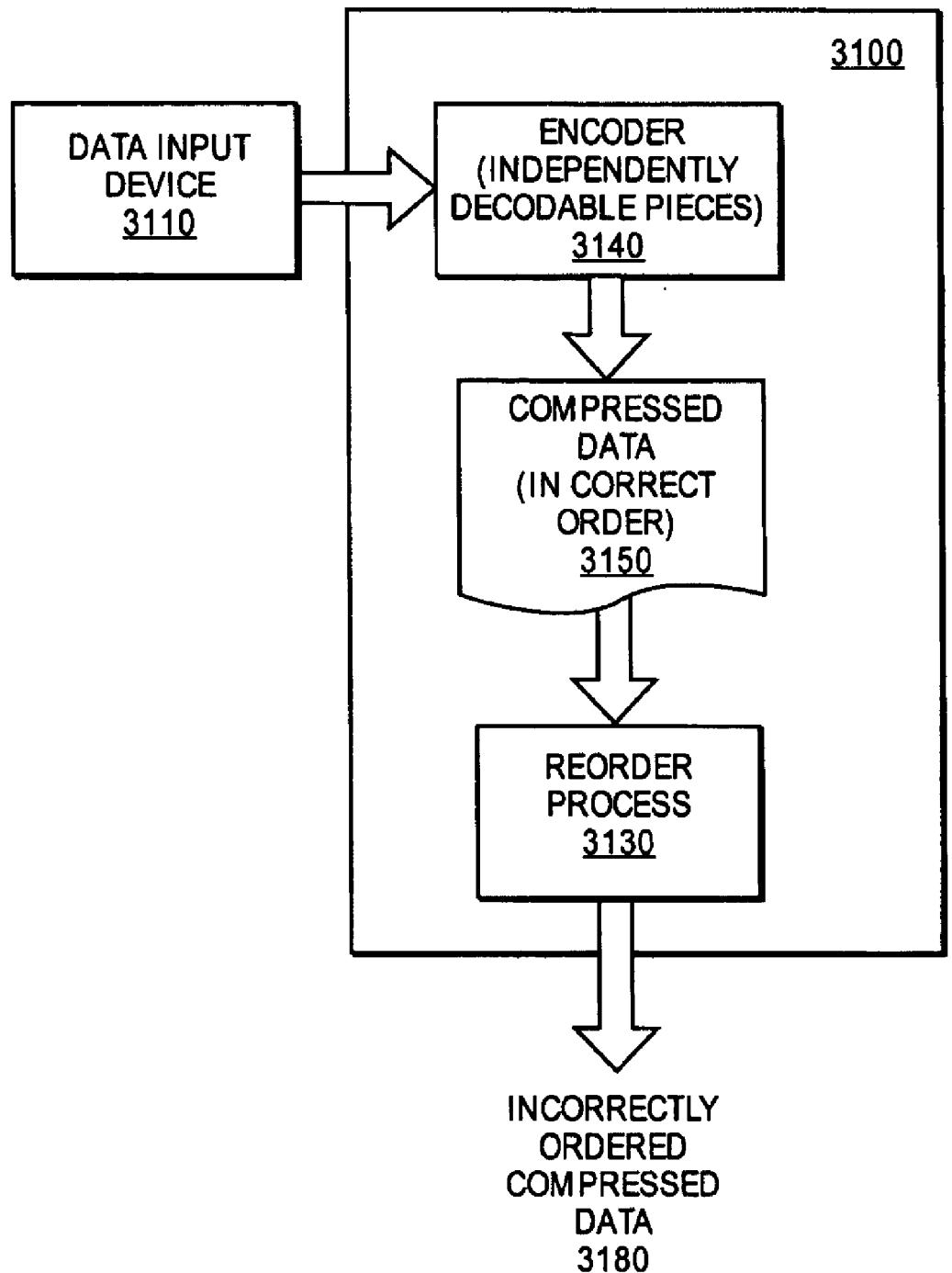
FIG. 31 is a block diagram illustrating an exemplary reordering architecture for outputting incorrectly ordered compressed data according to one embodiment of the present invention.

FIG. 31 is a block diagram illustrating an exemplary reordering architecture 3100 for outputting incorrectly ordered compressed data according to one embodiment of the present invention. The reordering architecture 3100 of the present example includes an encoder 3140 that receives input data from data input device 3110. The data input device 3110 may be an audio microphone for capturing audio data, a scanner for capturing image data, an instrument for capturing scientific data, etc. The encoder 3140 produces and stores independently decodable pieces of compressed data in the correct input order 3150. The reorder process 3130 creates incorrectly ordered compressed data 3180 by shuffling the pieces of independently decodable pieces of compressed data according to the needs of a later manipulation stage, for example, as shown in FIG. 32.

Figure 32:
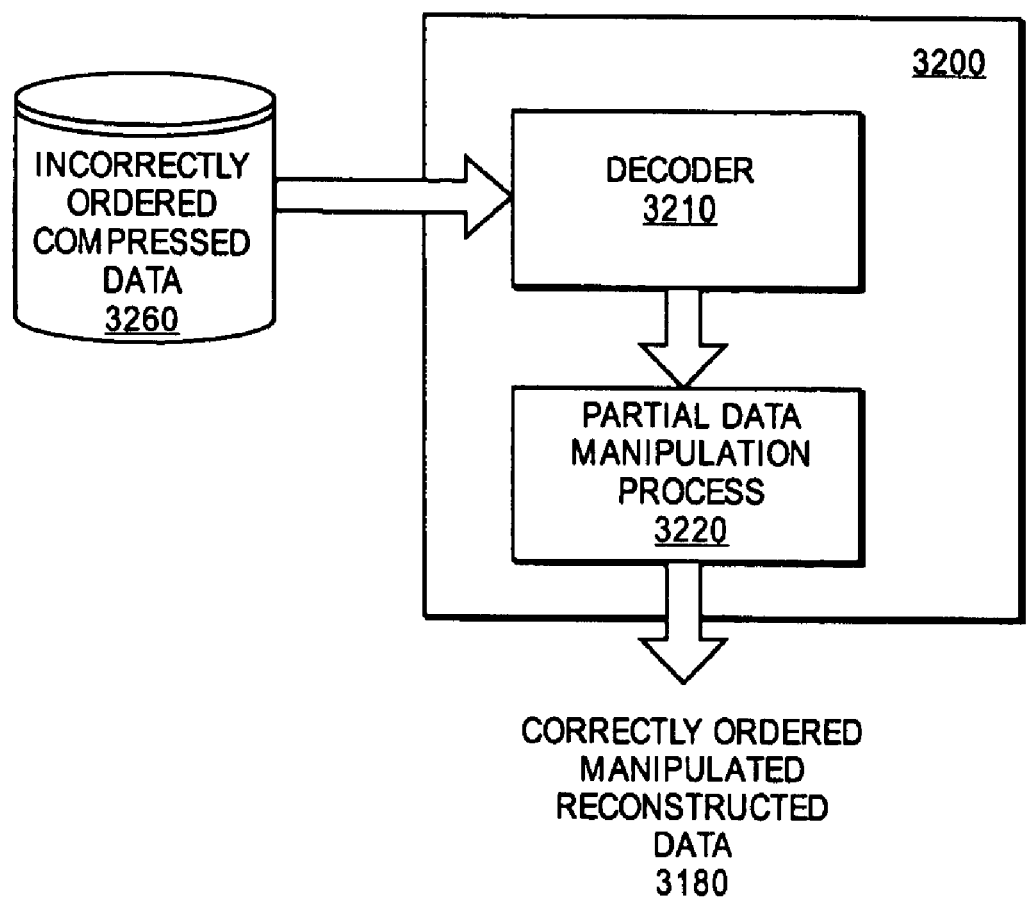
FIG. 32 is a block diagram illustrating an exemplary decoder architecture for manipulating incorrectly ordered compressed data according to one embodiment of the present invention.

FIG. 32 is a block diagram illustrating an exemplary decoder architecture 3200 for manipulating incorrectly ordered compressed data according to one embodiment of the present invention. In this example, the decoder architecture 3200 includes a decoder 3210 configured to receive incorrectly ordered compressed data, i.e., the data would appear scrambled if no further manipulation were done. However, since the incorrectly ordered compressed data was designed to minimize buffering for the partial data manipulation process 3220 and to enable correct ordering upon output from the partial data manipulation process 3220, correctly ordered reconstructed manipulated data 3280 is what is output. In an alternative embodiment, the decoder architecture 3200 may also include an encoder to reencode the manipulated reconstructed data. Alternatively, the decoder 3210 and the partial data manipulation process 3220 may be combined as a special purpose decoder. According to yet another alternative embodiment, an entropy decoder may replace decoder 3210 and the partial data manipulation processing may take place in an intermediate domain.

While the examples above have separately illustrated reentry into compressed data and reordering of compressed data, there are situations in which it is expected to be convenient to utilize both techniques in combination. For example, it might be useful to have reentry information between restart markers.

Figure 33:
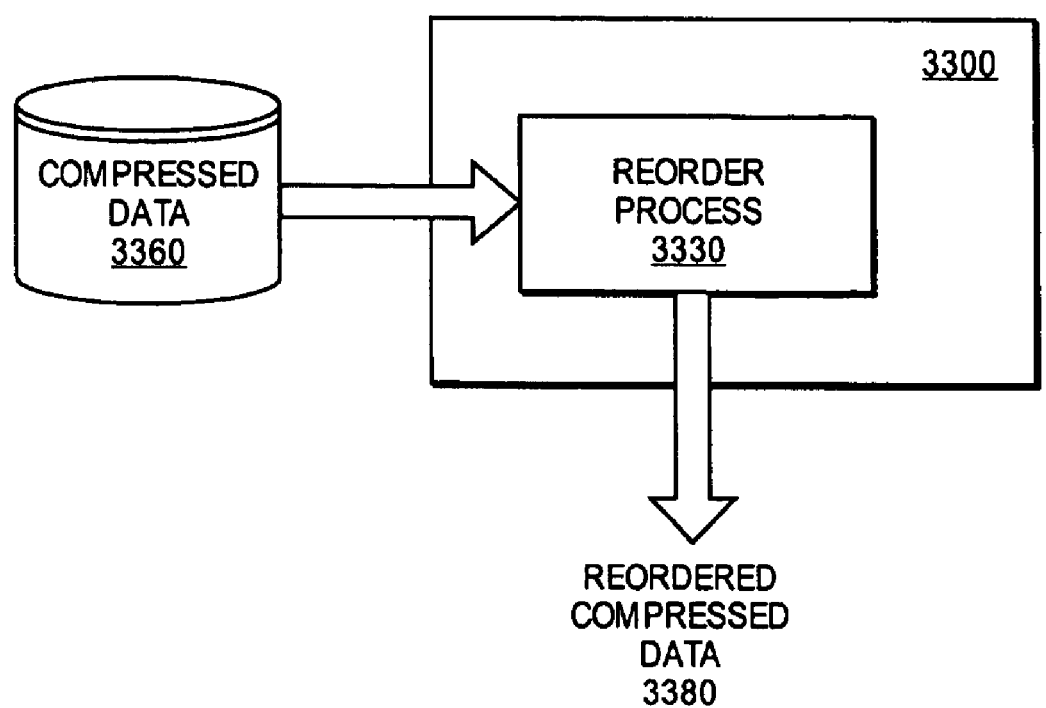
FIG. 33 is a block diagram illustrating an exemplary reorder architecture for reordering compressed data as an independent process according to one embodiment of the present invention.

FIG. 33 is a block diagram illustrating an exemplary reorder architecture 3300 for reordering compressed data as an independent process according to one embodiment of the present invention. The reorder architecture 3300 includes a reorder process 3330 that receives compressed data 3360 and outputs reordered compressed data 3380. If the compressed data 3360 includes independently decodable pieces of compressed data (either through the inclusion of reentry information or separator codes that allow independent decoding), then the reorder process 3330 simply comprises a shuffle operation. However, if the compressed data 3360 does not include independently decodable pieces of compressed data, then the reorder process 3330 may additionally include a reentry decoder to generate sufficient reentry information to allow the reordering to be accomplished. Importantly, the reorder process 3330 reorders pieces of compressed data that may have begun in correct or incorrect output order.

Figure 34:
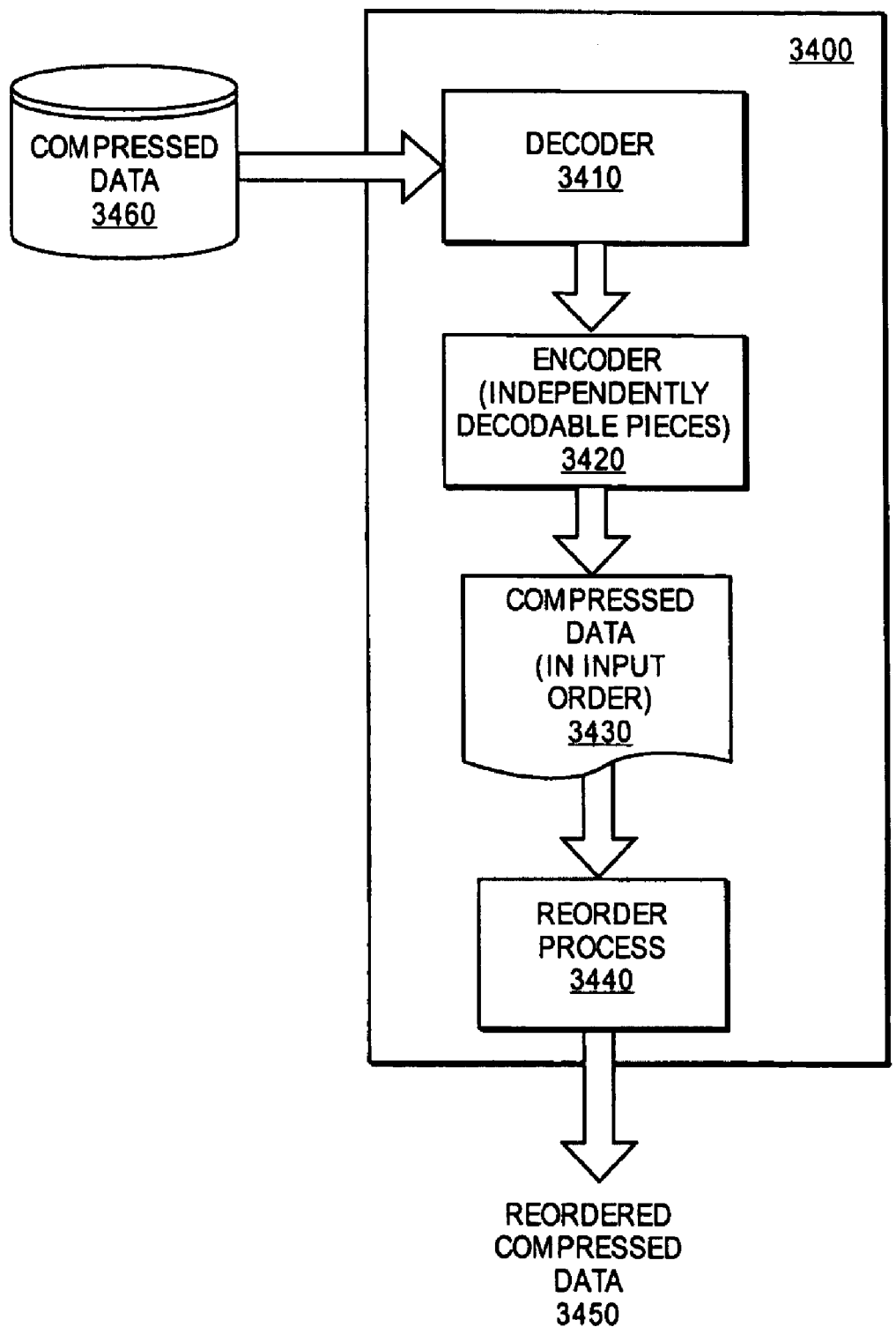
FIG. 34 is a block diagram illustrating an exemplary reorder architecture that includes transcoding according to one embodiment of the present invention.

FIG. 34 is a block diagram illustrating an exemplary reorder architecture 3400 that includes transcoding according to one embodiment of the present invention. In this example, the compressed data 3460 includes fewer independently decodable pieces than desired, more than necessary, or incorrectly placed. The compressed data 3460 is input into a decoder 3410 whose output feeds an encoder 3420 that generates the desired independently decodable pieces by adding more separator codes, removing separator codes, or changing their location in the compressed data 3460. In alternative embodiments, the decoder 3410 and the encoder 3420 may be an entropy decoder and an entropy encoder, respectively.

After encoding, the independently decodable pieces of compressed data are output according to their order of appearance in the input compressed data 3460. However, less than the full data may be present. For example, cropping may have been performed during decoding or encoding. The independently decodable pieces of compressed data are received by a reorder process 3440 that changes the order of at least two of the independently decodable pieces of compressed data and outputs reordered compressed data 3450.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

The invention claimed is:

1. A method comprising:
   receiving data;
   encoding independently decodable pieces of the data to produce a compressed data stream in an input order;
   rotating the independently decodable pieces of data, each by the same amount; and
   reordering the rotated independently decodable pieces into an output order suited to the rotation.

2. The method of claim 1, wherein the data comprises source data.

3. The method of claim 2, wherein source data corresponding to the compressed data stream comprises video data.

4. The method of claim 3, wherein the video data is compressed according to one of the Moving Pictures Expert Group (MPEG) standards.

5. The method of claim 4, wherein the independently decodable pieces of data start at slice boundaries.

6. The method of claim 1, wherein the data comprises intermediate data.

7. The method of claim 1, wherein said rotating the data comprises rotating the data in the transform domain.

8. The method of claim 1, wherein source data corresponding to the compressed data stream comprises image data.

9. The method of claim 8, wherein the image data compression technique is transform based.

10. The method of claim 9, wherein the image data compression technique is discrete cosine transform (DCT) based.

11. The method of claim 10, wherein the image data is compressed according to one of the Joint Photographic Experts Group (JPEG) standards.

12. The method of claim 11, wherein the independently decodable pieces of data include one or more restart markers.

13. The method of claim 12, further comprising updating modulo counters embedded within the one or more restart markers to reflect the correct output order.

14. The method of claim 1, wherein source data corresponding to the compressed data stream comprises audio data.

15. The method of claim 14, wherein the audio data is compressed according to one of the Moving Pictures Expert Group (MPEG) standards.

16. The method of claim 1, further comprising generating reentry information to identify the independently decodable pieces within the compressed data stream.

17. The method of claim 16, further comprising generating additional reentry information to identify pieces of compressed data that are not independently decodable.

18. The method of claim 1, wherein the data comprises image data received from a scanner, and the method further comprises rotating regions of the image data thereby requiring less than a full image buffer.

19. A method comprising:
   receiving a compressed data stream;
   decoding desired information from the compressed data stream;
   manipulating the decoded information by rotating independent pieces of decoded data, each by the same amount;
   encoding the rotated independent piece of data into independently decodable pieces of compressed data to produce a compressed data stream in an order that differs from the correct output order; and
   sorting the independently decodable, rotated pieces of compressed data into the correct output order suited to the rotation.

20. The method of claim 19, further comprising processing the independently decodable pieces of compressed data in an order that is appropriate for producing reconstructed data associated with the compressed data stream.

21. The method of claim 19, further comprising transcoding the correctly ordered independently decodable pieces of compressed data into a new compressed data stream.

22. The method of claim 21, wherein the received compressed data stream does not include independently decodable pieces of compressed data.

23. The method of claim 19, wherein the rotated independently decodable pieces of compressed data can not be decoded by a traditional decoder, before sorting into the correct output order.

24. The method of claim 23, wherein sorting the compressed data comprises transcoding the out of order independently decodable pieces of compressed data into a new compressed data stream that is correctly ordered and decodable by a traditional decoder.

25. A method of rotating Joint Photographic Experts Group (JPEG) compressed data comprising:
   receiving Joint Photographic Experts Group (JPEG) compressed data;
   entropy decoding desired information from the JPEG compressed data;
   performing rotation in the transform domain by transposing coefficients of minimum coded units (MCUs) in the decoded information and appropriately negating certain coefficients' signs of the MCUs; and
   entropy encoding the rotated information into independently decodable pieces of compressed data to produce a compressed data stream in an order that differs from the correct output order; and
   reordering the independently decodable pieces of compressed data into the correct output order, suited to the rotation.

26. The method of claim 25, wherein reordering the independently decodable pieces comprises selectively decoding the independently decodable pieces of compressed data in the correct output order.

27. A machine-readable medium having stored thereon data representing sequences of instructions, said sequences of instructions, when executed by a processor, causing said processor to:
   receive data;
   encode independently decodable pieces of the data to produce a compressed data stream in an input order;
   rotate the independently decodable pieces of data, each by the same amount; and
   reorder the rotated independently decodable pieces into an output order suited to the rotation.

28. The medium of claim 27, wherein:
   said received compressed data stream comprises Joint Photographic Experts Group (JPEG) compressed data;
   said decode desired information comprises entropy decode desired information from the JPEG compressed data;
   said rotate the independently decodable pieces comprises perform rotation in the transform domain by transposing coefficients of minimum coded units (MCUs) in the decoded information and appropriately negating certain coefficients' signs of the MCUs; and wherein said instructions further cause said processor to entropy encode the rotated information into independently decodable pieces of compressed data to produce a compressed data stream in an order that differs from the correct output order.

29. A method comprising:

receiving data;

encoding independently decodable pieces of the data to produce a compressed data stream in an order that differs from a correct output order, wherein the independently decodable pieces of data include one or more restart markers, wherein source data corresponding to the compressed data stream comprises image data, and wherein the image data is compressed according to one of the Joint Photographic Experts Group (JPEG) discrete cosine transform (DCT) based standards;

updating modulo counters embedded within the one or more restart markers to reflect the correct output order; and reordering the independently decodable pieces into the correct output order.

30. The method of claim 29, wherein the data comprises intermediate data.

31. The method of claim 29, further comprising manipulating the data.

32. The method of claim 31, wherein said manipulating the data comprises rotating the data.

33. The method of claim 31, wherein said manipulating the data comprises mirroring the data.

34. The method of claim 31, wherein said manipulating the data comprises transposing the data.

35. The method of claim 31, wherein source data corresponding to the compressed data stream comprises audio data.

36. The method of claim 35, wherein the audio data is compressed according to one of the Moving Pictures Expert Group (MPEG) standards.

37. The method of claim 29, wherein the independently decodable pieces of data start at slice boundaries.

38. The method of claim 29, further comprising generating reentry information to identify the independently decodable pieces within the compressed data stream.

39. The method of claim 38, further comprising generating additional reentry information to identify pieces of compressed data that are not independently decodable.

40. The method of claim 29, wherein the data comprises image data received from a scanner, and the method further comprises rotating regions of the image data thereby requiring less than a full image buffer.

41. A method comprising:

receiving a compressed data stream, wherein source data corresponding to the compressed data stream comprises image data compressed according to one of the Joint Photographic Experts Group (JPEG) discrete cosine transform (DCT) based standards;

decoding desired information from the compressed data stream;

manipulating the decoded information; and encoding the manipulated information into independently decodable pieces of compressed data to produce a compressed data stream in an order that differs from the correct output order, wherein the independently decodable pieces of data include one or more restart markers having embedded modulo counters to reflect the correct output order.

42. The method of claim 41, further comprising processing the independently decodable pieces of compressed data in an order that is appropriate for producing reconstructed data associated with the compressed data stream.

43. The method of claim 41, further comprising sorting the independently decodable pieces of compressed data into the correct output order.

44. The method of claim 41, further comprising transcoding the correctly ordered independently decodable pieces of compressed data into a new compressed data stream.

45. The method of claim 41, further comprising transcoding the out of order independently decodable pieces of compressed data into a new compressed data stream that is correctly ordered and decodable by a traditional decoder.

46. A machine-readable medium having stored thereon data representing sequences of instructions, said sequences of instructions which, when executed by a processor, cause said processor to:

receive data;

encode independently decodable pieces of the data to produce a compressed data stream in an order that differs from a correct output order, wherein the independently decodable pieces of data include one or more restart markers, wherein source data corresponding to the compressed data stream comprises image data, and wherein the image data is compressed according to one of the Joint Photographic Experts Group (JPEG) discrete cosine transform (DCT) based standards;

update modulo counters embedded within the one or more restart markers to reflect the correct output order; and reorder the independently decodable pieces into the correct output order.

47. The medium of claim 46, wherein the sequences of instructions further cause said processor to rotate the data.

48. The medium of claim 46, wherein said sequences of instructions cause said processor to transpose the data.

49. The medium of claim 46, wherein source data corresponding to the compressed data stream comprises audio data.

* * * * *